(12) United States Patent
Inoue et al.

(10) Patent No.: US 10,648,409 B2
(45) Date of Patent: May 12, 2020

(54) CONTROL APPARATUS FOR ENGINE

(71) Applicant: Mazda Motor Corporation, Aki-gun, Hiroshima (JP)

(72) Inventors: Atsushi Inoue, Aki-gun (JP); Masanari Sueoka, Hiroshima (JP); Kota Matsumoto, Aki-gun (JP); Tomonori Urushihara, Yokohama (JP)

(73) Assignee: Mazda Motor Corporation, Aki-fun, Hiroshima (JP)

( * ) Notice: Subject to any disclaimer, the term of this patent is extended or adjusted under 35 U.S.C. 154(b) by 0 days.

(21) Appl. No.: 16/086,307

(22) PCT Filed: Aug. 24, 2017

(86) PCT No.: PCT/JP2017/030339
§ 371 (c)(1),
(2) Date: Sep. 18, 2018

(87) PCT Pub. No.: WO2018/096745
PCT Pub. Date: May 31, 2018

(65) Prior Publication Data
US 2019/0112989 A1    Apr. 18, 2019

(30) Foreign Application Priority Data

Nov. 22, 2016   (WO) .................. PCT/JP2016/084609

(51) Int. Cl.
*F02D 13/02*    (2006.01)
*F02D 45/00*    (2006.01)
(Continued)

(52) U.S. Cl.
CPC ........ *F02D 13/0249* (2013.01); *F02B 37/183* (2013.01); *F02D 13/02* (2013.01);
(Continued)

(58) Field of Classification Search
CPC .... F02B 37/183; F02D 13/02; F02D 13/0249; F02D 21/08; F02D 23/00; F02D 23/02;
(Continued)

(56) References Cited

U.S. PATENT DOCUMENTS 6,336,436 B1 * 1/2002 Miyakubo ................. F02B 1/12
123/295
6,651,432 B1 * 11/2003 Gray, Jr. ................. F01N 3/035
123/305

(Continued)

FOREIGN PATENT DOCUMENTS

JP    2001082303 A    3/2001
JP    2003049691 A    2/2003
(Continued)

OTHER PUBLICATIONS

Vavra, J, et al., "Knock in Various Combustion Modes in a Gasoline-Fueled Automotive Engine," Proceedings of "ASME 2011 Internal Combustion Engine Division Fall Technical Conference" Oct. 2, 2011, Morgantown, West Virginia, 12 pages.

(Continued)

*Primary Examiner* — Jesse S Bogue
(74) *Attorney, Agent, or Firm* — Alleman Hall Creasman & Tuttle LLP

(57) ABSTRACT

A control apparatus for a compression autoignition engine includes an engine, a state quantity setting device, a spark plug, and a controller. After the spark plug ignites air-fuel mixture to start combustion, unburned air-fuel mixture is combusted by autoignition. The controller changes, according to an operation state of the engine, a heat amount ratio that represents an index associated with a ratio of an amount of heat generated by air-fuel mixture being combusted by (Continued)

flame propagation, to a total amount of heat generated by air-fuel mixture in the combustion chamber being combusted.

12 Claims, 16 Drawing Sheets

(51) Int. Cl.
| | |
|---|---|
| F02P 5/145 | (2006.01) |
| F02D 21/08 | (2006.01) |
| F02D 41/00 | (2006.01) |
| F02D 41/30 | (2006.01) |
| F02D 41/04 | (2006.01) |
| F02D 23/00 | (2006.01) |
| F02B 37/18 | (2006.01) |
| F02D 23/02 | (2006.01) |
| F02D 41/06 | (2006.01) |

(52) U.S. Cl.
CPC ............ *F02D 21/08* (2013.01); *F02D 23/00* (2013.01); *F02D 23/02* (2013.01); *F02D 41/006* (2013.01); *F02D 41/0007* (2013.01); *F02D 41/0057* (2013.01); *F02D 41/04* (2013.01); *F02D 41/3041* (2013.01); *F02D 45/00* (2013.01); *F02P 5/145* (2013.01); *F02D 41/062* (2013.01); *F02D 41/3047* (2013.01); *Y02T 10/144* (2013.01); *Y02T 10/18* (2013.01); *Y02T 10/46* (2013.01)

(58) Field of Classification Search
CPC ............ F02D 41/0007; F02D 41/0057; F02D 41/006; F02D 41/04; F02D 41/062; F02D 41/3041; F02D 41/3047; F02D 45/00; F02P 5/145; Y02T 10/144; Y02T 10/18; Y02T 10/46
See application file for complete search history.

(56) References Cited

U.S. PATENT DOCUMENTS

| | | | | |
|---|---|---|---|---|
| 7,357,103 | B2 * | 4/2008 | Koopmans | F01L 1/462 123/27 R |
| 8,459,021 | B2 * | 6/2013 | Yamakawa | F02B 1/12 60/601 |
| 8,689,767 | B1 * | 4/2014 | Dec | F02B 17/005 123/295 |
| 9,745,914 | B2 * | 8/2017 | Ochi | F02D 41/3017 |
| 2002/0059914 | A1 * | 5/2002 | Yamaguchi | F02D 37/02 123/299 |
| 2005/0016496 | A1 * | 1/2005 | Hitomi | F01L 1/053 123/305 |
| 2007/0289572 | A1 * | 12/2007 | Petridis | F02D 35/025 123/305 |
| 2012/0118275 | A1 * | 5/2012 | Kang | F02D 41/0062 123/568.11 |
| 2013/0276752 | A1 * | 10/2013 | Breuer | F02D 13/00 123/395 |
| 2015/0240706 | A1 * | 8/2015 | Yamagata | F02D 37/02 60/603 |

FOREIGN PATENT DOCUMENTS

| | | |
|---|---|---|
| JP | 2005016408 A | 1/2005 |
| JP | 4082292 B2 | 4/2008 |
| JP | 2009108777 A | 5/2009 |
| JP | 2012211543 A | 11/2012 |
| JP | 2015034475 A | 2/2015 |
| WO | 2014091717 A1 | 6/2014 |

OTHER PUBLICATIONS

Perrson, H et al., "The Effect of Swirl on Spark Assisted Compression Ignition (SACI)," SAE International, Jul. 23, 2007, 11 pages.
Olsesky, L, "An Experimental Investigation of the Burn Rates of Naturally Aspirated Spark Assisted Compression Ignition Combustion in a Single Cylinder Engine with Negative Valve Overlap," Doctor of Philosophy Thesis, University of Michigan, 2013, 173 pages.
Manofsky, L, et al., "Bridging the Gap Between HCCI and SI: Spark-Assisted Compression Engine," SAE International, Apr. 12, 2011, 18 pages.
Johansson, T., "Turbocharged HCCI Engine Improving Efficiency and Operating Range," Doctoral Thesis, Lund University, 2010, 233 pages.

* cited by examiner

FIG. 7
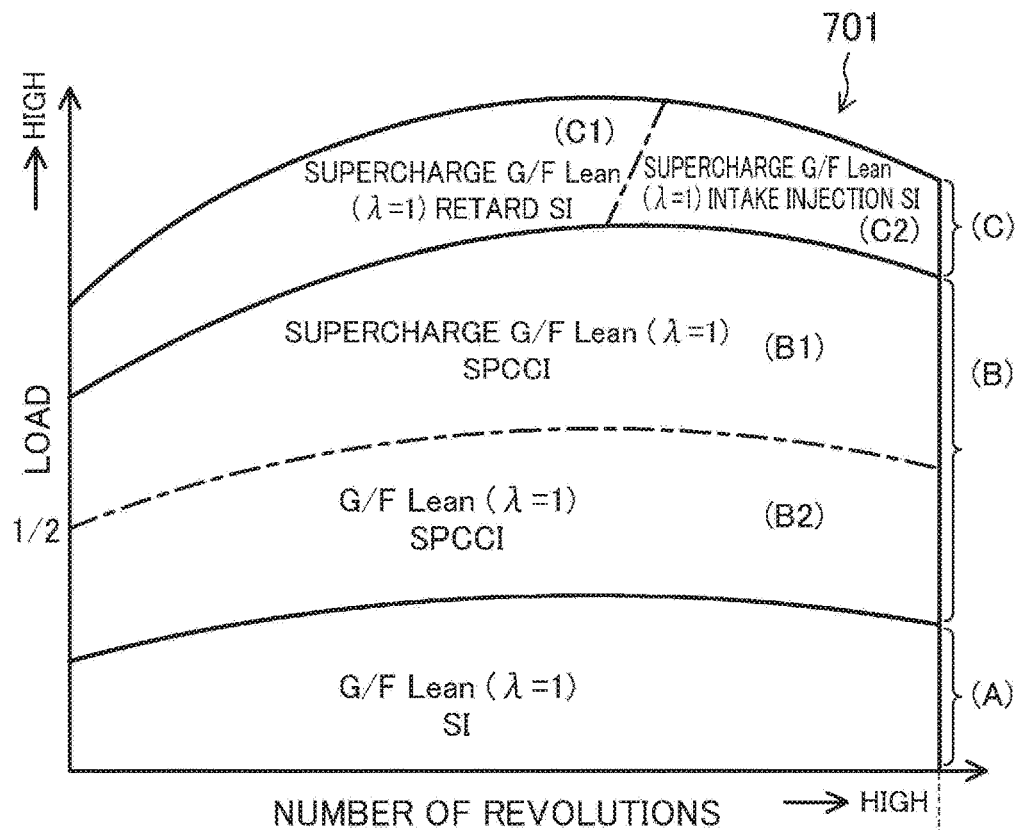
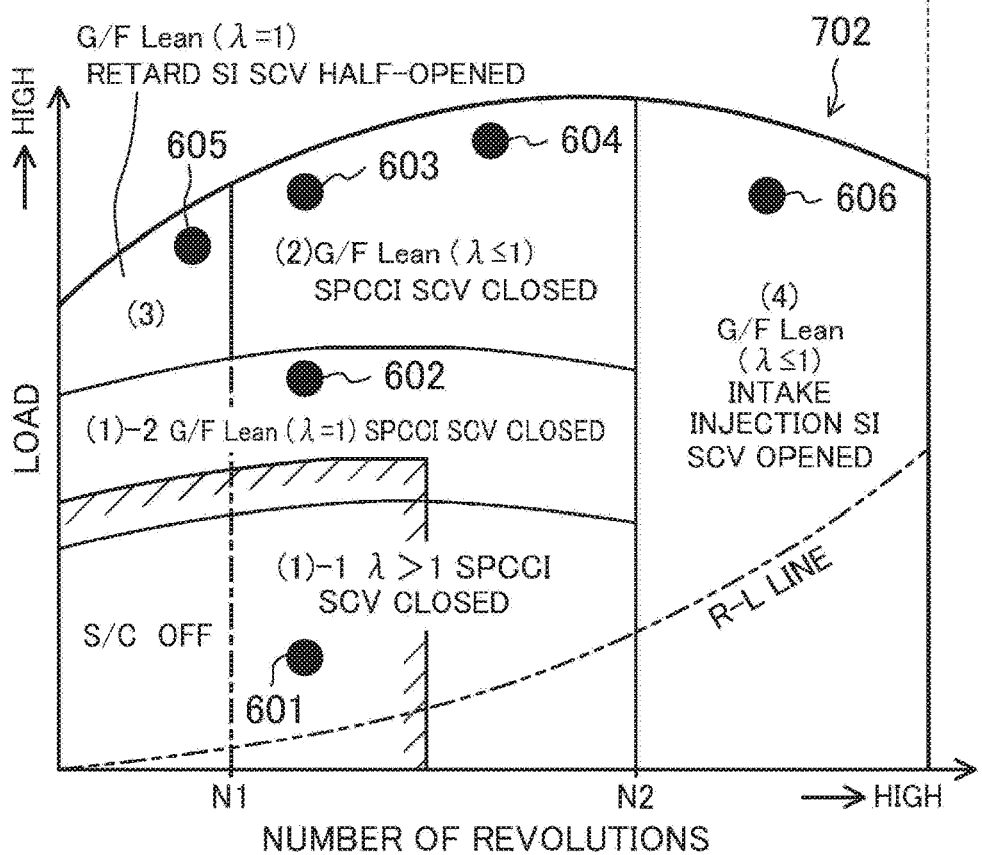

CONTROL APPARATUS FOR ENGINE

TECHNICAL FIELD

The present disclosure relates to a control apparatus for an engine.

BACKGROUND ART

Patent Document 1 discloses an engine which combusts air-fuel mixture in a combustion chamber by autoignition in a partial load region. This engine promotes autoignition of air-fuel mixture by leaving hot burned gas in the combustion chamber in an operation region on a low load side in the partial load region. Furthermore, in the engine, in an operation region on a high load side in the partial load region, cooled burned gas is introduced into the combustion chamber such that autoignition is less likely to occur, and a spark plug performs ignition immediately before the compression top dead center.

CITATION LIST

Patent Document

PATENT DOCUMENT 1: Japanese Patent No. 4082292

SUMMARY OF THE INVENTION

Technical Problem

Combustion by compression ignition may increase change of pressure at an ignition time to increase combustion noise.

The present disclosure allows an engine that performs compression autoignition to reduce combustion noise.

Solution to the Problem

The inventors of the present invention have found a combustion mode in which SI (Spark Ignition) combustion and CI (Compression Ignition) combustion (or self-ignition (Auto Ignition) combustion) are combined. The SI combustion causes flame propagation that starts by forcibly igniting air-fuel mixture in a combustion chamber. The CI combustion starts by compression autoignition of air-fuel mixture in a combustion chamber. In the combustion mode in which the SI combustion and the CI combustion are combined, a spark plug forcibly ignites air-fuel mixture in a combustion chamber, to combust the air-fuel mixture by flame propagation, and heat generation by the SI combustion enhances the temperature in the combustion chamber, to combust unburned air-fuel mixture by autoignition. In combustion by flame propagation, change of pressure is relatively small, whereby combustion noise can be reduced. Meanwhile, a combustion period is shortened in CI combustion than in combustion by flame propagation, and fuel economy is advantageously improved. In the combustion mode in which SI combustion and CI combustion are combined, fuel economy can be improved while combustion noise is reduced. In the combustion mode, the CI combustion is controlled by the SI combustion. Therefore, this combustion mode is hereinafter referred to as SPCCI (SPark Controlled Compression Ignition) combustion.

The inventors of the present invention have found that, in SPCCI combustion, when a heat amount ratio that represents an index associated with a ratio of an amount of heat generated by air-fuel mixture being combusted by flame propagation, to a total amount of heat generated by air-fuel mixture in a combustion chamber being combusted is changed according to an operation state of the engine, combustion noise can be reduced, and have completed the technique disclosed here.

Specifically, a technique disclosed here relates to a control apparatus for an engine. The control apparatus for the engine includes: an engine having a combustion chamber; a spark plug disposed so as to face an inside of the combustion chamber, the spark plug configured to ignite air-fuel mixture in the combustion chamber; and a controller connected to the spark plug, the controller configured to output a control signal to the spark plug.

After the spark plug ignites the air-fuel mixture to start combustion, unburned air-fuel mixture is combusted by autoignition. The controller changes, according to an operation state of the engine, a heat amount ratio that represents an index associated with a ratio of an amount of heat generated by air-fuel mixture being combusted by flame propagation, to a total amount of heat generated by air-fuel mixture in the combustion chamber being combusted.

The "combustion chamber" described herein is not limited to a space formed when a piston reaches the compression top dead center. The term "combustion chamber" is used to encompass a broader meaning.

In this configuration, the spark plug forcibly ignites air-fuel mixture in the combustion chamber in response to a control signal from the controller. Combustion of the air-fuel mixture by flame propagation starts, and unburned air-fuel mixture in the combustion chamber is thereafter combusted by autoignition, to complete the combustion. That is, the engine performs SPCCI combustion.

The controller changes a heat amount ratio according to an operation state of the engine. In the SPCCI combustion, the heat amount ratio is less than 100%. In the combustion mode in which combustion is completed only by combustion by flame propagation without causing combustion by autoignition, the heat amount ratio is 100%.

In SPCCI combustion, when the SI rate is high, the proportion of SI combustion is increased, whereby combustion noise is advantageously reduced. In SPCCI combustion, when the SI rate is low, the proportion of CI combustion is increased, whereby fuel economy is advantageously improved.

When the heat amount ratio is changed according to an operation state of the engine, combustion noise can be reduced.

When load on the engine is high, the controller may set the heat amount ratio to be higher as compared to when load on the engine is low.

When load on the engine is high, an amount of fuel to be supplied into the combustion chamber is increased as compared to when load on the engine is low. In the above-described configuration, a heat amount ratio in SPCCI combustion is increased according to increase of an amount of fuel. Thus, combustion noise is reduced.

The control apparatus for the engine may include supercharging system, mounted to the engine, configured to supercharge the combustion chamber with gas to be introduced thereinto. The supercharging system may operate such that the supercharging system does not perform supercharging when the engine operates at a predetermined load or lower load, and performs supercharging when the engine operates at a load higher than the predetermined load, in response to a control signal from the controller. The controller may make the heat amount ratio almost constant regardless of whether or not load on the engine changes when the engine operates at a load higher than the predetermined load. The supercharging system may include, for example, a mechanical supercharger driven by the engine.

When an amount of fuel is increased according to load on the engine being increased, heat generation by SI combustion is also increased in SPCCI combustion. Therefore, timing of autoignition of unburned air-fuel mixture becomes earlier. This means that the heat amount ratio is reduced. In this case, combustion noise is increased.

By performing supercharging, an amount of gas to be introduced into the combustion chamber can be increased according to an amount of fuel being increased. Increase of an amount of gas increases a heat capacity. Therefore, even when an amount of fuel is increased, enhancement of a temperature in the combustion chamber by SI combustion can be inhibited. Thus, by performing supercharging, in SPCCI combustion, timing of autoignition of unburned air-fuel mixture can be prevented from becoming earlier.

For example, when ignition timing is advanced according to an amount of fuel being increased, both an amount of heat generated by SI combustion and an amount of heat generated in CI combustion can be increased. At this time, a heat amount ratio in SPCCI combustion becomes almost constant regardless of whether or not load on the engine changes.

Meanwhile, when an amount of fuel and an amount of gas are increased, a peak of heat generation in CI combustion in SPCCI combustion becomes high. However, in a region in which load is high, an allowable level of combustion noise is higher than that in a region in which load is low. Therefore, combustion noise can be prevented from being greater than the allowable level.

Therefore, when a heat amount ratio is made almost constant regardless of whether or not load on the engine changes, SPCCI combustion can be performed in the case of load on the engine being high while combustion noise is reduced. Therefore, fuel economy of the engine can be advantageously improved.

The controller may increase the heat amount ratio according to load on the engine being increased when the engine operates at the predetermined load or lower load.

When a heat amount ratio is increased so as to correspond to an amount of fuel that increases according to load on the engine being increased, combustion noise can be prevented from increasing. For example, ignition timing may be advanced according to an amount of fuel being increased while a temperature in the combustion chamber before start of compression is adjusted. By adjusting a temperature in the combustion chamber, even when the heat amount ratio is maintained or increased according to an amount of fuel being increased, a temperature can be inhibited from being enhanced at the compression top dead center. As a result, in SPCCI combustion, timing of autoignition of unburned air-fuel mixture can be appropriately maintained.

When an amount of heat generated by SI combustion is increased according to load on the engine being increased without increasing an amount of heat generated by CI combustion, the heat amount ratio in SPCCI combustion is increased according to load on the engine being increased. SPCCI combustion can be performed when load on the engine is high while combustion noise is prevented from being increased, and fuel economy performance of the engine is improved.

The supercharging system may switch between supercharging and non-supercharging, in response to a control signal from the controller. The controller may change the heat amount ratio according to load on the engine during non-supercharging in which the supercharging system does not perform supercharging. The controller may further change the heat amount ratio according to load on the engine being changed, at a change rate less than a change rate for the non-supercharging, when the supercharging system performs supercharging.

During non-supercharging in which the supercharging system does not perform supercharging, as described above, a heat amount ratio is increased according to load on the engine being increased, thereby reducing combustion noise.

When the supercharging system performs supercharging, an amount of gas can be increased according to load on the engine, as described above. When a heat amount ratio is not greatly changed according to load on the engine being increased, combustion noise can be prevented from being greater than an allowable value.

The control apparatus for the engine may include an EGR system, mounted to the engine, configured to introduce burned gas into the combustion chamber in response to a control signal from the controller. The controller may adjust an EGR ratio that represents an index associated with a ratio of the burned gas to total gas in the combustion chamber, according to an operation state of the engine, by the controller outputting a control signal to the EGR system so as to change the heat amount ratio according to an operation state of the engine.

By changing the EGR ratio, a speed of flame propagation in SI combustion of air-fuel mixture in the combustion chamber changes. As a result, a temperature increase rate in the combustion chamber by SI combustion changes, and, therefore, a time (that is, timing of autoignition) from spark ignition to autoignition of unburned air-fuel mixture changes in SPCCI combustion, and an amount of heat generated by SI combustion changes. Therefore, by changing the EGR ratio, a heat amount ratio can be changed.

The control apparatus for the engine may include a variable valve mechanism, mounted to the engine, configured to change valve timing of at least one of an intake valve and an exhaust valve in response to a control signal from the controller. The controller may change an overlap period of the intake valve and the exhaust valve according to an operation state of the engine by outputting a control signal to the variable valve mechanism.

The change of the overlap period includes: setting a positive overlap period in which both the intake valve and the exhaust valve are opened; and changing the length of the positive overlap period, and further includes: setting a negative overlap period in which both the intake valve and the exhaust valve are closed around the exhaust top dead center; and changing the length of the negative overlap period.

When the positive overlap period or the negative overlap period of the intake valve and the exhaust valve is set, a part of burned gas is introduced again into the combustion chamber, or a part of burned gas is left in the combustion chamber, whereby a temperature in the combustion chamber before start of compression is enhanced. As a result, in SPCCI combustion, timing of autoignition changes and a heat generation amount by SI combustion changes.

Furthermore, in a case where pressure is different between the intake side and the exhaust side of the engine, when the positive overlap period of the intake valve and the exhaust valve is set, residual gas in the combustion chamber is scavenged, whereby a temperature in the combustion chamber before start of compression is reduced. Thus, a temperature increase rate in the combustion chamber by SI combustion changes. As a result, in SPCCI combustion, timing of autoignition changes, and a heat generation amount by SI combustion changes.

Therefore, change of the overlap period can change a heat amount ratio.

The control apparatus for the compression autoignition engine may include: a state quantity setting device, mounted to the engine, configured to adjust introduction of fresh air and burned gas into the combustion chamber; and an injector, mounted to the engine, configured to inject fuel to be supplied into the combustion chamber. The controller may set a G/F that represents an index associated with a weight ratio between total gas, including burned gas, in the combustion chamber, and fuel such that the G/F is in a range from 18 to 50, by the controller outputting control signals to the state quantity setting device and the injector.

The inventors of the present invention have found through study that, in SPCCI combustion in which SI combustion and CI combustion are combined, a G/F of air-fuel mixture is set in a range from 18 to 50, whereby the SPCCI combustion is appropriately performed.

Furthermore, when the state inside the combustion chamber is set so as to satisfy 18≤G/F, a dilution rate of air-fuel mixture is high, thereby improving fuel economy performance of the engine. Furthermore, generation of combustion noise caused by knocking can be assuredly prevented.

The controller may set an excess air ratio λ of the air-fuel mixture to 1.0±0.2 by outputting control signals to the state quantity setting device and the injector.

When the G/F of air-fuel mixture is set in a range from 18 to 50, and λ is set to 1.0±0.2, timing of autoignition can be accurately controlled in SPCCI combustion.

In SPCCI combustion, even if a temperature in the combustion chamber before start of compression varies, the variation of the temperature before start of compression can be absorbed by adjusting a heat generation amount in SI combustion. For example, start timing of SI combustion is adjusted by adjusting ignition timing according to a temperature in the combustion chamber before start of compression, whereby autoignition of unburned air-fuel mixture can be performed at target timing.

In SPCCI combustion, timing of autoignition needs to change according to change of ignition timing in order to accurately control timing of autoignition. A sensitivity for change of timing of autoignition with respect to change of ignition timing is preferably high.

The inventors of the present invention have found through study that, when the state inside the combustion chamber is set such that λ of air-fuel mixture is 1.0±0.2 and the G/F is in a range from 18 to 50, SI combustion is stabilized, resulting in timing of autoignition being changed with respect to change of ignition timing. That is, in SPCCI combustion, timing of autoignition can be accurately controlled.

Furthermore, when λ is set to 1.0±0.2, exhaust gas can be purified by a three-way catalyst disposed in an exhaust passage of the engine.

Therefore, in the above-described configuration, while fuel economy performance is improved and exhaust gas performance is good, timing of autoignition can be accurately controlled in SPCCI combustion in which SI combustion and CI combustion are combined.

When timing of autoignition is controlled by SI combustion, even if a temperature in the combustion chamber before start of compression varies, autoignition of unburned air-fuel mixture can be performed at optimal timing for fuel economy while combustion noise is reduced.

A state inside the combustion chamber at timing of the ignition may satisfy at least one of a condition that a temperature is in a range from 570 K to 800 K, and a condition that a pressure is in a range from 400 kPa to 920 kPa.

Thus, SPCCI combustion can be stabilized.

A state inside the combustion chamber at the timing of the ignition may satisfy a condition that a swirl ratio is 4 or greater.

By swirl flow in the combustion chamber being made strong, SPCCI combustion can be stably performed.

A geometrical compression ratio of the engine may be 13 or greater. In SPCCI combustion, spark ignition is performed. Therefore, a temperature in the combustion chamber need not be very high when a piston reaches the compression top dead center for autoignition of air-fuel mixture. When the geometrical compression ratio is set to be small, cooling loss and mechanical loss of the engine is advantageously reduced.

Advantages of the Invention

As described above, the control apparatus for the engine can control combustion noise.

BRIEF DESCRIPTION OF THE DRAWINGS

FIG. 7 illustrates, in the upper diagram, an operation region map of the engine and illustrates, in the lower diagram, an operation region map different from that in the upper diagram.

DESCRIPTION OF EMBODIMENTS

Figure 1:
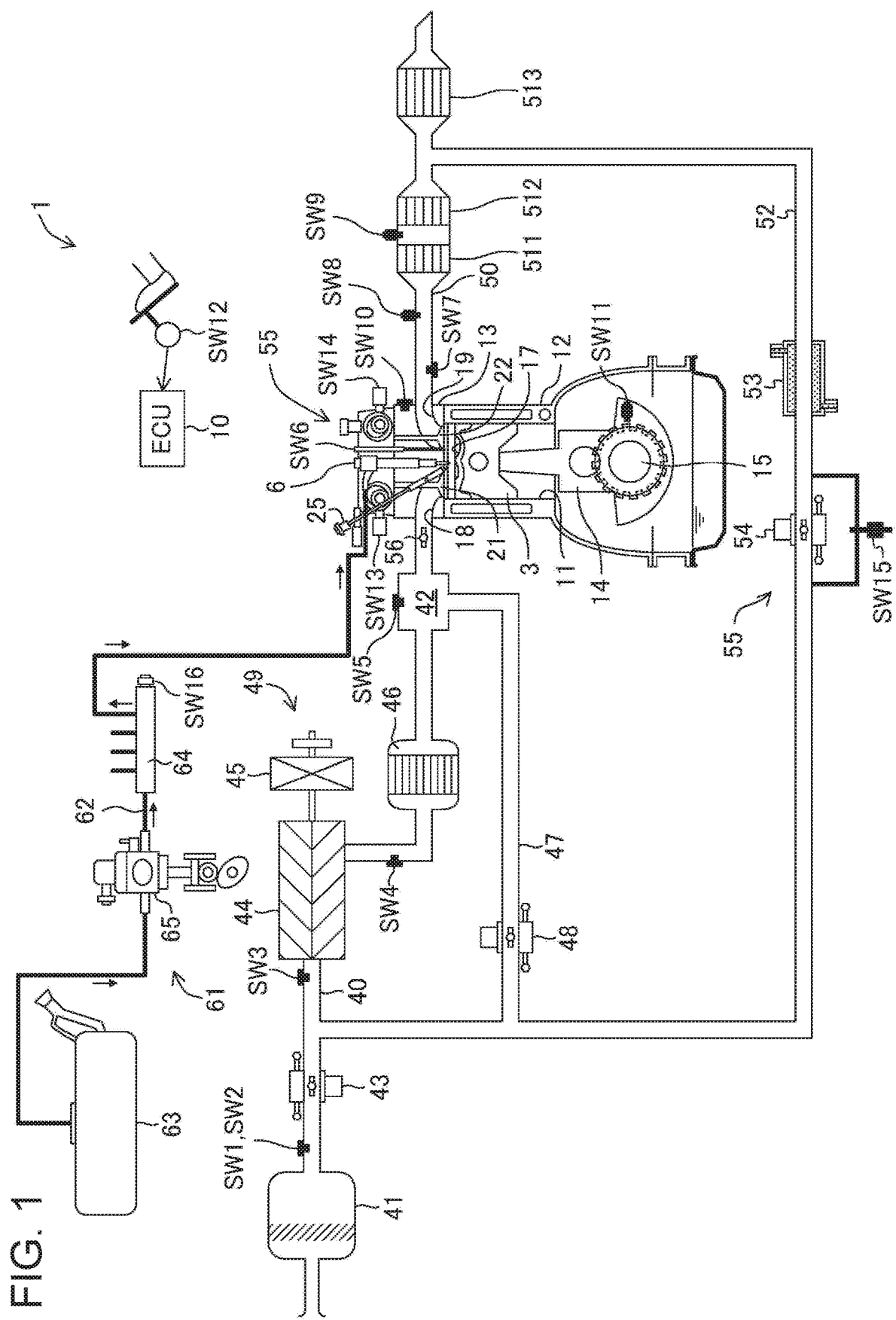
FIG. 1 illustrates a configuration of an engine.
Figure 2:
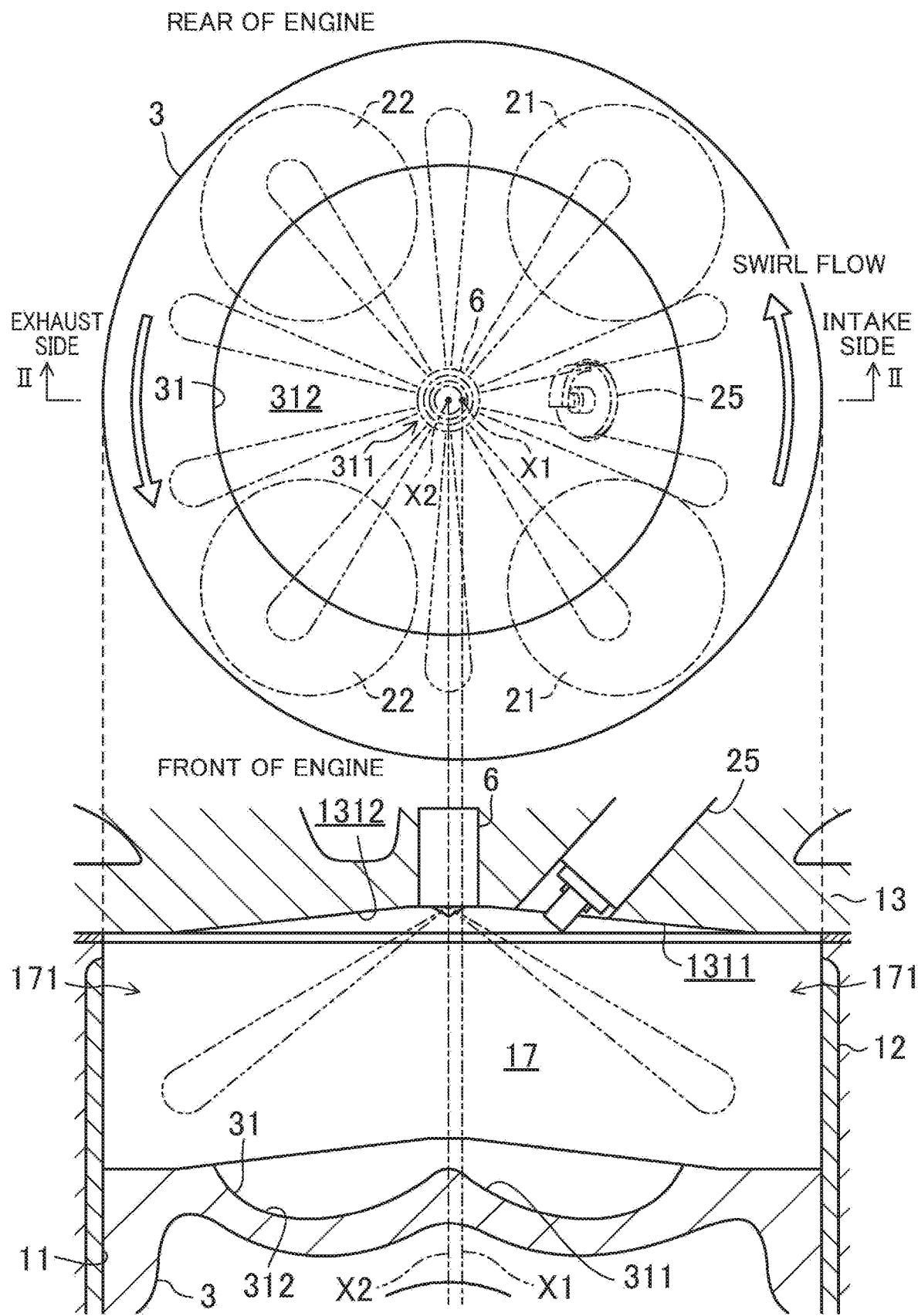
FIG. 2 illustrates a configuration of a combustion chamber, and the upper view thereof corresponds to a view of the combustion chamber in a planer view and the lower view thereof is a cross-sectional view taken along II-II.
Figure 3:
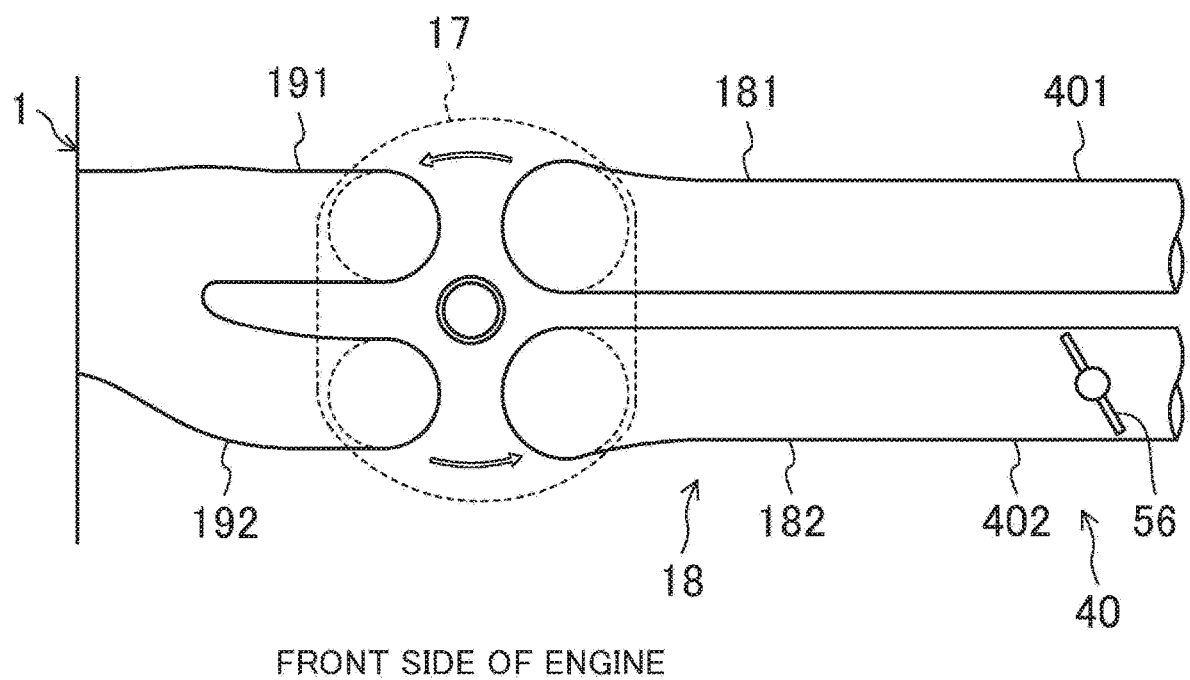
FIG. 3 is a plan view of a configuration of the combustion chamber and an intake system.
Figure 4:
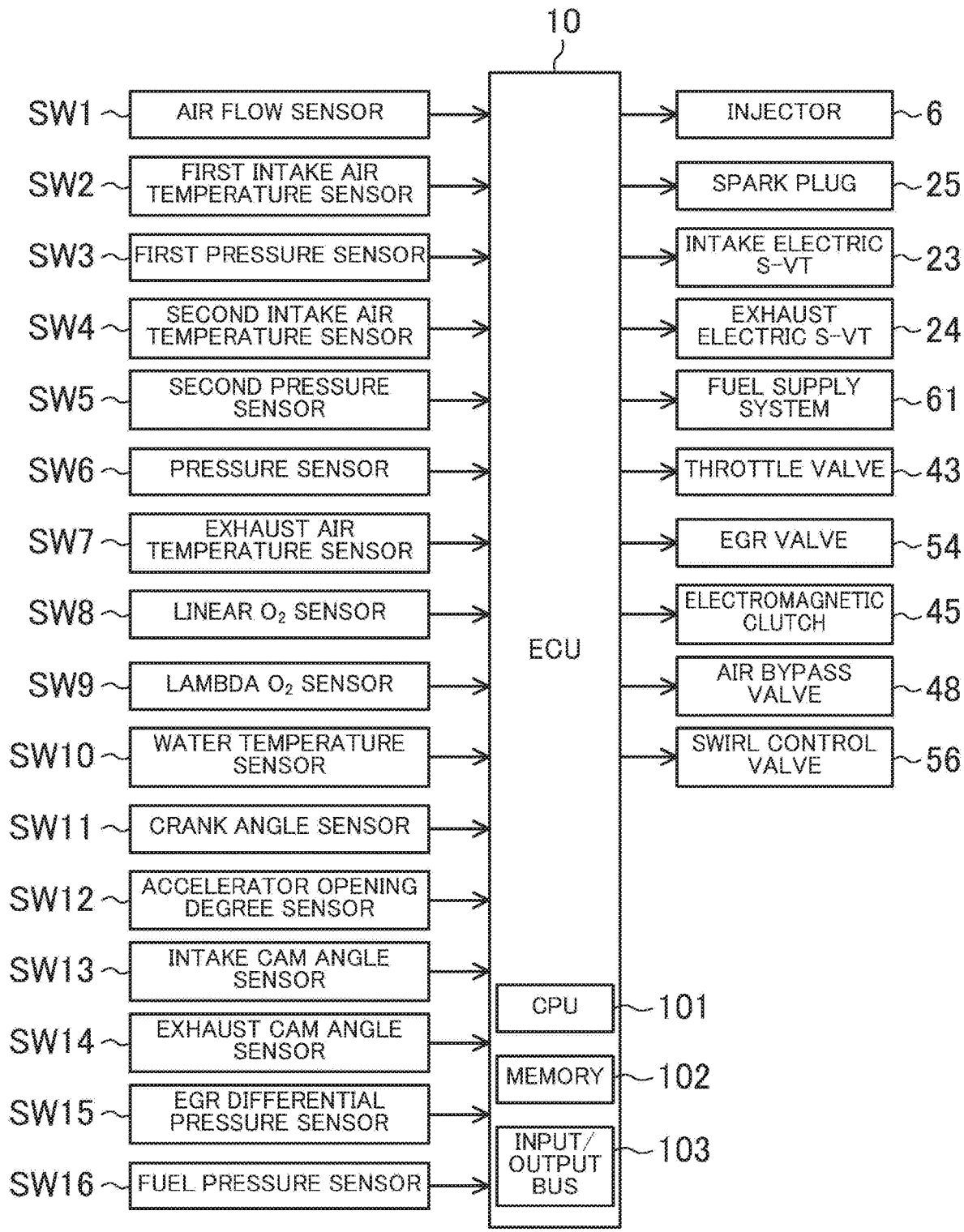
FIG. 4 is a block diagram illustrating a configuration of a control apparatus for the engine.

Hereinafter, embodiments of a control apparatus for an engine will be described in detail with reference to the drawings. Described below is an example of the control apparatus for the engine. FIG. 1 illustrates a configuration of the engine. FIG. 2 is a cross-sectional view of a configuration of a combustion chamber. The upper view of FIG. 2 corresponds to a view of the combustion chamber in a planer view, and the lower view thereof is a cross-sectional view taken along II-II. FIG. 3 illustrates a configuration of the combustion chamber and an intake system. In FIG. 1, the intake side is the left side on the drawing sheet, and the exhaust side is the right side on the drawing sheet. In FIG. 2 and FIG. 3, the intake side is the right side on the drawing sheet, and the exhaust side is the left side on the drawing sheet. FIG. 4 is a block diagram illustrating a configuration of the control apparatus for the engine.

The engine 1 is a four-stroke engine that operates by repeating an intake stroke, a compression stroke, an expansion stroke, and an exhaust stroke in a combustion chamber 17. The engine 1 is mounted to a four-wheeled automobile. By operation of the engine 1, the automobile runs. Fuel for the engine 1 is gasoline in this exemplary configuration. The fuel may be gasoline that contains bioethanol or the like. The fuel for the engine 1 may be any fuel when the fuel is liquid fuel that contains at least gasoline.

(Configuration of Engine)

The engine 1 includes a cylinder block 12 and a cylinder head 13 placed thereon. A plurality of cylinders 11 are formed in the cylinder block 12. In FIG. 1 and FIG. 2, one cylinder 11 is merely illustrated. The engine 1 is a multi-cylinder engine.

In each of the cylinders 11, a piston 3 is slidably inserted. The piston 3 is connected to a crankshaft 15 via a connecting rod 14. The piston 3, the cylinder 11, and the cylinder head 13 define the combustion chamber 17. The "combustion chamber" is not limited to a space formed when the piston 3 reaches the compression top dead center. The term "combustion chamber" may be used to encompass a broader meaning. That is, the "combustion chamber" may be a space formed by the piston 3, the cylinder 11, and the cylinder head 13 regardless of the position of the piston 3.

The lower surface of the cylinder head 13, that is, the ceiling surface of the combustion chamber 17 is formed by an inclined surface 1311 and an inclined surface 1312, as shown in FIG. 2. The inclined surface 1311 is inclined upward from the intake side toward an injection axis X2 of an injector 6 described below. The inclined surface 1312 is inclined upward from the exhaust side toward the injection axis X2. The ceiling surface of the combustion chamber 17 has a so-called pent-roof shape.

The upper surface of the piston 3 is raised toward the ceiling surface of the combustion chamber 17. A cavity 31 is formed in the upper surface of the piston 3. The cavity 31 is recessed from the upper surface of the piston 3. The cavity 31 is shallow-dish-shaped. The cavity 31 opposes the injector 6 described below when the piston 3 is positioned at or near the compression top dead center.

The center of the cavity 31 is shifted to the exhaust side with respect to a central axis X1 of the cylinder 11. The center of the cavity 31 is aligned with the injection axis X2 of the injector 6. The cavity 31 has a projection 311. The projection 311 is aligned with the injection axis X2 of the injector 6. The projection 311 has an almost conic shape. The projection 311 extends upward from the bottom of the cavity 31 toward a ceiling surface of the cylinder 11.

The cavity 31 also has a depressed portion 312 formed around the projection 311. The depressed portion 312 is formed so as to surround the entire circumference of the projection 311. The cavity 31 has a symmetric shape about the injection axis X2.

The circumferential side surface of the depressed portion 312 is inclined relative to the injection axis X2 from the bottom surface of the cavity 31 toward the opening of the cavity 31. The inner diameter of the cavity 31 in the depressed portion 312 is gradually increased from the bottom of the cavity 31 toward the opening of the cavity 31.

The shape of the combustion chamber 17 is not limited to the shape illustrated in FIG. 2. For example, the shape of the cavity 31, the shape of the upper surface of the piston 3, the shape of the ceiling surface of the combustion chamber 17, and the like can be changed as appropriate. The engine 1 has a geometrical compression ratio set in a range from 13 to 30. As described below, the engine 1 performs, in a part of the operation region, SPCCI combustion in which SI combustion and CI combustion are combined. In the SPCCI combustion, the CI combustion is controlled by utilizing heat generation and increase in pressure in the SI combustion. In the engine 1, a temperature (that is, compression end temperature) in the combustion chamber 17 in the case of the piston 3 having reached the compression top dead center need not be high for autoignition of air-fuel mixture. That is, while the engine 1 performs the CI combustion, the geometrical compression ratio can be set so as to be relatively small. When the geometrical compression ratio is set to be small, cooling loss and mechanical loss are advantageously reduced. For example, the engine 1 may have the geometrical compression ratio of 14 to 17 in regular specifications (the octane number of the fuel is about 91), and the geometrical compression ratio of 15 to 18 in the high-octane specifications (the octane number of the fuel is about 96).

The cylinder head 13 has an intake port 18 formed for each cylinder 11. The intake port 18 has two intake ports that are a first intake port 181 and a second intake port 182, as shown in FIG. 3. The first intake port 181 and the second intake port 182 are aligned in the axial direction of the crankshaft 15, that is, the front-rear direction of the engine 1. The intake port 18 communicates with the combustion chamber 17. The intake port 18 is a so-called tumble port, which is not shown in detail. That is, the intake port 18 has a shape that allows tumble flow to be formed in the combustion chamber 17.

An intake valve 21 is disposed in the intake port 18. The intake valve 21 opens and closes a portion between the combustion chamber 17 and the intake port 18. The intake valve 21 is opened and closed at predetermined timing by a valve mechanism. The valve mechanism may be a variable valve mechanism that can vary valve timing and/or valve lift. In this exemplary configuration, as shown in FIG. 4, the variable valve mechanism has an intake electric S-VT (Sequential-Valve Timing) 23. The intake electric S-VT 23 is configured to sequentially change a rotational phase of an intake cam shaft in a predetermined angular range. Thus, the opening time and the closing time of the intake valve 21 are sequentially changed. The intake valve mechanism may have an oil hydraulic S-VT instead of the electric S-VT.

The cylinder head 13 also has an exhaust port 19 formed for each cylinder 11. The exhaust port 19 also has two exhaust ports that are a first exhaust port 191 and a second exhaust port 192, as shown in FIG. 3. The first exhaust port 191 and the second exhaust port 192 are aligned in the front-rear direction of the engine 1. The exhaust port 19 communicates with the combustion chamber 17.

An exhaust valve 22 is disposed in the exhaust port 19. The exhaust valve 22 opens and closes a portion between the combustion chamber 17 and the exhaust port 19. The exhaust valve 22 is opened and closed at predetermined timing by a valve mechanism. The valve mechanism may be a variable valve mechanism that can vary valve timing and/or valve lift. In this exemplary configuration, as shown in FIG. 4, the variable valve mechanism has an exhaust electric S-VT 24. The exhaust electric S-VT 24 is configured to sequentially change a rotational phase of an exhaust cam shaft in a predetermined angular range. Thus, the opening time and the closing time of the exhaust valve 22 are sequentially changed. The exhaust valve mechanism may have an oil hydraulic S-VT instead of the electric S-VT.

As described below in detail, in the engine 1, the length of an overlap period for an opening time of the intake valve 21 and a closing time of the exhaust valve 22, is adjusted by the intake electric S-VT 23 and the exhaust electric S-VT 24. Thus, residual gas in the combustion chamber 17 is scavenged. Furthermore, by adjusting the length of the overlap period, internal EGR (Exhaust Gas Recirculation) gas is introduced into the combustion chamber 17, or is confined in the combustion chamber 17. In this exemplary configuration, the intake electric S-VT 23 and the exhaust electric S-VT 24 form an internal EGR system that is one component of a state quantity setting device. The internal EGR system may not be formed by the S-VT.

The cylinder head 13 has the injector 6 mounted for each cylinder 11. The injector 6 is configured to inject fuel directly into the combustion chamber 17. The injector 6 is disposed in the valley portion of the pent-roof where the inclined surface 1311 on the intake side and the inclined surface 1312 on the exhaust side intersect each other. As shown in FIG. 2, the injector 6 has the injection axis X2 that is disposed closer to the exhaust side than the central axis X1 of the cylinder 11 is. The injection axis X2 of the injector 6 is parallel to the central axis X1. The injection axis X2 of the injector 6 is aligned with the projection 311 of the cavity 31 as described above. The injector 6 opposes the cavity 31. The injection axis X2 of the injector 6 may coincide with the central axis X1 of the cylinder 11. Also in this case, the injection axis X2 of the injector 6 is preferably aligned with the projection 311 of the cavity 31.

The injector 6 is implemented by a multi-hole fuel injection valve having a plurality of holes, which is not shown in detail. The injector 6 injects fuel so as to spread fuel spray radially from the center of the combustion chamber 17 as indicated by alternate long and two short dashes lines in FIG. 2. In this exemplary configuration, the injector 6 has ten holes and the holes are disposed at regular angular intervals in the circumferential direction. The axis of the hole is positioned so as to be shifted, relative to a spark plug 25 described below, in the circumferential direction, as indicated in the upper view of FIG. 2. That is, the spark plug 25 is disposed between the axes of two holes adjacent to each other. Thus, spray of fuel injected from the injector 6 is prevented from being applied directly to the spark plug 25 and making an electrode wet.

As described below, the injector 6 may inject fuel at timing when the piston 3 is positioned at or near the compression top dead center. In this case, when the injector 6 injects fuel, fuel spray flows downward along the projection 311 of the cavity 31 while mixing with fresh air, and flows so as to spread radially from the center of the combustion chamber 17 along the bottom surface and the circumferential side surface of the depressed portion 312 in the radially outward direction. Thereafter, air-fuel mixture reaches the opening of the cavity 31, and flows from the radially outer side, along the inclined surface 1311 on the intake side and the inclined surface 1312 on the exhaust side, toward the center of the combustion chamber 17.

The injector 6 may not be a multi-hole injector. The injector 6 may be an outward-opening valve type injector.

A fuel supply system 61 is connected to the injector 6. The fuel supply system 61 has a fuel tank 63 configured to store fuel, and a fuel supply passage 62 that connects the fuel tank 63 and the injector 6 to each other. In the fuel supply passage 62, a fuel pump 65 and a common rail 64 are disposed. The fuel pump 65 feeds fuel to the common rail 64 under pressure. In this exemplary configuration, the fuel pump 65 is a plunger-type pump driven by the crankshaft 15. The common rail 64 is configured to store fuel having been fed under pressure from the fuel pump 65, with a high fuel pressure. When the injector 6 opens, the fuel stored in the common rail 64 is injected through the hole of the injector 6 into the combustion chamber 17. The fuel supply system 61 is configured to be capable of supplying, to the injector 6, fuel under a high pressure of 30 MPa or higher. The highest fuel pressure in the fuel supply system 61 may be, for example, about 120 MPa. The pressure of fuel to be supplied to the injector 6 may be changed according to an operation state of the engine 1. The configuration of the fuel supply system 61 is not limited to the above-described one.

The cylinder head 13 has the spark plug 25 mounted for each cylinder 11. The spark plug 25 forcibly ignites air-fuel mixture in the combustion chamber 17. In this exemplary configuration, the spark plug 25 is disposed closer to the intake side than the central axis X1 of the cylinder 11 is. The spark plug 25 is disposed between the two intake ports 18. The spark plug 25 is mounted to the cylinder head 13 so as to be inclined from the upper side to the lower side toward the center of the combustion chamber 17. The electrode of the spark plug 25 faces the inside of the combustion chamber 17 and is disposed near the ceiling surface of the combustion chamber 17 as shown in FIG. 2. The position where the spark plug 25 is disposed is not limited to the exemplary position shown in FIG. 2. The spark plug 25 may be disposed closer to the exhaust side than the central axis X1 of the cylinder 11 is. Furthermore, the spark plug 25 may be disposed on the central axis X1 of the cylinder 11, and the injector 6 may be disposed closer to the intake side or the exhaust side than the central axis X1 is.

An intake passage 40 is connected to one side surface of the engine 1. The intake passage 40 communicates with the intake port 18 of each cylinder 11. Through the intake passage 40, gas to be introduced into the combustion chamber 17 flows. An air cleaner 41 for filtering fresh air is disposed at the upstream end portion of the intake passage 40. A surge tank 42 is disposed near the downstream end of the intake passage 40. The intake passage 40 disposed downstream of the surge tank 42 forms independent passages that diverge for the respective cylinders 11, which is not shown in detail. The downstream end of the independent passage is connected to the intake port 18 of each cylinder 11.

A throttle valve 43 is disposed between the air cleaner 41 and the surge tank 42 in the intake passage 40. A valve opening degree of the throttle valve 43 is adjusted, whereby an amount of fresh air to be introduced into the combustion chamber 17 is adjusted. The throttle valve 43 is one component of the state quantity setting device.

A supercharger 44 is disposed downward of the throttle valve 43 in the intake passage 40. The supercharger 44 is configured to perform supercharging with gas that is to be introduced into the combustion chamber 17. In this exemplary configuration, the supercharger 44 is a mechanical supercharger driven by the engine 1. The mechanical supercharger 44 may be, for example, of a Lysholm type. The mechanical supercharger 44 may have any structure. The mechanical supercharger 44 may be of a Roots type, a vane type, or a centrifugal type. The supercharger may be an electric supercharger, or a turbosupercharger driven by exhaust energy.

An electromagnetic clutch 45 is disposed between the supercharger 44 and the engine 1. Between the supercharger 44 and the engine 1, the electromagnetic clutch 45 transmits driving force from the engine 1 to the supercharger 44 and interrupts transmission of driving force. As described below, an ECU 10 switches between disengagement and engagement of the electromagnetic clutch 45, whereby the supercharger 44 switches between on and off. That is, the engine 1 is configured to switch between a state where the supercharger 44 performs supercharging with gas that is to be introduced into the combustion chamber 17 and a state where the supercharger 44 does not perform supercharging with gas that is to be introduced into the combustion chamber 17.

An intercooler 46 is disposed downward of the supercharger 44 in the intake passage 40. The intercooler 46 is configured to cool gas compressed by the supercharger 44. The intercooler 46 may be, for example, of a water-cooling type.

A bypass passage 47 is connected to the intake passage 40. The bypass passage 47 connects the upstream portion of the supercharger 44 and the downstream portion of the intercooler 46 to each other in the intake passage 40 so as to bypass the supercharger 44 and the intercooler 46. More specifically, the bypass passage 47 is connected to the surge tank 42. An air bypass valve 48 is disposed in the bypass passage 47. The air bypass valve 48 adjusts a flow rate of gas that flows in the bypass passage 47.

When the supercharger 44 is off (that is, the electromagnetic clutch 45 is disengaged), the air bypass valve 48 is fully opened. Thus, gas that flows in the intake passage 40 bypasses the supercharger 44 and is introduced into the combustion chamber 17 of the engine 1. The engine 1 operates in a non-supercharged state, that is, by natural aspiration.

When the supercharger 44 is on (that is, the electromagnetic clutch 45 is engaged), a part of gas that passes through the supercharger 44 flows back to the upstream side of the supercharger through the bypass passage 47. By the opening degree of the air bypass valve 48 being adjusted, an amount of backflow can be adjusted, whereby boost pressure for gas to be introduced into the combustion chamber 17 can be adjusted. A time when supercharging is performed may be defined as a time when the pressure in the surge tank 42 is higher than an atmospheric pressure. A time when supercharging is not performed may be defined as a time when the pressure in the surge tank 42 is lower than or equal to an atmospheric pressure.

In this exemplary configuration, a supercharging system 49 is formed by the supercharger 44, the bypass passage 47, and the air bypass valve 48. The air bypass valve 48 is one component of the state quantity setting device.

The engine 1 has a swirl generation section for generating swirl flow in the combustion chamber 17. The swirl generation section is implemented by a swirl control valve 56 mounted in the intake passage 40 as shown in FIG. 3. The swirl control valve 56 is disposed in a secondary passage 402 among a primary passage 401 connected to the first intake port 181 and the secondary passage 402 connected to the second intake port 182. The swirl control valve 56 is an opening degree adjusting valve that can regulate the cross-sectional surface of the secondary passage. When the opening degree of the swirl control valve 56 is small, a flow rate of intake air flowing into the combustion chamber 17 from the first intake port 181 among the first intake port 181 and the second intake port 182 aligned in the front-rear direction of the engine 1 is relatively increased, and a flow rate of intake air flowing into the combustion chamber 17 from the second intake port 182 is relatively reduced, so that swirl flow in the combustion chamber 17 becomes strong. When the opening degree of the swirl control valve 56 is great, flow rates of intake air flowing into the combustion chamber 17 from the first intake port 181 and the second intake port 182, respectively, are almost equal, so that swirl flow in the combustion chamber 17 is weakened. When the swirl control valve 56 is fully opened, no swirl flow is generated. The swirl flow circulates in the counterclockwise direction in FIG. 3 as indicated by outlined arrows (also see outlined arrows in FIG. 2).

The swirl generation section may be structured such that, instead of or in addition to the swirl control valve 56 being disposed in the intake passage 40, periods in which two intake valves 21 are opened are shifted from each other, and intake air can be introduced into the combustion chamber 17 from only one of the intake valves 21. By only one of the two intake valves 21 being opened, intake air is non-uniformly introduced into the combustion chamber 17, so that swirl flow can be generated in the combustion chamber 17. Furthermore, the swirl generation section may be structured such that the shape of the intake port 18 is properly designed to generate swirl flow in the combustion chamber 17.

Figure 5:
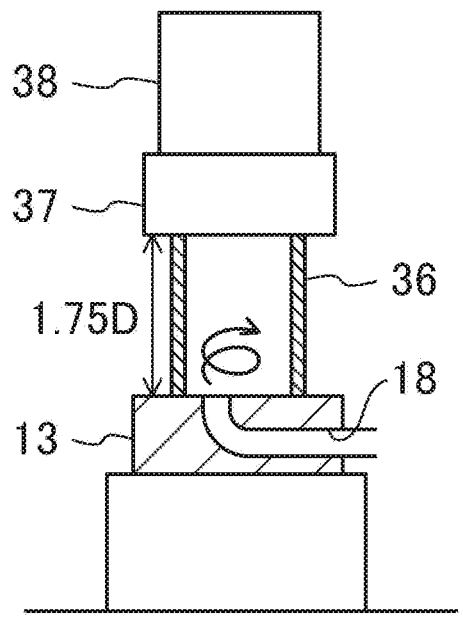
FIG. 5 illustrates a rig tester for measuring a swirl ratio.

The strength of the swirl flow in the combustion chamber 17 is defined. In this exemplary configuration, the strength of the swirl flow in the combustion chamber 17 is represented by "swirl ratio". The "swirl ratio" can be defined as a value obtained by dividing, by an engine angular velocity, a value that is obtained by an intake-air-flow lateral angular velocity measured for each valve lift being integrated. The intake-air-flow lateral angular velocity can be obtained based on the measurement using a rig tester shown in FIG. 5. That is, in the tester shown in FIG. 5, the cylinder head 13 is vertically inverted and set on a base, and the intake port 18 is connected to a not-illustrated intake air supply device. Furthermore, a cylinder 36 is set on the cylinder head 13, and an impulse meter 38 having a honeycomb-shaped rotor 37 is connected to the upper end of the cylinder 36. The lower surface of the impulse meter 38 is positioned so as to be distant, by 1.75 D (D represents a cylinder bore diameter), from a mating surface on which the cylinder head 13 and a cylinder block are mated with each other. A torque that acts on the honeycomb-shaped rotor 37 due to swirl (see an arrow in FIG. 5) generated in the cylinder 36 according to intake air being supplied, is measured by the impulse meter 38, and the intake-air-flow lateral angular velocity can be obtained based thereon.

Figure 6:
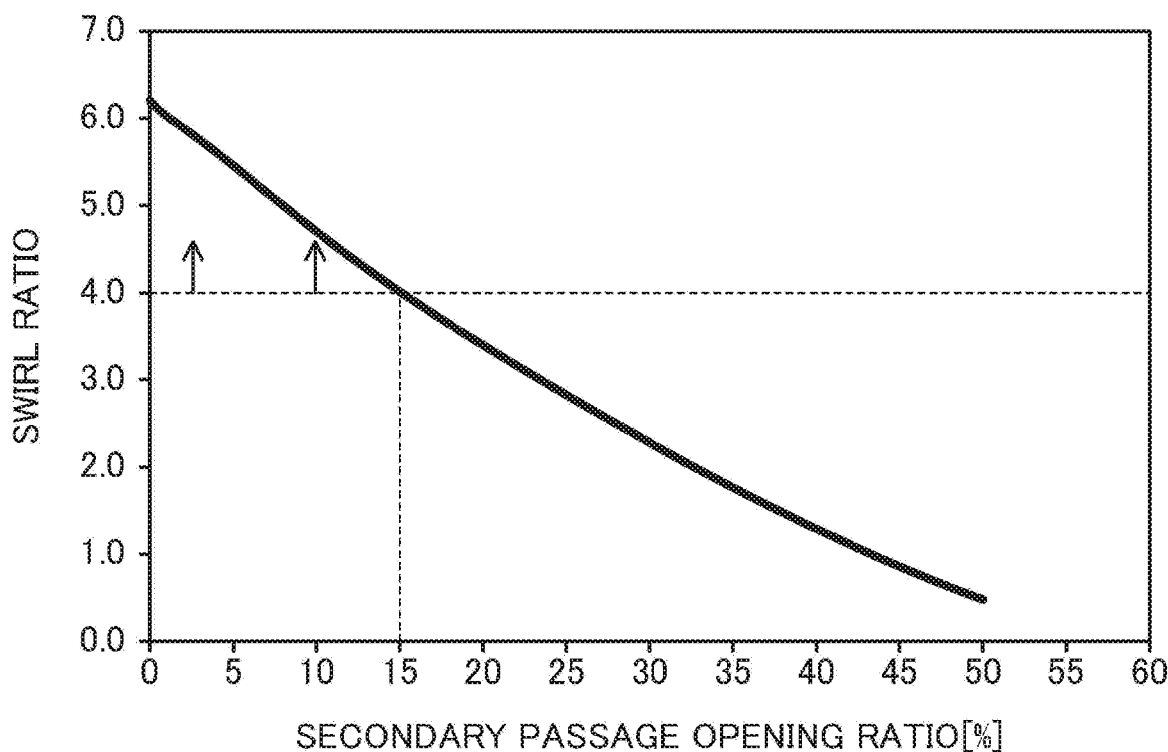
FIG. 6 illustrates a relationship between a swirl ratio and an opening ratio of a secondary passage.

FIG. 6 illustrates a relationship between a swirl ratio and an opening degree of the swirl control valve 56 in the engine 1. In FIG. 6, the opening degree of the swirl control valve 56 is represented by an opening ratio of opening of the swirl control valve 56 to a fully open cross-section of the secondary passage 402. When the swirl control valve 56 is fully closed, the opening ratio with respect to the secondary passage 402 is 0%. When the opening degree of the swirl control valve 56 is increased, the opening ratio with respect to the secondary passage 402 is greater than 0%. When the swirl control valve 56 is fully opened, the opening ratio with respect to the secondary passage 402 is 100%. As illustrated in FIG. 6, in the engine 1, when the swirl control valve 56 is fully closed, the swirl ratio is about 6. When the swirl ratio is to be 4 or greater, the opening degree of the swirl control valve 56 may be adjusted such that the opening ratio is 0 to 15%.

An exhaust passage 50 is connected to the other side surface of the engine 1. The exhaust passage 50 communicates with the exhaust port 19 of each cylinder 11. Through the exhaust passage 50, exhaust gas discharged from the combustion chamber 17 flows. The upstream portion of the exhaust passage 50 forms independent passages that diverge for the respective cylinders 11, which is not shown in detail. The upstream end of the independent passage is connected to the exhaust port 19 of each cylinder 11.

In the exhaust passage 50, an exhaust gas purification system having one or more catalytic converters is disposed. In this exemplary configuration, the exhaust gas purification system has two catalytic converters. The upstream-side catalytic converter is disposed in an engine compartment. The upstream-side catalytic converter includes a three-way catalyst 511 and a GPF (Gasoline Particulate Filter) 512. The downstream-side catalytic converter is disposed outside the engine compartment. The downstream-side catalytic converter includes a three-way catalyst 513. The exhaust gas purification system is not limited to one having the illustrated configuration. For example, the GPF may not be provided. Furthermore, the catalytic converter may not include a three-way catalyst. Moreover, the order in which the three-way catalyst and the GPF are arranged may be changed as appropriate.

An EGR passage 52 that forms an external EGR system is connected between the intake passage 40 and the exhaust passage 50. The EGR passage 52 is a passage for recirculating a part of burned gas into the intake passage 40. The upstream end of the EGR passage 52 is connected between the upstream-side catalytic converter and the downstream-side catalytic converter in the exhaust passage 50. The downstream end of the EGR passage 52 is connected to a portion upstream of the supercharger 44 in the intake passage 40. More specifically, the downstream end of the EGR passage 52 is connected to a mid-portion of the bypass passage 47. EGR gas that flows in the EGR passage 52 flows into the portion upstream of the supercharger 44 in the intake passage 40 without passing through the air bypass valve 48 of the bypass passage 47.

A water-cooling type EGR cooler 53 is disposed in the EGR passage 52. The EGR cooler 53 is configured to cool burned gas. An EGR valve 54 is also disposed in the EGR passage 52. The EGR valve 54 is configured to adjust a flow rate of burned gas that flows in the EGR passage 52. The opening degree of the EGR valve 54 is adjusted, whereby an amount of cooled burned gas, that is, external EGR gas, to be recirculated can be adjusted.

In this exemplary configuration, an EGR system 55 is structured by the external EGR system that includes the EGR passage 52 and the EGR valve 54, and the internal EGR system that includes the intake electric S-VT 23 and the exhaust electric S-VT 24 described above. Furthermore, the EGR valve 54 is one component of the state quantity setting device. In the external EGR system, the EGR passage 52 is connected to a portion downstream of the catalytic converter, and the EGR passage 52 has the EGR cooler 53. Therefore, burned gas having a temperature lower than that in the internal EGR system can be supplied to the combustion chamber 17.

The control apparatus for the engine includes the ECU (Engine Control Unit) 10 for operating the engine 1. The ECU 10 is a controller based on a known microcomputer. The ECU 10 includes a central processing unit (CPU) 101 for executing a program, a memory 102 implemented by, for example, a RAM (Random Access Memory) or a ROM (Read Only Memory) for storing programs and data, and an input/output bus 103 for inputting and outputting an electrical signal. The ECU 10 is an example of a controller.

As shown in FIG. 1 and FIG. 4, various sensors SW1 to SW16 are connected to the ECU 10. The sensors SW1 to SW16 output detection signals to the ECU 10. The sensors include sensors described below.

That is, the sensors include: an air flow sensor SW1, disposed downstream of the air cleaner 41 in the intake passage 40, for detecting a flow rate of fresh air that flows in the intake passage 40; a first intake air temperature sensor SW2, disposed downstream of the air cleaner 41 in the intake passage 40, for detecting a temperature of fresh air; a first pressure sensor SW3, disposed downstream of a position at which the EGR passage 52 is connected to the intake passage 40 and disposed upstream of the supercharger 44, for detecting pressure of gas that flows into the supercharger 44; a second intake air temperature sensor SW4, disposed downstream of the supercharger 44 in the intake passage 40 and disposed upstream of a position at which the bypass passage 47 is connected to the intake passage 40, for detecting a temperature of gas that flows from the supercharger 44; a second pressure sensor SW5 mounted to the surge tank 42 for detecting pressure of gas flowing downstream of the supercharger 44; pressure sensors SW6, mounted to the cylinder heads 13 so as to correspond to the cylinders 11, respectively, each of which detects pressure in the combustion chamber 17; an exhaust air temperature sensor SW7 disposed in the exhaust passage 50 for detecting a temperature of exhaust gas discharged from the combustion chamber 17; a linear $O_2$ sensor SW8, disposed upstream of the upstream-side catalytic converter in the exhaust passage 50, for detecting the concentration of oxygen in exhaust gas; a lambda $O_2$ sensor SW9, disposed downstream of the three-way catalyst 511 in the upstream-side catalytic converter, for detecting the concentration of oxygen in exhaust gas; a water temperature sensor SW10 mounted to the engine 1 for detecting a temperature of cooling water; a crank angle sensor SW11 mounted to the engine 1 for detecting a rotational angle of the crankshaft 15; an accelerator opening degree sensor SW12 mounted to an accelerator pedal mechanism for detecting an accelerator opening degree corresponding to an amount of operation of an accelerator pedal; an intake cam angle sensor SW13 mounted to the engine 1 for detecting a rotational angle of an intake cam shaft; an exhaust cam angle sensor SW14 mounted to the engine 1 for detecting a rotational angle of an exhaust cam shaft; an EGR differential pressure sensor SW15 disposed in the EGR passage 52 for detecting a differential pressure between the upstream side and the downstream side of the EGR valve 54; and a fuel pressure sensor SW16, mounted to the common rail 64 of the fuel supply system 61, for detecting pressure of fuel to be supplied to the injector 6.

The ECU 10 determines an operation state of the engine 1 and calculates a control amount for each device, based on the detection signals. The ECU 10 outputs control signals based on the calculated control amounts, to the injector 6, the spark plug 25, the intake electric S-VT 23, the exhaust electric S-VT 24, the fuel supply system 61, the throttle valve 43, the EGR valve 54, the electromagnetic clutch 45 of the supercharger 44, the air bypass valve 48, and the swirl control valve 56.

For example, the ECU 10 sets a target torque for the engine 1 and determines a target boost pressure based on a detection signal from the accelerator opening degree sensor SW12 and a preset map. The ECU 10 adjusts an opening degree of the air bypass valve 48 based on the target boost pressure, and a differential pressure, between the front side and the rear side of the supercharger 44, obtained according to detection signals from the first pressure sensor SW3 and the second pressure sensor SW5, thereby performing feedback control such that the boost pressure becomes the target boost pressure.

Furthermore, the ECU 10 sets a target EGR ratio (that is, ratio of EGR gas to the total gas in the combustion chamber 17) based on the operation state of the engine 1 and a preset map. The ECU 10 determines a target EGR gas amount according to the target EGR ratio and an amount of intake air based on a detection signal from the accelerator opening degree sensor SW12, and adjusts an opening degree of the EGR valve 54 based on the differential pressure, between the front side and the rear side of the EGR valve 54, obtained according to a detection signal from the EGR differential pressure sensor SW15, thereby performing feedback control such that an amount of external EGR gas to be introduced into the combustion chamber 17 becomes the target EGR gas amount.

Moreover, the ECU 10 performs air-fuel ratio feedback control when a predetermined control condition is satisfied. Specifically, the ECU 10 adjusts an amount of fuel injected by the injector 6 such that an air-fuel ratio of air-fuel mixture has a desired value, based on the concentration of oxygen, in exhaust air, detected by the linear $O_2$ sensor SW8 and the lambda $O_2$ sensor SW9.

The other controls of the engine 1 by the ECU 10 will be described below in detail.

(Operation Region of Engine)

FIG. 7 illustrates an operation region map 701 for the engine 1 in the upper diagram. The operation region map 701 is defined according to loads and the number of revolutions. The operation region map 701 is divided into three regions according to whether load is high or low. Specifically, the three regions are a low load region (A) that includes an idling operation region, a high load region (C) that includes full load, and an intermediate load region (B) between the low load region (A) and the high load region (C). In the operation region map 701, combustion by compression autoignition is performed in the intermediate load region mainly for improving fuel economy and improving exhaust gas performance in the engine 1. Hereinafter, combustion modes in the low load region, the intermediate load region, and the high load region, will be sequentially described.

(Low Load Region)

When the operation state of the engine 1 is in the low load region (that is, the engine 1 operates with load lower than a first load), the combustion mode is SI combustion in which the spark plug 25 ignites air-fuel mixture in the combustion chamber 17 and the air-fuel mixture is thus combusted by flame propagation. This is because assuredly obtaining of combustion stability is prioritized. Hereinafter, the combustion mode in the low load region may be referred to as low load SI combustion.

When the operation state of the engine 1 is in the low load region, an air-fuel ratio (A/F) of air-fuel mixture is the theoretical air-fuel ratio (A/F≈14.7). In the following description, values of an air-fuel ratio of air-fuel mixture, an excess air ratio λ, and a G/F represent values at ignition timing. When the air-fuel ratio of air-fuel mixture is the theoretical air-fuel ratio, exhaust gas discharged from the combustion chamber 17 can be purified by the three-way catalyst, so that the engine 1 has good exhaust gas performance. The A/F of air-fuel mixture may be set so as to fall within a purification window of the three-way catalyst. The excess air ratio λ of the air-fuel mixture may be 1.0±0.2.

When the operation state of the engine 1 is in the low load region, the EGR system 55 introduces EGR gas into the combustion chamber 17 in order to improve fuel economy performance of the engine 1. The G/F of the air-fuel mixture, that is, a weight ratio between the total gas and fuel in the combustion chamber 17 is set in a range from 18 to 30. The G/F of the air-fuel mixture may be set in a range from 18 to 50. The air-fuel mixture is EGR gas lean. The dilution rate of the air-fuel mixture is high. When the G/F of the air-fuel mixture is, for example, 25, SI combustion can be stably performed without causing autoignition of the air-fuel mixture, in the low load operation region. In the low load region, the G/F of the air-fuel mixture is almost uniformly maintained regardless of whether or not load on the engine 1 is high or low. Thus, the SI combustion is stabilized over the entirety of the low load region. Furthermore, fuel economy of the engine 1 is improved, and exhaust gas performance becomes good.

When the operation state of the engine 1 is in the low load region, an amount of fuel is small. Therefore, in order to set λ of the air-fuel mixture to 1.0±0.2 and set the G/F in a range from 18 to 50, an amount of gas to be filled in the combustion chamber 17 needs to be less than 100%. Specifically, the engine 1 performs throttling for adjusting an opening degree of the throttle valve 43 and/or Miller cycle for delaying, to the intake bottom dead center or later, the closing time of the intake valve 21.

Furthermore, when the operation state of the engine 1 is in the low load region, an opening degree of the swirl control valve 56 is adjusted as appropriate.

In the low-load low-rotation region in the low load region, an amount of filled gas is further reduced, whereby the combustion temperature of the air-fuel mixture and the temperature of exhaust gas may be enhanced. Thus, the catalytic converter is advantageously maintained in an active state.

(Intermediate Load Region)

When the operation state of the engine 1 is in the intermediate load region, an amount of injected fuel is increased. The temperature in the combustion chamber 17 becomes high, whereby autoignition can be stably performed. The engine 1 performs CI combustion in the intermediate load region in order to improve fuel economy and improve exhaust gas performance.

In combustion by autoignition, if the temperature in the combustion chamber 17 before start of compression varies, timing of autoignition is greatly changed. Therefore, in the intermediate load region, the engine 1 performs SPCCI combustion in which SI combustion and CI combustion are combined. In the SPCCI combustion, the spark plug 25 forcibly ignites air-fuel mixture in the combustion chamber 17, and the air-fuel mixture is thus combusted by flame propagation, and unburned air-fuel mixture is combusted by autoignition due to heat generation by the SI combustion enhancing the temperature in the combustion chamber 17. By adjusting an amount of heat generated by the SI combustion, variation of the temperature in the combustion chamber 17 before start of compression can be absorbed. Even if the temperature in the combustion chamber 17 before start of compression varies, when the start timing of the SI combustion is adjusted by, for example, adjustment of ignition timing, autoignition of unburned air-fuel mixture can be performed at target timing.

In the SPCCI combustion, in order to accurately control the timing of autoignition, the timing of autoignition needs to change according to the ignition timing being changed. Sensitivity for change of timing of autoignition with respect to change of ignition timing is preferably high.

The inventors of the present invention have found through study that, when a G/F of the air-fuel mixture is in a range from 18 to 50, the SPCCI combustion can be stably performed and timing of autoignition changes with respect to change of ignition timing. When the operation state of the engine 1 is in the intermediate load region, the engine 1 sets a state inside the combustion chamber 17 such that λ of air-fuel mixture is 1.0±0.2 and a G/F of the air-fuel mixture is in a range from 18 to 50.

Furthermore, the engine 1 adjusts the opening degree of the swirl control valve 56 as appropriate. When the operation state of the engine 1 is in the intermediate load region, the swirl control valve 56 is fully closed or opened to a predetermined opening degree on the closing side. In the combustion chamber 17, relatively strong swirl flow is formed. At the timing of ignition, the swirl ratio may be 4 or greater.

By timing of autoignition being accurately controlled in the SPCCI combustion, increase of combustion noise can be avoided when the operation state of the engine 1 is in the intermediate load region. Furthermore, a dilution rate of the air-fuel mixture is set to be as high as possible to perform CI combustion, whereby the engine 1 can have high fuel economy performance. Moreover, λ of air-fuel mixture is set to 1.0±0.2, whereby exhaust gas can be purified by the three-way catalyst, so that the engine 1 has good exhaust gas performance.

As described above, in the low load region, a G/F of air-fuel mixture is in a range from 18 to 50 (for example, 25), and λ of the air-fuel mixture is set to 1.0±0.2. The state quantity of the combustion chamber 17 does not greatly change between when the operation state of the engine 1 is in the low load region and when the operation state of the engine 1 is in the intermediate load region. Therefore, robustness of control of the engine 1 with respect to change of load on the engine 1 is enhanced.

When the operation state of the engine 1 is in the intermediate load region, an amount of fuel is increased unlike in the low load region. Therefore, an amount of gas to be filled in the combustion chamber 17 need not be adjusted. The opening degree of the throttle valve 43 is a fully open degree.

When load on the engine 1 is increased and an amount of fuel is further increased, an amount of gas introduced into the combustion chamber 17 by natural aspiration is insufficient for setting λ of air-fuel mixture to 1.0±0.2 and setting a G/F of the air-fuel mixture in a range from 18 to 50. Therefore, the supercharger 44 supercharges the combustion chamber 17 with gas to be introduced thereinto, in a region in which load is higher than a predetermined load (that is, third load) in the intermediate load region. The intermediate load region (B) is divided into a first intermediate load region (B1) in which the load is higher than a predetermined load and supercharging is performed, and a second intermediate load region (B2) in which the load is the predetermined load or lower load and no supercharging is performed. The predetermined load is, for example, ½ load. The second intermediate load region is a region in which load is lower than load in the first intermediate load region. Hereinafter, the combustion mode in the first intermediate load region may be referred to as supercharge SPCCI combustion, and the combustion mode in the second intermediate load region may be referred to as non-supercharge SPCCI combustion.

In the second intermediate load region in which no supercharging is performed, as an amount of fuel is increased, fresh air to be introduced into the combustion chamber 17 is increased, while EGR gas is reduced. The G/F of the air-fuel mixture is reduced when load on the engine 1 is increased. Since the opening degree of the throttle valve 43 is a fully open degree, the engine 1 adjusts an amount of EGR gas to be introduced into the combustion chamber 17, whereby an amount of fresh air to be introduced into the combustion chamber 17 is adjusted. In the second intermediate load region, the state quantity of the combustion chamber 17 is such that, for example, λ of the air-fuel mixture is almost uniformly 1.0, while the G/F of the air-fuel mixture changes in a range from 25 to 28.

Meanwhile, in the first intermediate load region in which supercharging is performed, as an amount of fuel is increased, both fresh air and EGR gas to be introduced into the combustion chamber 17 are increased, in the engine 1. The G/F of the air-fuel mixture is almost constant even when the load on the engine 1 is increased. In the first intermediate load region, the state quantity of the combustion chamber 17 is such that, for example, λ of the air-fuel mixture is almost uniformly 1.0 and the G/F of the air-fuel mixture is almost uniformly 25.

(High Load Region)

The combustion mode is SI combustion when the operation state of the engine 1 is in the high load region. This is because assuredly avoiding of combustion noise is prioritized. Hereinafter, the combustion mode in the high load region may be referred to as high load SI combustion.

When the operation state of the engine 1 is in the high load region, λ of the air-fuel mixture is 1.0±0.2. Furthermore, the G/F of the air-fuel mixture is set in a range from 18 to 30. The G/F of the air-fuel mixture may be set in a range from 18 to 50. In the high load region, the opening degree of the throttle valve 43 is a fully open degree, and the supercharger 44 performs supercharging.

In the high load region, an amount of EGR gas is reduced according to load being increased in the engine 1. The G/F of the air-fuel mixture becomes small when the load on the engine 1 is increased. An amount of fresh air to be introduced into the combustion chamber 17 is increased according to an amount of the EGR gas being reduced. Therefore, an amount of fuel can be increased. The maximum output of the engine 1 is advantageously enhanced.

Furthermore, the engine 1 adjusts an opening degree of the swirl control valve 56 as appropriate.

The state quantity of the combustion chamber 17 does not greatly change between when the operation state of the engine 1 is in the high load region and when the operation state of the engine 1 is the intermediate load region. Robustness of control of the engine 1 with respect to change of load on the engine 1 is enhanced.

As described above, the engine 1 performs SI combustion in the high load region. However, a problem arises that abnormal combustion such as preignition or knocking is likely to occur.

Therefore, the engine 1 is configured to avoid the abnormal combustion by fuel injection mode being properly designed for the high load region. Specifically, the ECU 10 outputs control signals to the fuel supply system 61 and the injector 6 such that fuel is injected into the combustion chamber 17 with high fuel pressure of 30 MPa or higher at timing in a period (hereinafter, the period is referred to as retard period) between the later stage of the compression stroke and the initial stage of the expansion stroke. The ECU 10 further outputs a control signal to the spark plug 25 such that the air-fuel mixture is ignited at timing at or near the compression top dead center after injection of fuel. In the below description, injection of fuel into the combustion chamber 17 with high fuel pressure at timing in the retard period is referred to as high-pressure retard injection.

In the high-pressure retard injection, a time for reaction of the air-fuel mixture is shortened to avoid abnormal combustion. That is, the time for reaction of the air-fuel mixture is a time obtained by addition of (1) a period (that is, injection period) in which the injector 6 injects fuel, (2) a period (that is, air-fuel mixture forming period) in which burnable air-fuel mixture is formed around the spark plug 25 after injection of fuel has ended, and (3) a period (that is, combustion period) up to the end of the SI combustion started by ignition.

When fuel is injected into the combustion chamber 17 with a high fuel pressure, the injection period and the air-fuel mixture forming period are each shortened. When the injection period and the air-fuel mixture forming period are shortened, timing at which injection of fuel starts can be close to ignition timing. In the high-pressure retard injection, fuel is injected into the combustion chamber 17 with a high pressure. Therefore, fuel injection is performed at timing in the retard period from the later stage of the compression stroke to the initial stage of the expansion stroke.

When fuel is injected into the combustion chamber 17 with a high fuel pressure, turbulent energy in the combustion chamber 17 becomes high. When the timing of fuel injection is made close to the compression top dead center, the SI combustion can be started in a state where the turbulent energy in the combustion chamber 17 is high. As a result, combustion period is shortened.

The high-pressure retard injection allows the injection period, the air-fuel mixture forming period, and the combustion period to be each shortened. As compared to a case where fuel is injected into the combustion chamber 17 in the intake stroke, the high-pressure retard injection allows a time for reaction of the air-fuel mixture to be greatly shortened. The high-pressure retard injection allows a time for reaction of the air-fuel mixture to be shortened, whereby abnormal combustion can be avoided.

In the technical field of the engine control, retarding of ignition timing has been conventionally performed in order to avoid abnormal combustion. However, when the ignition timing is retarded, fuel economy performance is degraded. In the high-pressure retard injection, ignition timing need not be retarded. By using the high-pressure retard injection, the fuel economy performance is improved.

When the fuel pressure is, for example, 30 MPa or higher, the injection period, the air-fuel mixture forming period, and the combustion period can be effectively shortened. The fuel pressure may be preferably set as appropriate according to the properties of fuel. The upper limit value of the fuel pressure may be, for example, 120 MPa.

When the number of revolutions of the engine 1 is small, time for which a crank angle is changed by the same angle is long. Therefore, shortening of a time in which air-fuel mixture can react, by the high-pressure retard injection, is particularly effective for avoiding abnormal combustion. Meanwhile, when the number of revolutions of the engine 1 is great, time for which a crank angle is changed by the same angle is short. Therefore, shortening of a time in which air-fuel mixture can react is not so effective for avoiding abnormal combustion.

Furthermore, in the high-pressure retard injection, injection of fuel into the combustion chamber 17 starts around the compression top dead center. Therefore, in the compression stroke, gas which does not contain fuel, in other words, gas having a high specific heat ratio is compressed in the combustion chamber 17. In a case where the number of revolutions of the engine 1 is great, when the high-pressure retard injection is performed, the temperature in the combustion chamber 17 at the compression top dead center, that is, the compression end temperature becomes high. When the compression end temperature becomes high, abnormal combustion such as knocking may be caused.

In the engine 1, the high load region (C) is divided into a first high load region (C1) on the low rotation side, and a second high load region (C2) in which the number of revolutions is higher than that in the first high load region (C1). When the high load region is divided into three equal regions that are a low rotation region, an intermediate rotation region, and a high rotation region, the first high load region may include the low rotation region and the intermediate rotation region. When the high load region is divided into the three equal regions that are the low rotation region, the intermediate rotation region, and the high rotation region, the second high load region may include the high rotation region.

In the first high load region, the injector 6 receives a control signal from the ECU 10, to perform the above-described high-pressure retard injection. In the second high load region, the injector 6 receives a control signal from the ECU 10, to perform fuel injection at predetermined timing in the intake stroke. The fuel injection in the intake stroke does not require a high fuel pressure. The ECU 10 outputs a control signal to the fuel supply system 61 such that the fuel pressure is lower than a fuel pressure in the high-pressure retard injection (for example, such that the fuel pressure is less than 40 MPa). By the fuel pressure being lowered, the mechanical resistance loss of the engine 1 is reduced, so that fuel economy is advantageously improved.

When fuel is injected into the combustion chamber 17 in the intake stroke, the specific heat ratio of gas in the combustion chamber 17 is reduced, whereby the compression end temperature becomes low. The compression end temperature becomes low, whereby the engine 1 is allowed to avoid abnormal combustion. The ignition timing need not be retarded in order to avoid abnormal combustion, whereby the spark plug 25 ignites air-fuel mixture at timing of or at timing near the compression top dead center in the second high load region, as in the first high load region.

In the first high load region, the high-pressure retard injection prevents occurrence of autoignition of the air-fuel mixture. Therefore, the engine 1 can perform stable SI combustion. In the second high load region, the fuel injection in the intake stroke prevents occurrence of autoignition of the air-fuel mixture. Therefore, the engine 1 can perform stable SI combustion.

(SPCCI Combustion)

Figure 8:
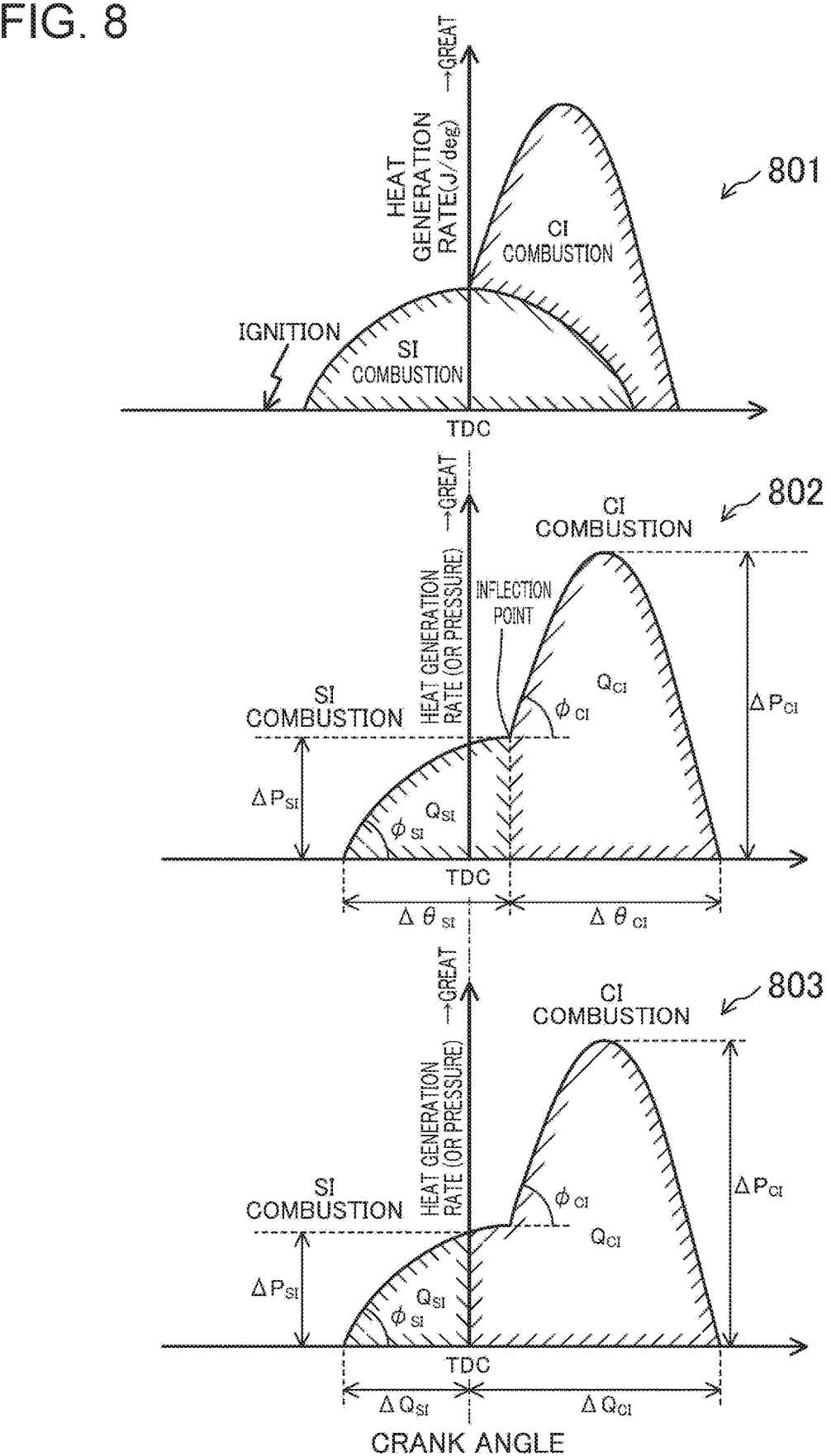
FIG. 8 conceptually illustrates, in the upper diagram, change of a heat generation rate in SPCCI combustion in which SI combustion and CI combustion are combined, illustrates, in the intermediate diagram, definition of an SI rate in SPCCI combustion, and illustrates, in the lower diagram, another definition of an SI rate in SPCCI combustion.

The SPCCI combustion will be described. FIG. 8 illustrates, in the upper diagram, a waveform 801 representing an example of change of a heat generation rate with respect to a crank angle in the SPCCI combustion. When the spark plug 25 ignites air-fuel mixture around the compression top dead center, more accurately, at predetermined timing before the compression top dead center, combustion by flame propagation starts. Heat generation at SI combustion is gentler than heat generation at CI combustion. Therefore, the waveform of the heat generation rate has a relatively small slope. A pressure variation (dp/dθ) in the combustion chamber 17 at the SI combustion is gentler than that at the CI combustion, which is not shown.

When the temperature and pressure in the combustion chamber 17 are enhanced by the SI combustion, autoignition of unburned air-fuel mixture occurs. In the example of the waveform 801, the slope of the waveform of the heat generation rate changes from small to large at or near the compression top dead center. That is, the waveform of the heat generation rate has an inflection point at timing when the CI combustion starts.

After the start of the CI combustion, the SI combustion and the CI combustion are performed in parallel. In CI combustion, heat generation is greater than in the SI combustion. Therefore, the heat generation rate becomes relatively great. However, the CI combustion is performed after the compression top dead center, and the piston 3 has been moved downward due to motoring. The slope of the waveform of the heat generation rate is prevented from becoming excessively great due to the CI combustion. dp/dθ at the CI combustion becomes relatively gentle.

dp/dθ can be used as an index representing combustion noise. As described above, dp/dθ can be reduced in the SPCCI combustion, so that the combustion noise can be prevented from becoming excessively great. Combustion noise can be reduced to an allowable level or lower level.

When the CI combustion ends, the SPCCI combustion ends. The combustion period of the CI combustion is shorter than that of the SI combustion. The combustion end time of the SPCCI combustion is advanced as compared to the SI combustion. In other words, in the SPCCI combustion, the combustion end time in the expansion stroke can be made close to the compression top dead center. The SPCCI combustion is more advantageous than the SI combustion in improvement of fuel economy performance of the engine 1.

Therefore, the SPCCI combustion enables both prevention of combustion noise and improvement of fuel economy performance.

An SI rate is defined as a parameter representing the characteristics of the SPCCI combustion. The SI rate is defined as an index that is associated with a ratio of an amount of heat generated by the SI combustion, to the total amount of heat generated by the SPCCI combustion. The SI rate is a ratio between amounts of heat generated by two combustions in different combustion modes. The SI rate may be a ratio of an amount of heat generated by the SI combustion to an amount of heat generated by the SPCCI combustion. For example, in the waveform 801, the SI rate can be represented as SI rate=(area of SI combustion)/(area of SPCCI combustion). In the waveform 801, the SI rate may be referred to as SI fuel rate to represent a rate of fuel which is combusted in the SI combustion.

The SI rate is a ratio between SI combustion and CI combustion in the SPCCI combustion in which the SI combustion and the CI combustion are combined. When the SI rate is high, the proportion of the SI combustion is high. When the SI rate is low, the proportion of the CI combustion is high.

The SI rate is not limited to one defined as described above. The SI rate may be variously defined. For example, the SI rate may be a ratio of an amount of heat generated by the SI combustion, to an amount of heat generated by the CI combustion. That is, in the waveform 801, the SI rate=(area of SI combustion)/(area of CI combustion) may be satisfied.

Furthermore, in the SPCCI combustion, a waveform of the heat generation rate has an inflection point at timing when the CI combustion starts. In the intermediate diagram of FIG. 8, as indicated by reference numeral 802, the inflection point in the waveform of the heat generation rate is set as a boundary, and a range on the advance side relative to the boundary may be defined as the SI combustion, and a range on the retard side relative to the boundary may be defined as the CI combustion. In this case, the SI rate may be represented as SI rate=$Q_{SI}/(Q_{SI}+Q_{CI})$ or SI rate=$Q_{SI}/Q_{CI}$ based on an area $Q_{SI}$ of the range on the advance side relative to the boundary and an area $Q_{CI}$ of the range on the retard side relative to the boundary, as indicated by hatching in the wavelength 802. Furthermore, the SI rate may be defined based on not the entirety but a part of the area of the range on the advance side relative to the boundary, and a part of the area of the range on the retard side relative to the boundary.

Furthermore, the SI rate may not be defined based on heat generation. The SI rate may be represented as SI rate=$\Delta\theta_{SI}/(\Delta\theta_{SI}+\Delta\theta_{CI})$ or SI rate=$\Delta\theta_{SI}/\Delta\theta_{CI}$ based on a crank angle $\Delta\theta_{SI}$ for the range on the advance side relative to the boundary and a crank angle $\Delta\theta_{CI}$ for the range on the retard side relative to the boundary.

Moreover, SI rate=$\Delta P_{SI}/(\Delta P_{SI}+\Delta P_{CI})$ or SI rate=$\Delta P_{SI}/\Delta P_{CI}$ may be defined based on a peak $\Delta P_{SI}$ of the heat generation rate in the range on the advance side relative to the boundary and a peak $\Delta P_{CI}$ of the heat generation rate in the range on the retard side relative to the boundary.

In addition, SI rate=$\varphi_{SI}/(\varphi_{SI}+\varphi_{CI})$ or SI rate=$\varphi_{SI}/\varphi_{CI}$ may be defined based on a slope $\varphi_{SI}$ of the heat generation rate in the range on the advance side relative to the boundary and a slope $\varphi_{CI}$ of the heat generation rate in the range on the retard side relative to the boundary.

In the description herein, the SI rate is defined, based on the waveform of the heat generation rate, from an area (that is, magnitude of an amount of generated heat), the length of the horizontal axis (that is, magnitude of crank angle), the length of the vertical axis (that is, magnitude of heat generation rate), or a slope (that is, change rate of heat generation rate). The SI rate may be defined based on a waveform of a pressure (P) in the combustion chamber 17, similarly from the area, the length of the horizontal axis, the length of the vertical axis, or the slope, which is not shown.

Furthermore, in the SPCCI combustion, the inflection point of the combustion waveform associated with the heat generation rate or pressure may not always appear clearly. The SI rate which is not based on the inflection point may be defined as follows. That is, in the lower diagram in FIG. 8, as indicated by reference numeral 803, in the combustion waveform, a range on the advance side relative to the compression top dead center (TDC) may be defined as the SI combustion, and a range on the retard side relative to the compression top dead center may be defined as the CI combustion. Based thereon, similarly as described above, the SI rate may be defined from the area ($Q_{SI}$, $Q_{CI}$), the length of the horizontal axis ($\Delta\theta_{SI}$, $\Delta\theta_{CI}$), the length of the vertical axis ($\Delta P_{SI}$, $\Delta P_{CI}$), or the slope ($\varphi_{SI}$, $\varphi_{CI}$).

Furthermore, the SI rate may be defined based on not a combustion waveform actually obtained in the combustion chamber 17 but an amount of fuel. As described below, in the intermediate load region in which the SPCCI combustion is performed, divided injection that includes preceding injection and succeeding injection may be performed. Fuel injected into the combustion chamber 17 by the succeeding injection does not diffuse in the combustion chamber 17 and is positioned near the spark plug 25 since a time from the injection to ignition is short. Therefore, the fuel injected into the combustion chamber 17 by the succeeding injection is combusted mainly by the SI combustion. Meanwhile, fuel injected into the combustion chamber 17 by the preceding injection is combusted mainly by CI combustion. Therefore, the SI rate can be defined based on an amount of fuel ($m_1$) injected by the preceding injection, and an amount of fuel ($m_2$) injected by the succeeding injection. That is, SI rate=$m_2/(m_1+m_2)$ may be defined or SI rate=$m_2/m_1$ may be defined.

(Stabilization of SPCCI Combustion)

A condition for stably performing the SPCCI combustion will be described. The inventors of the present invention have newly found through study that the SI combustion by the flame propagation needs to be stabilized before autoignition of air-fuel mixture occurs in order to appropriately perform the SPCCI combustion. When the SI combustion is unstable, the entirety of the combustion including the CI combustion is not stabilized.

One of factors associated with stability of the SI combustion is a turbulent combustion speed. When the turbulent combustion speed is high, the SI combustion is stabilized. The turbulent combustion speed is influenced by an air-fuel ratio (or excess air ratio $\lambda$) of air-fuel mixture, an EGR ratio (that is, dilution rate) of the air-fuel mixture, a temperature and a pressure in the combustion chamber, turbulent energy in the combustion chamber, or the like.

The inventors of the present invention have examined, through simulation, an excess air ratio $\lambda$ of air-fuel mixture, a dilution rate (in the description herein, G/F that is a weight ratio between the total gas and fuel in the combustion chamber) of the air-fuel mixture, a temperature and a pressure in the combustion chamber, and turbulent energy in the combustion chamber, for obtaining a turbulent combustion speed necessary for assuring stability of the SI combustion. The condition for the simulation is a condition that the engine operates with a low load, and only internal EGR gas is introduced into the combustion chamber, to make the temperature in the combustion chamber as high as possible.

From the viewpoint of assuredly avoiding great combustion noise caused by knocking, the lower limit of the G/F of air-fuel mixture is 18. That is, when the G/F of air-fuel mixture is reduced, even if autoignition of unburned air-fuel mixture occurs, this phenomenon can be regarded as knocking. Furthermore, when a three-way catalyst is used for combusting such a lean air-fuel mixture in order to prevent NOx emissions, the excess air ratio $\lambda$ of the air-fuel mixture is 1.0±0.2.

From the viewpoint of enhancing fuel economy performance of the engine, the G/F of air-fuel mixture is preferably great. Therefore, the inventors of the present invention have examined a relationship between the G/F of air-fuel mixture and turbulent energy necessary for obtaining a desired turbulent combustion speed as shown in the upper diagram of FIG. 13 (graph of reference numeral 1301). The engine operates at 2000 rpm as the number of revolutions with a low load. Furthermore, internal EGR gas is introduced into the combustion chamber. The closing time of the intake valve is 91° ABDC. The geometrical compression ratio of the engine is 18.

According to graph 1301, when $\lambda$ of the air-fuel mixture is 1.2, the characteristic line of the G/F is like a saturation curve representing saturation at about 30. Meanwhile, when the number of revolutions of the engine is 2000 rpm, turbulent energy of 40 $m^2/s^2$ can be obtained. It has been newly found that, even if the turbulent energy is obtained so as to be greater than 40 $m^2/s^2$, the G/F of the air-fuel mixture is not likely to be greater than 30. According to graph 1301, the upper limit of the G/F of air-fuel mixture is 30 in order to assure stability of the SI combustion.

According to the above-described examination, the G/F of air-fuel mixture needs to be set in a range from 18 to 30. According to graph 1301, when $\lambda$ of the air-fuel mixture is 1.0 or 1.2, and the range of the G/F is in a range from 18 to 30, the range of the turbulent energy necessary for stabilizing the SI combustion is 17 to 40 $m^2/s^2$.

Figure 13:
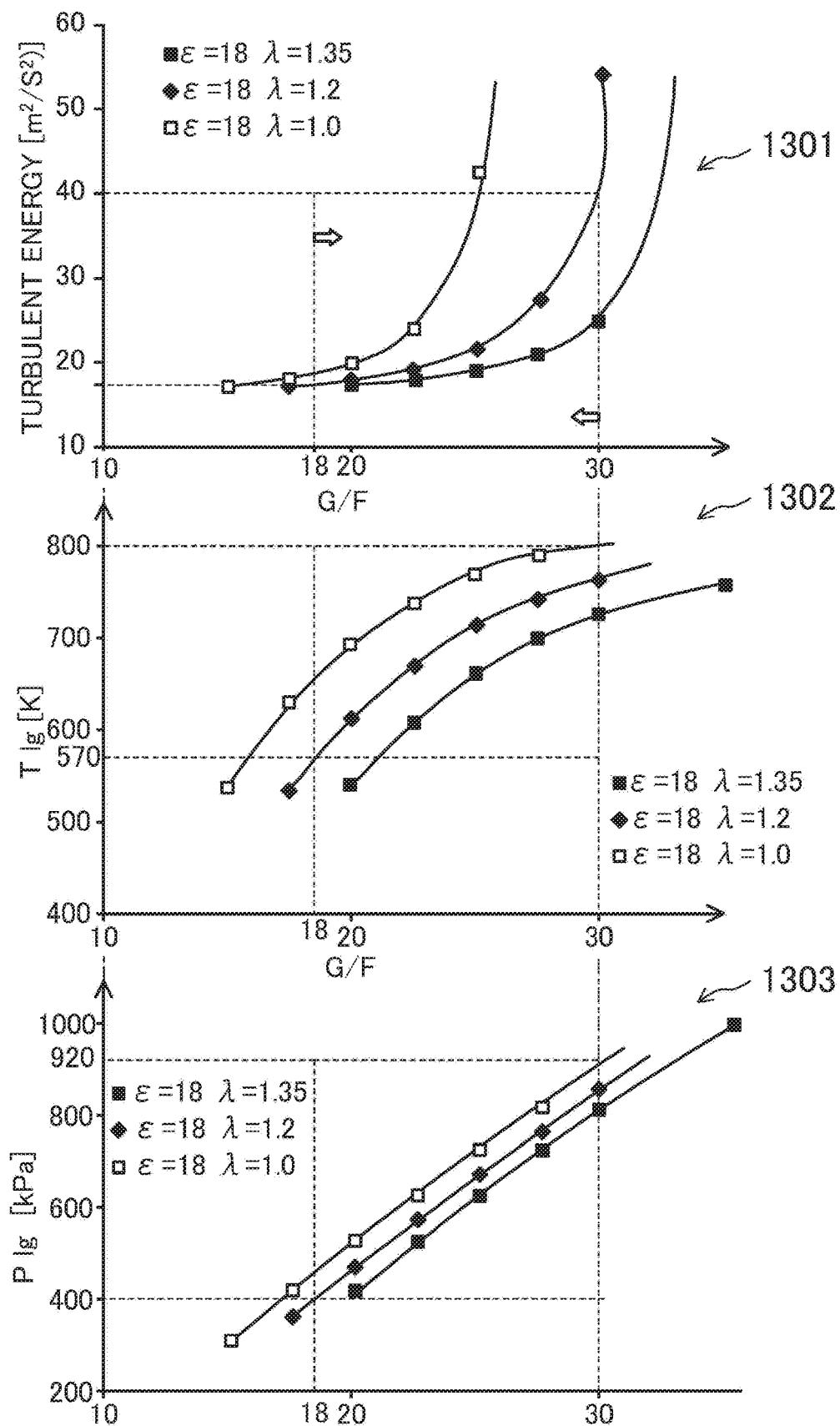
FIG. 13 illustrates, in the upper diagram, a relationship between a G/F of air-fuel mixture, and turbulent energy necessary for obtaining a desired turbulent combustion speed, illustrates, in the intermediate diagram, a relationship between a G/F of air-fuel mixture and temperature in the combustion chamber for obtaining the necessary turbulent energy illustrated in the upper diagram, and illustrates, in the lower diagram, a relationship between a G/F of air-fuel mixture and pressure in the combustion chamber for obtaining the necessary turbulent energy illustrated in the upper diagram.

FIG. 13 illustrates, in the intermediate diagram, a relationship, between a temperature at ignition timing and the G/F of air-fuel mixture in the combustion chamber, which is necessary for obtaining a desired turbulent combustion speed (graph of reference numeral 1302), under the same condition as in graph 1301. According to graph 1302, when $\lambda$ of the air-fuel mixture is 1.0 or 1.2, and the G/F is in a range from 18 to 30, a necessary temperature Tlg (K) in the combustion chamber at ignition timing is 570 to 800 K.

FIG. 13 illustrates, in the lower diagram, a relationship, between pressure at ignition timing and the G/F of air-fuel mixture in the combustion chamber, which is necessary for obtaining a desired turbulent combustion speed (graph of reference numeral 1303), under the same condition as in graph 1301. According to graph 1303, when $\lambda$ of the air-fuel mixture is 1.0 or 1.2, and the G/F is in a range from 18 to 30, a necessary pressure PIg (kPa) in the combustion chamber at ignition timing is 400 to 920 kPa.

Even if the geometrical compression ratio of the engine is changed in a range of 13 to 20, influence on a relationship between the G/F of air-fuel mixture, and turbulent energy which is necessary for obtaining a desired turbulent combustion speed, is little, which is not shown.

FIG. 13 illustrates a result of simulation in the case of the number of revolutions of the engine being 2000 rpm. When the number of revolutions of the engine is great, flow of gas in the combustion chamber becomes strong, so that a desired turbulent combustion speed is likely to be obtained. The ranges of numerical values of the G/F of air-fuel mixture, and the necessary temperature TIg and the necessary pressure PIg in combustion chamber, as described above, are not limited for a specific operation state of the engine.

In the SPCCI combustion, as described above, timing of autoignition is controlled by SI combustion. Timing of autoignition needs to change according to ignition timing being changed in order to accurately control timing of autoignition such that autoignition of unburned air-fuel mixture occurs at target timing. Sensitivity for change of timing of autoignition with respect to change of ignition timing, is preferably high.

Figure 14:
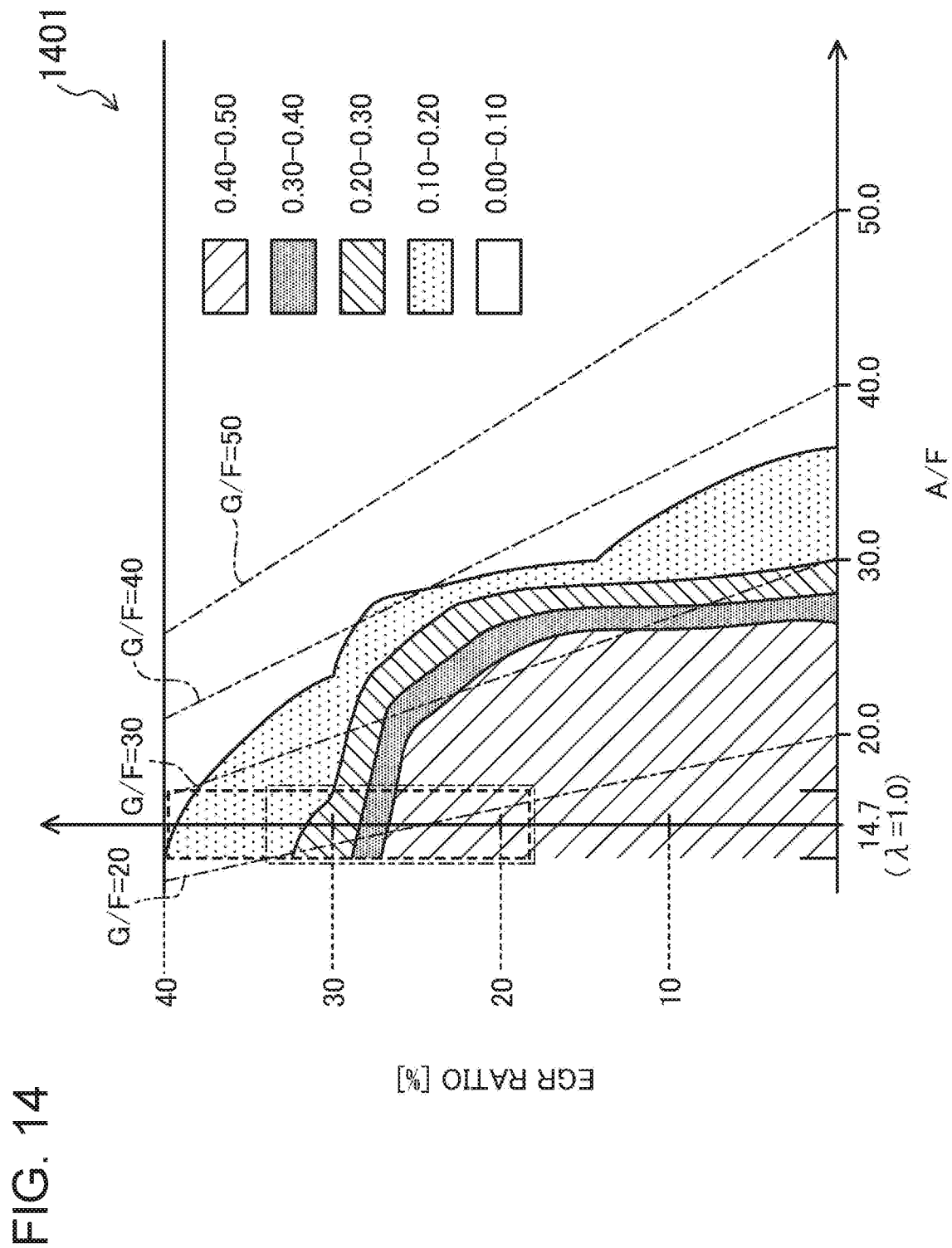
FIG. 14 is a contour view illustrating a contour on a plane in which the vertical axis represents an EGR ratio of air-fuel mixture and the horizontal axis represents an A/F of the air-fuel mixture, illustrating a change rate of change of autoignition timing with respect to change of ignition timing in SPCCI combustion.

FIG. 14 is a contour view 1401 showing a change rate of change of autoignition timing with respect to change of ignition timing (=(change of crank angle at autoignition timing)/(change of crank angle at ignition timing)), which is obtained by an experiment. The change rate represents a magnitude of change, of a crank angle at autoignition timing, obtained when ignition timing is changed by 1° as a crank angle. The greater the value of the change rate is, the higher the sensitivity for change of timing of autoignition with respect to change of ignition timing is. The less the value of the change rate is, the lower the sensitivity for change of timing of autoignition with respect to change of ignition timing is.

In contour view 1401, the vertical axis represents an EGR ratio of air-fuel mixture, and the horizontal axis represents an A/F of air-fuel mixture. Sensitivity for change of timing of autoignition with respect to change of ignition timing is reduced toward the upper right portion in the view. Sensitivity for change of timing of autoignition is enhanced toward the lower left portion in the view. In the contour view 1401, it is found that, in a range, enclosed by a broken line, in which λ of the air-fuel mixture is 1.0±0.2 and the G/F is in a range from 18 to 30, timing of autoignition is changed, with high sensitivity, with respect to change of ignition timing. The upper limit of the EGR ratio is preferably 40% from the viewpoint of combustion stability.

That is, when a state inside the combustion chamber is such that λ of air-fuel mixture is 1.0±0.2 and the G/F is in a range from 18 to 30, SI combustion is stabilized, so that autoignition of unburned air-fuel mixture can be caused to accurately occur at target timing in the SPCCI combustion.

In the above-described examination, the G/F of air-fuel mixture is 30 at the maximum. Meanwhile, the inventors of the present invention have considered that a dilution rate of air-fuel mixture is enhanced in order to further improve fuel economy performance.

The inventors of the present invention have paid attention to stratifying of the G/F of air-fuel mixture in the combustion chamber since SPCCI combustion is a combination of SI combustion and CI combustion. That is, SI combustion in SPCCI combustion is combustion of air-fuel mixture ignited by the spark plug 25. The air-fuel mixture near the spark plug 25 is combusted mainly by SI combustion. Meanwhile, CI combustion in SPCCI combustion is combustion of unburned air-fuel mixture by autoignition after start of SI combustion. The surrounding air-fuel mixture, which is distant from the spark plug 25, is combusted mainly by CI combustion.

For example, when strong swirl flow is generated in the combustion chamber 17, residual gas (that is, burned gas) in the cavity 31 in the top surface of the piston 3 can be expelled to the outside of the cavity 31. When combustion is almost uniformly distributed over the entirety of the combustion chamber 17, the G/F of air-fuel mixture near the spark plug 25 becomes relatively small according to residual gas being not in the cavity 31, and the G/F of surrounding air-fuel mixture which is distant from the spark plug 25 becomes relatively great according to residual gas being contained. The G/F of air-fuel mixture in the combustion chamber 17 can be stratified.

Figure 15:
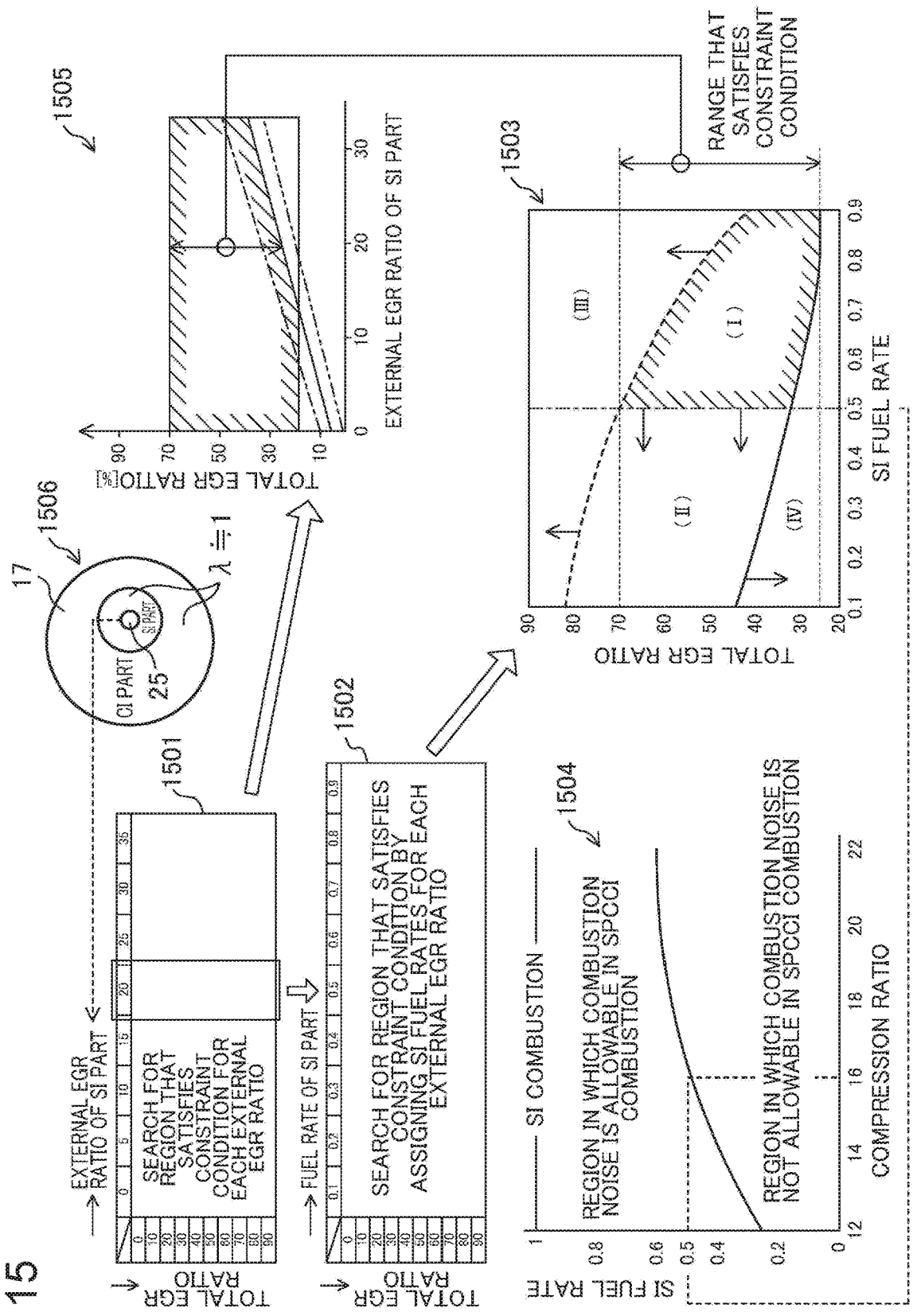
FIG. 15 illustrates a method for considering a relationship, between an external EGR ratio of an SI part and a total EGR ratio in the entirety of the combustion chamber, which is necessary for causing SPCCI combustion in a state where a G/F of air-fuel mixture stratifies in the combustion chamber.

The inventors of the present invention have examined, through simulation, a condition in which the SPCCI combustion is stabilized in a state where the G/F of air-fuel mixture is stratified, according to the procedure shown in FIG. 15. In the simulation, as schematically indicated by reference numeral 1506 in FIG. 15, the combustion chamber 17 is imaginarily sectioned into an SI part which is near the spark plug 25 and a CI part around the SI part, and the G/F of air-fuel mixture is defined for each of the SI part and the CI part. Each of the excess air ratio λ of air-fuel mixture of the SI part and the excess air ratio λ of air-fuel mixture of the CI part is 1. Furthermore, the G/F of the SI part is less than the G/F of the CI part.

In the simulation, the inventors of the present invention have firstly assumed the following three constraint conditions (1) to (3) as constraint conditions for stably performing the SPCCI combustion.

Constraint condition (1): according to a result from the upper diagram in FIG. 13, a condition that the G/F of air-fuel mixture of the SI part is 22 or less is set as the condition for stably performing SI combustion. The SI part corresponds to air-fuel mixture that does not contain residual gas and contains external EGR gas as described above. Therefore, the constraint condition (1) that the G/F of air-fuel mixture of the SI part is 22 or less can be, in other words, a condition that the external EGR ratio is 34% or less.

Constraint condition (2): the G/F of air-fuel mixture of the CI part is less than 100, and a temperature of the CI part is higher than 1050 K when the compression top dead center is reached in the combustion chamber. As compared to SI combustion, combustion is stabilized in CI combustion even if the air-fuel mixture is diluted. However, there is a limitation on the dilution rate of air-fuel mixture. According to the experiment performed by the inventors of the present invention, when the G/F of air-fuel mixture is less than 100, a desired combustion stability can be assured in a state where the center of gravity of combustion is in a range from the compression top dead center to 10° CA after the top dead center, in the CI combustion.

Furthermore, the temperature, at autoignition, of fuel that contains gasoline is 1050 K in general. This has been confirmed in the experiment performed by the inventors of the present invention. Therefore, when the G/F of air-fuel mixture of the CI part is less than 100, and the temperature of the CI part at the compression top dead center is higher than 1050 K, CI combustion can be stabilized.

Constraint condition (3): since the SPCCI combustion is a combination of SI combustion and CI combustion, when the proportion of the SI combustion is great, the proportion of the CI combustion becomes small, and, when the proportion of the SI combustion is small, the proportion of the CI combustion becomes great. When the proportion of the SI combustion becomes excessively small, the proportion of the CI combustion becomes excessively great, resulting in combustion noise being increased. The proportion (that is, the above-described SI rate) of SI combustion to SPCCI combustion is represented by "SI fuel rate" as a rate of fuel combusted by SI combustion. When only SI combustion is performed in the SPCCI combustion, the SI fuel rate is 1. In the SPCCI combustion, according to the proportion of SI combustion being reduced, the SI fuel rate is gradually reduced to be less than 1.

FIG. 15 illustrates, in a graph of reference numeral 1504, a region in which combustion noise indicates an allowable value or less in the SPCCI combustion, and a region in which combustion noise is greater than the allowable value in the SPCCI combustion, in the relationship between a compression ratio of the engine 1 and the SI fuel rate. As indicated in graph 1504, in the SPCCI combustion, unless the SI fuel rate is increased to some degree or higher degree, combustion noise cannot be reduced so as to indicate the allowable value or less, regardless of the compression ratio of the engine. A specific value of the allowable value of combustion noise can be determined as appropriate. In the graph 1504, the greater the compression ratio of the engine is, the higher the temperature in the combustion chamber at the compression top dead center is, and CI combustion may be steep. Therefore, unless the SI fuel rate is increased, the combustion noise cannot be reduced to the allowable value or less. When the compression ratio of the engine is small, the temperature in the combustion chamber at the compression top dead center becomes low, and the CI combustion is not steep. Therefore, even when the SI fuel rate is small, the combustion noise can be reduced to the allowable value or less.

In this examination, as indicated in a matrix of reference numeral 1501 in FIG. 15, two parameters that are the EGR ratio of the SI part, and the total EGR ratio in the entirety of the combustion chamber are changed, to search for a range that satisfies the above-described constraint conditions (1) to (3). In the illustrated example, the external EGR ratio is changed in increments of 5%, and the total EGR ratio is changed in increments of 10%. The increments for the change of the EGR ratio can be set as appropriate. The searching is performed such that, for example, the external EGR ratio is fixed to a certain value, and, while the total EGR ratio is changed, a range of the total EGR ratio that satisfies the constraint conditions (1) to (3) is searched for. While the value of the external EGR ratio is changed, the searching is repeated.

The SI fuel rate in the SPCCI combustion is changed without changing the relationship between the EGR ratio of the SI part and the total EGR ratio, whereby the above-described constraint conditions (1) to (3) can be satisfied. As indicated in a matrix of reference numeral 1502, the SI fuel rate is changed with respect to the one vertical column in the matrix 1501 (that is, for each value of the external EGR ratio), thereby searching for a range of the total EGR ratio which satisfies the constraint conditions (1) to (3).

FIG. 15 illustrates, in a graph of reference numeral 1503, a searching result in the matrix 1502. The graph 1503 represents an example of a searching result in the case of the compression ratio of the engine being 16 and the external EGR ratio being 20%. In the graph 1503 in which the horizontal axis represents an SI fuel rate, and the vertical axis represents the total EGR ratio, a region (II) is a region, to the left of an alternate long and short dash line, in which the SI fuel rate is 0.5 or less. This region corresponds to the lower limit of the SI fuel rate at which combustion noise is allowable in the SPCCI combustion when the compression ratio of the engine is 16, as indicated in the graph 1504. That is, the region (II) is a region that does not satisfy the constraint condition (3). The region (II) corresponds to a region in which combustion noise is greater than the allowable value since the proportion of the SI combustion is small in the SPCCI combustion.

A region (III) is a region above the broken line in the graph 1503. The region is a region in which the total EGR ratio is great. In the region (III), the G/F of air-fuel mixture of the CI part is excessively great, whereby combustion stability cannot be assured in the CI combustion of the SPCCI combustion. That is, the region (III) is a region that does not satisfy the constraint condition (2).

A region (IV) is a region below the solid line in the graph 1503. This region is a region in which the total EGR ratio is small. In the region (IV), the temperature of the CI part at the compression top dead center is low, and autoignition of air-fuel mixture of the CI part is not stably performed in the SPCCI combustion. That is, the region (IV) is also a region that does not satisfy the constraint condition (2).

A region (I) in the graph 1503 is a region that satisfies the constraint conditions (2) and (3).

As described above, according to the matrix 1501, the matrix 1502, and the graph 1503, while the SI fuel rate is changed for each external EGR ratio, a range of the total EGR ratio which satisfies the constraint conditions is searched for. As a result, as an example of a searching result of the matrix 1501, a graph of reference numeral 1505 in FIG. 15 can be obtained. The graph 1505 represents a region that satisfies the constraint conditions (1) to (3), on a plane in which the horizontal axis represents the external EGR ratio of the SI part, and the vertical axis represents the total EGR ratio. The graph 1503 and the graph 1505 represent a range of the total EGR ratio that satisfies the constraint conditions in a certain external EGR ratio (in the illustrated example, the EGR ratio is 20%) as indicated by double headed arrows in FIG. 15.

Figure 16:
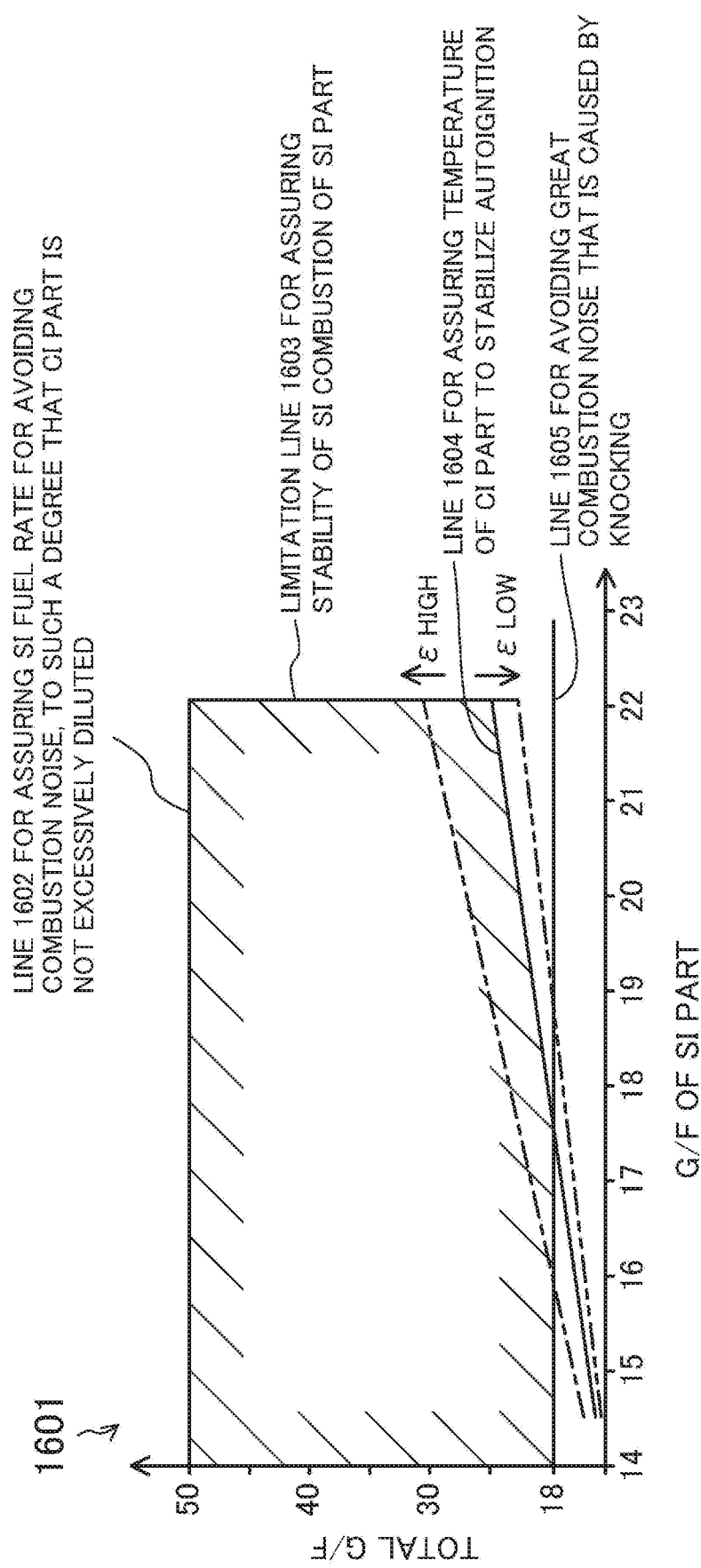
FIG. 16 illustrates a relationship, between the G/F of the SI part and the G/F in the entirety of the combustion chamber, which is necessary for causing SPCCI combustion in a state where the G/F of air-fuel mixture stratifies in the combustion chamber.

FIG. 16 illustrates a relationship, between the G/F (horizontal axis) of the SI part and the total G/F (vertical axis) in the entirety of the combustion chamber, which allows the SPCCI combustion to be stably performed in a state where the G/F of air-fuel mixture stratifies. FIG. 16 illustrates a graph 1601 obtained when the EGR ratio in the graph 1505 in FIG. 15 is replaced with the G/F for both the vertical axis and the horizontal axis. The hatched region in the graph 1601 is a region that satisfies the constraint conditions. When the relationship between the G/F of the SI part and the total G/F in the combustion chamber is in this region, the SPCCI combustion is stabilized.

A line 1602 on the upper side of the region shown in the graph 1601 corresponds to a line for assuring the SI fuel rate that allows combustion noise to be avoided by serving as a limitation line above which the CI part is excessively diluted and CI combustion is not stabilized. Furthermore, a line 1603 on the right side of the region corresponds to a limitation line for assuring stability of the SI combustion in the SI part (that is, a line for allowing the constraint condition (1) to be satisfied). A line 1604 on the lower side of the region is a line for allowing a temperature of the CI part to be assured and allowing autoignition to be stabilized. The line is a straight line that extends in the upper right direction in the graph 1601. The line shifts upward as indicated by the alternate long and short dash line when the compression ratio c of the engine is increased, and shifts downward as indicated by the alternate long and two short dashes line when the compression ratio c of the engine is reduced.

In the graph 1601, a line 1605 is further added. The line 1605 is a line for allowing great combustion noise due to knocking to be avoided, and satisfies G/F=18 as illustrated also in FIG. 13. The line 1605 intersects the line 1604 described above. As described above, above the line 1604, normal combustion noise satisfies the allowable value in the SPCCI combustion. However, when the total EGR ratio is below the line 1605, knocking (abnormal combustion) may occur, so that the line 1605 needs to be prioritized.

According to the above-described examination, the G/F in the combustion chamber stratifies, whereby the total G/F for stabilizing the SPCCI combustion is in a range from 18 to 50. At this time, the G/F of the SI part is in a range from 14 to 22. When the G/F of the SI part is great, the total G/F needs to be great in order to stabilize the SPCCI combustion. Furthermore, when the compression ratio c of the engine 1 is great, the total G/F needs to be increased as compared to when the compression ratio c is small, in order to stabilize the SPCCI combustion.

When the G/F stratifies, the air-fuel mixture can be further diluted as compared to the range of the G/F which is shown in FIG. 13. Therefore, fuel economy performance of the engine is advantageously improved. The G/F can stratify by, for example, strong swirl flow being generated in the combustion chamber 17, the shape of the combustion chamber 17 being properly designed, or combination thereof being used.

In a case where the G/F in the combustion chamber stratifies, the air-fuel mixture of the SI part is set to have an excess air ratio $\lambda$ of 1.0±0.2 and the EGR ratio of 34% or less. As enclosed by the alternate long and two short dashes line in FIG. 14, when air-fuel mixture satisfies the excess air ratio $\lambda \approx 1$ and has the EGR ratio of 34% or less, sensitivity for change of timing of autoignition with respect to change of ignition timing is high. That is, in a case where the G/F in the combustion chamber stratifies, the total G/F is in a range from 18 to 50, the G/F of the SI part is in a range from 14 to 22, and the excess air ratio $\lambda \approx 1$ in the entirety of the combustion chamber is satisfied, timing of autoignition can be accurately changed with respect to change of ignition timing in the SPCCI combustion.

(Operation Control of Engine)

The engine 1 switches between the SI combustion and the SPCCI combustion according to the operation state in the operation region map 701. The engine 1 also changes the SI rate according to the operation state of the engine 1. Thus, both inhibition of generation of combustion noise and improvement of fuel economy can be achieved.

Figure 9:
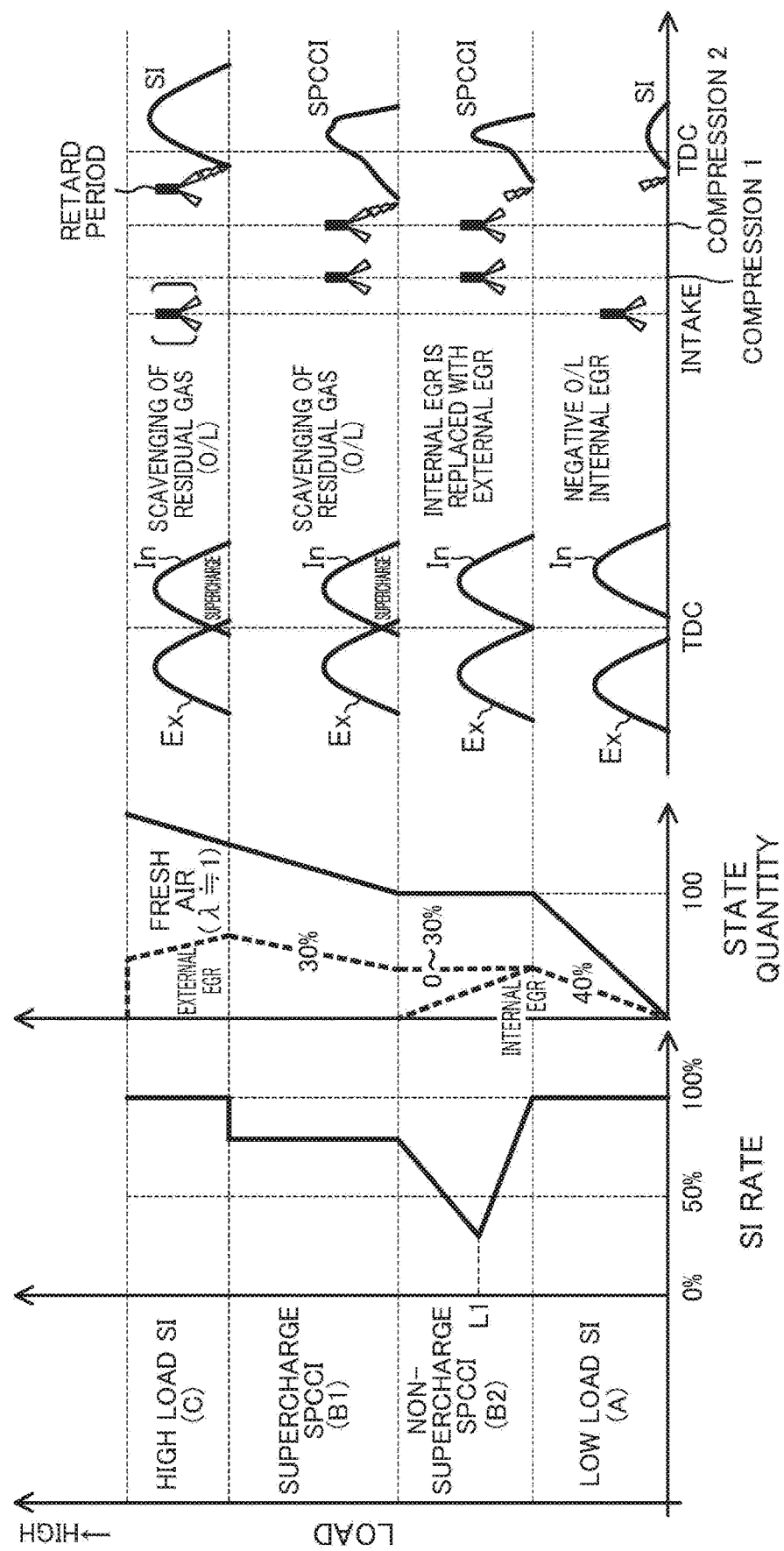
FIG. 9 illustrates change of an SI rate, change of a state quantity in the combustion chamber, change of an overlap period of an intake valve and an exhaust valve, and changes of fuel injection timing and ignition timing, according to whether load on the engine is high or low.

FIG. 9 illustrates change of the SI rate, change of a state quantity in the combustion chamber 17, change of an opening period of the intake valve and an opening period of the exhaust valve, and change of fuel injection timing and ignition timing, according to whether the load on the engine 1 is high or low. FIG. 9 corresponds to the operation region map 701 shown in FIG. 7. Hereinafter, operation control of the engine 1 will be described on the assumption that load on the engine 1 is gradually enhanced at a predetermined number of revolutions.

(Low load region (low load SI combustion))

In the low load region (A), the engine 1 performs low load SI combustion. When the operation state of the engine 1 is in the low load region, the SI rate is constantly 100%.

In the low load region, as described above, the G/F of air-fuel mixture is made constant between 18 and 50. In the engine 1, fresh air and burned gas are introduced, in amounts corresponding to an amount of fuel, into the combustion chamber 17. An amount of fresh air to be introduced is adjusted by throttling and/or Miller cycle as described above. Since a dilution rate is high, the temperature in the combustion chamber 17 is enhanced in order to stabilize SI combustion. In the engine 1 in the low load region, internal EGR gas is introduced into the combustion chamber 17. An opening degree of the swirl control valve 56 is adjusted as appropriate.

The internal EGR gas is introduced into the combustion chamber 17 (that is, burned gas is confined in the combustion chamber 17) by setting a negative overlap period in which the intake valve 21 and the exhaust valve 22 are both closed around the exhaust top dead center. The length of the negative overlap period is set as appropriate by an opening time of the intake valve 21 being adjusted by the intake electric S-VT 23, and an opening time of the exhaust valve 22 being adjusted by the exhaust electric S-VT 24, whereby an amount of the internal EGR gas is adjusted. The internal EGR gas may be introduced into the combustion chamber 17 by setting a positive overlap period in which both the intake valve 21 and the exhaust valve 22 are opened.

In the low load region, an amount for filling the combustion chamber 17 is adjusted to be less than 100%. As an amount of fuel is increased, an amount of fresh air and an amount of the internal EGR gas which are to be introduced into the combustion chamber 17 are gradually increased. The EGR ratio in the low load region is, for example, 40%.

The injector 6 injects fuel into the combustion chamber 17 in the intake stroke. In the combustion chamber 17, homogeneous air-fuel mixture having the excess air ratio $\lambda$ of 1.0±0.2 and the G/F of 18 to 50 is formed. The excess air ratio $\lambda$ is preferably 1.0 to 1.2. At predetermined timing before the compression top dead center, the spark plug 25 ignites the air-fuel mixture, whereby the air-fuel mixture is combusted by flame propagation without causing autoignition.

(Second Intermediate Load Region (Non-Supercharge SPCCI Combustion))

When load on the engine 1 becomes high and the operation state enters the second intermediate load region (B2), the engine 1 switches from the low load SI combustion to non-supercharge SPCCI combustion. The SI rate is less than 100%. An amount of fuel is increased according to load on the engine 1 being increased. In the second intermediate load region, when the load is low, the proportion of CI combustion is increased according to an amount of fuel being increased. The SI rate is gradually reduced according to load on the engine 1 being increased. The SI rate is reduced to a predetermined value (lowest value) that is 50% or less, in the example shown in FIG. 9.

Since an amount of fuel is increased, a temperature of combustion becomes high in the second intermediate load region. When the temperature in the combustion chamber 17 is excessively high, heat generation at the start of CI combustion is intense. In this case, combustion noise is increased.

Therefore, in the second intermediate load region, a ratio between the internal EGR gas and the external EGR gas is changed with respect to change of load on the engine 1 in order to adjust a temperature in the combustion chamber 17 before start of compression. That is, according to load on the engine 1 being increased, hot internal EGR gas is gradually reduced, and cooled external EGR gas is gradually increased. The negative overlap period is changed from the maximum to zero as the load is increased in the second intermediate load region. The internal EGR gas becomes zero when the load is highest in the second intermediate load region. The same applies to a case where a positive overlap period of the intake valve 21 and the exhaust valve 22 is set. A temperature in the combustion chamber 17 is adjusted by the overlap period being adjusted, resulting in the SI rate in the SPCCI combustion being able to be adjusted.

An opening degree of the EGR valve 54 is changed in the second intermediate load region such that the external EGR gas is increased as the load is increased. An amount of the external EGR gas to be introduced into the combustion chamber 17 is adjusted so as to be, for example, 0 to 30% when represented as the EGR ratio. In the second intermediate load region, the EGR gas is replaced such that the internal EGR gas is replaced with the external EGR gas according to load on the engine 1 being increased. Also by adjusting the EGR ratio, the temperature in the combustion chamber 17 is adjusted. Therefore, the SI rate in the SPCCI combustion can be adjusted.

An amount of EGR gas to be introduced into the combustion chamber 17 is sequential between the low load region and the second intermediate load region. In a region, of the second intermediate load region, in which load is low, similarly to the low load region, a large amount of internal EGR gas is introduced into the combustion chamber 17. Since the temperature in the combustion chamber 17 becomes high, when load on the engine 1 is low, autoignition of air-fuel mixture assuredly occurs. In a region, of the second intermediate load region, in which load is high, external EGR gas is introduced into the combustion chamber 17. Since the temperature in the combustion chamber 17 becomes low, when load on the engine 1 is high, combustion noise caused by CI combustion can be reduced.

In the second intermediate load region, an amount for filling the combustion chamber 17 is 100%. The opening degree of the throttle valve 43 is a fully opened degree. An amount of EGR gas which is the sum of internal EGR gas and external EGR gas is adjusted, whereby an amount of fresh air to be introduced into the combustion chamber 17 is adjusted so as to correspond to an amount of fuel.

In non-supercharge SPCCI combustion, as the proportion of the CI combustion is increased, timing of autoignition is advanced. If the timing of autoignition is earlier than the compression top dead center, heat generation at the start of CI combustion is intense. In this case, combustion noise is increased. Therefore, when load on the engine 1 reaches a predetermined load L1, the engine 1 gradually increases the SI rate according to load on the engine 1 being increased.

That is, as an amount of fuel is increased, the engine 1 increases the proportion of SI combustion. Specifically, as shown in the upper diagram of FIG. 10, in non-supercharge SPCCI combustion, as an amount of fuel is increased, ignition timing is gradually advanced. As described above, an amount of internal EGR gas to be introduced is reduced and an amount of external EGR gas to be introduced is increased, whereby the temperature in the combustion chamber 17 is adjusted. Therefore, even if the SI rate is increased according to an amount of fuel being increased, enhancement in temperature at the compression top dead center can be inhibited. Change of the slope of the heat generation rate in the SI combustion is little even if load is increased. When the ignition timing is advanced, an amount of heat generated by the SI combustion is increased according to start of the SI combustion becoming earlier.

As a result of enhancement in temperature in the combustion chamber 17 by the SI combustion being inhibited, autoignition of unburned air-fuel mixture occurs at timing at or after the compression top dead center. Since an amount of heat generated by the SI combustion is increased, heat generation in the CI combustion is almost the same even if load on the engine 1 is increased. Therefore, the SI rate is set to be gradually increased according to load on the engine 1 being increased, whereby increase of combustion noise can be avoided. The higher load is, the more greatly the center of gravity of combustion in non-supercharge SPCCI combustion is retarded.

In the second intermediate load region, the swirl control valve 56 is fully closed or opened to a predetermined opening degree on the closing side. In the combustion chamber 17, strong swirl flow is formed at a swirl ratio of 4 or greater. Thus, residual gas in the cavity 31 is expelled to the outside of the cavity 31.

In the second intermediate load region, the injector 6 injects fuel into the combustion chamber 17 in two parts as preceding injection and succeeding injection in the compression stroke. In the preceding injection, fuel is injected at timing that is not close to the ignition timing. In the succeeding injection, fuel is injected at timing close to the ignition timing. When the injector 6 performs the preceding injection, since the piston 3 is distant from the top dead center, the injected fuel spray reaches the outside of the cavity 31 on the top surface of the piston 3 that is being moved toward the top dead center in the upward direction. A squish area 171 is formed in a region outside the cavity 31 (see FIG. 2). Fuel injected in the preceding injection is accumulated in the squish area 171 while the piston 3 is moving upward, to form air-fuel mixture in the squish area 171.

When the injector 6 performs the succeeding injection, since the piston 3 is positioned close to the top dead center, the injected fuel spray enters the cavity 31. The fuel injected in the succeeding injection forms air-fuel mixture in a region inside the cavity 31. The "region inside the cavity 31" may be a region obtained by addition of a region inside the cavity 31, and a region up to the opening of the cavity 31 from a projected surface obtained by the opening of the cavity 31 being projected on the roof of the combustion chamber 17. The region inside the cavity 31 may be referred to as a region, other than the squish area 171, in the combustion chamber 17. Fuel is almost uniformly distributed over the entirety of the combustion chamber 17.

Gas flows in the region inside the cavity 31 according to fuel being injected into the cavity 31 in succeeding injection. The turbulent energy in the combustion chamber 17 is attenuated according to progress of the compression stroke when a time up to the ignition timing is long. However, the injection timing in the succeeding injection is closer to the ignition timing than the injection timing in the preceding injection. Therefore, the spark plug 25 can ignite air-fuel mixture in the region inside the cavity 31 in a state where the turbulent energy in the cavity 31 remains high. Thus, a combustion speed in the SI combustion is enhanced. When the combustion speed in the SI combustion is enhanced, the SI combustion is stabilized, whereby controllability of the CI combustion by the SI combustion is enhanced.

In the entirety of the combustion chamber 17, air-fuel mixture has the excess air ratio $\lambda$ of $1.0\pm0.2$ and the G/F of 18 to 50. The residual gas has been expelled from the cavity 31, whereby the G/F of air-fuel mixture near the spark plug 25 is 14 to 22. The G/F in the combustion chamber 17 stratifies. Meanwhile, since fuel is almost uniformly distributed, improvement of fuel economy by reduction of unburned fuel loss, and improvement of exhaust gas performance by avoiding generation of smoke, can be achieved. In the entirety of the combustion chamber 17, the excess air ratio $\lambda$ is preferably 1.0 to 1.2.

At predetermined timing before the compression top dead center, the spark plug 25 ignites air-fuel mixture, whereby the air-fuel mixture is combusted by flame propagation. Thereafter, autoignition of the unburned air-fuel mixture occurs at target timing, to cause CI combustion. The fuel injected in the succeeding injection is subjected mainly to SI combustion. The fuel injected in the preceding injection is subjected mainly to CI combustion. Since the preceding injection is performed in the compression stroke, abnormal combustion such as preignition can be prevented from being caused by the fuel injected in the preceding injection. Furthermore, fuel injected in the succeeding injection can be stably combusted by flame propagation. The G/F of air-fuel mixture in the combustion chamber 17 stratifies, and the G/F in the entirety of the combustion chamber 17 is set to 18 to 50, whereby the SPCCI combustion can be stably performed.

(First Intermediate Load Region (Supercharge SPCCI Combustion))

When load on the engine 1 is further increased and the operation state of the engine 1 thus enters the first intermediate load region (B1), the supercharger 44 performs supercharging with fresh air and external EGR gas. An amount of fresh air and an amount of external EGR gas, which are to be introduced into the combustion chamber 17, are both increased according to load on the engine 1 being increased. An amount of the external EGR gas to be introduced into the combustion chamber 17 is, for example, 30% when represented as the EGR ratio. The EGR ratio is almost constant regardless of whether load on the engine 1 is high or low. Therefore, the G/F of air-fuel mixture is also almost constant regardless of whether load on the engine 1 is high or low. An amount of EGR gas to be introduced into the combustion chamber 17 is sequential between the second intermediate load region and the first intermediate load region.

The SI rate indicates a predetermined value that is less than 100%, and is made constant or almost constant regardless of whether the load on the engine 1 is high or low. When the SI rate in the second intermediate load region, particularly, the SI rate for which load is higher than the predetermined load L1, and which is gradually increased according to load on the engine 1 being increased, is compared with the SI rate in the first intermediate load region, the SI rate in the first intermediate load region in which load on the engine 1 is higher, is greater than the SI rate in the second intermediate load region. The SI rate is sequential at a boundary between the first intermediate load region and the second intermediate load region.

In the first intermediate load region, the SI rate may be slightly changed according to load on the engine 1 being changed. A change rate of change of the SI rate to change of load on the engine 1 in the first intermediate load region may be set to be less than a change rate of the SI rate on the high load side of the second intermediate load region.

Figure 10:
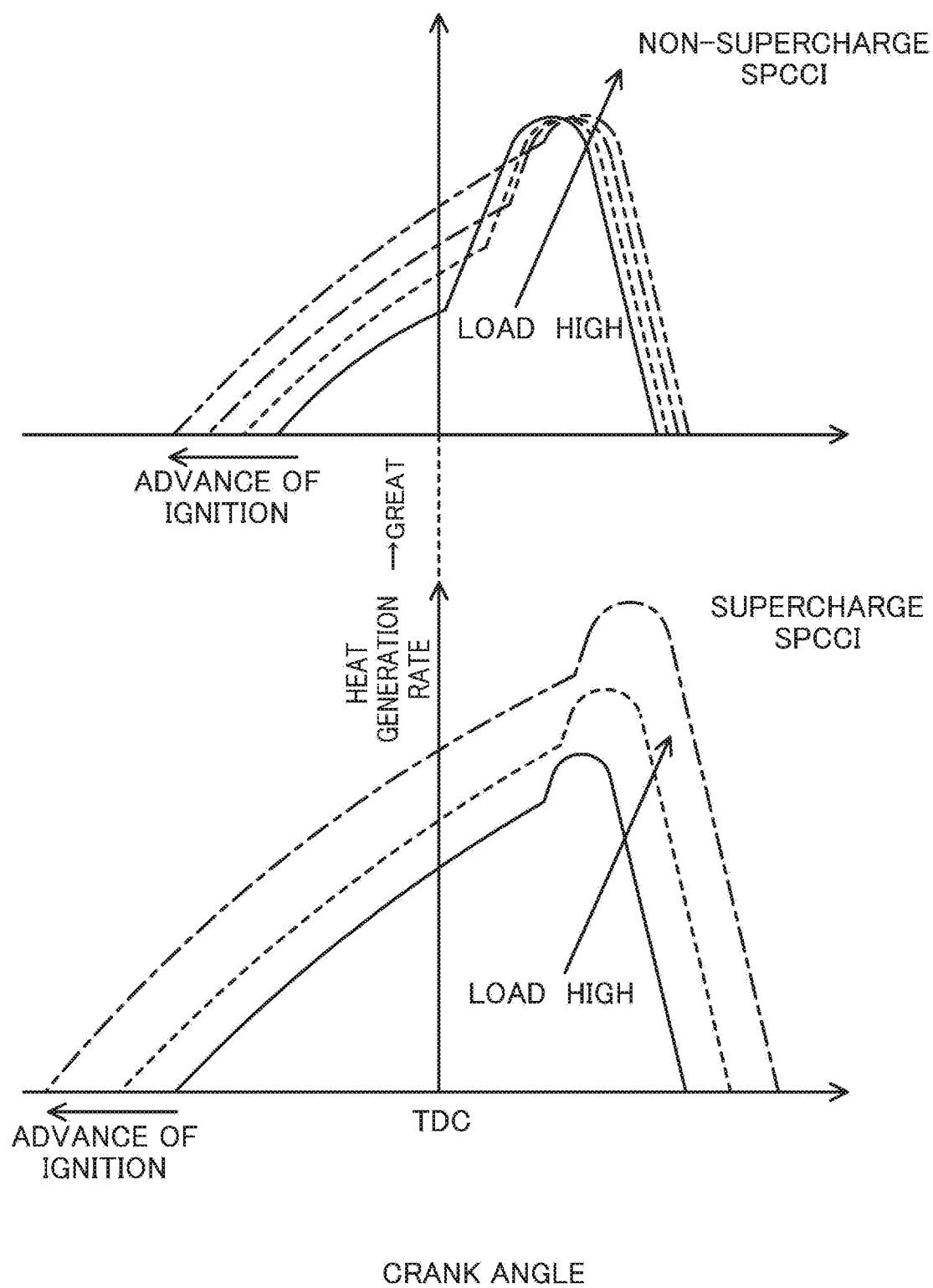
FIG. 10 illustrates, in the upper diagram, change of a combustion waveform with respect to increase of load on the engine in non-supercharge SPCCI combustion, and illustrates, in the lower diagram, change of a combustion waveform with respect to increase of load on the engine in supercharge SPCCI combustion.

As shown in the lower diagram of FIG. 10, also in supercharge SPCCI combustion, the ignition timing is gradually advanced according to an amount of fuel being increased. As described above, an amount of fresh air and an amount of EGR gas, which are to be introduced into the combustion chamber 17, are increased by supercharging, whereby heat capacity is high. Even when an amount of fuel is increased, enhancement in temperature in the combustion chamber due to SI combustion can be inhibited. A waveform of the heat generation rate in supercharge SPCCI combustion is enlarged in similar shapes according to load being increased.

That is, an amount of heat generated by SI combustion is increased with little change of the slope of the heat generation rate in the SI combustion. At almost the same timing at or after the compression top dead center, autoignition of unburned air-fuel mixture occurs. An amount of heat generated by CI combustion is increased when load on the engine 1 becomes high. As a result, in the first intermediate load region, both an amount of heat generated by the SI combustion and an amount of heat generated by the CI combustion are increased, whereby the SI rate is constant regardless of whether load on the engine 1 is high or low. When a peak of heat generation in the CI combustion is enhanced, combustion noise is increased. However, in the first intermediate load region, since load on the engine 1 is relatively high, combustion noise can be allowed to a certain degree. The higher load is, the more greatly the center of gravity of combustion in supercharge SPCCI combustion is retarded.

In the first intermediate load region, a positive overlap period in which both the intake valve 21 and the exhaust valve 22 are opened is set around the exhaust top dead center. Burned gas in the combustion chamber 17 is scavenged by supercharging. Thus, since the temperature in the combustion chamber 17 becomes low, abnormal combustion can be inhibited from occurring when load on the engine 1 is relatively high. Furthermore, by the temperature in the combustion chamber 17 being lowered, timing of autoignition can be made appropriate in a region in which load on the engine 1 is relatively high, and the SI rate can be maintained as a predetermined SI rate. That is, by the overlap period being adjusted, the SI rate can be adjusted. Furthermore, by scavenging burned gas, an amount of fresh air to be filled in the combustion chamber 17 can be increased.

In the first intermediate load region, the swirl control valve 56 is fully closed or opened to a predetermined opening degree on the closing side. In the combustion chamber 17, strong swirl flow is formed at a swirl ratio of 4 or greater. Thus, residual gas in the cavity 31 is expelled to the outside of the cavity 31.

In the first intermediate load region, similarly to the second intermediate load region, the injector 6 injects fuel into the combustion chamber 17 in two parts as preceding injection and succeeding injection in the compression stroke. In the preceding injection, fuel is injected at timing which is not close to the ignition timing. In the succeeding injection, fuel is injected at timing close to the ignition timing. The fuel is almost uniformly distributed over the entirety of the combustion chamber 17. In the entirety of the combustion chamber 17, air-fuel mixture has the excess air ratio $\lambda$ of 1.0±0.2 and the G/F of 18 to 50. Since residual gas has been expelled from the cavity 31, the G/F of air-fuel mixture near the spark plug 25 is 14 to 22. The G/F in the combustion chamber 17 stratifies. Meanwhile, since fuel is almost uniformly distributed over the entirety of the combustion chamber 17, improvement of fuel economy by reduction of unburned fuel loss, and improvement of exhaust gas performance by avoiding generation of smoke, can be achieved. In the entirety of the combustion chamber 17, the excess air ratio $\lambda$ is preferably 1.0 to 1.2.

At predetermined timing before the compression top dead center, the spark plug 25 ignites air-fuel mixture, whereby the air-fuel mixture is combusted by flame propagation. Thereafter, autoignition of unburned air-fuel mixture occurs at target timing, to cause CI combustion. Fuel injected in the succeeding injection is subjected mainly to SI combustion. Fuel injected in the preceding injection is subjected mainly to CI combustion. Since the preceding injection is performed in the compression stroke, abnormal combustion such as preignition can be prevented from being caused by fuel injected in the preceding injection. Furthermore, fuel injected in the succeeding injection can be stably combusted by flame propagation. When the G/F of air-fuel mixture in the combustion chamber 17 stratifies, and the G/F in the entirety of the combustion chamber 17 is set to 18 to 50, the SPCCI combustion can be stably performed (High Load Region (High Load SI Combustion))

When load on the engine 1 is further increased and the operation state of the engine 1 enters the high load region (C), the engine 1 performs high load SI combustion. Therefore, the SI rate in the high load region is 100%.

The throttle valve 43 is fully opened. The supercharger 44 performs supercharging with fresh air and external EGR gas also in the high load region. The opening degree of the EGR valve 54 is adjusted, whereby an amount of external EGR gas to be introduced is gradually reduced according to load on the engine 1 being increased. Thus, fresh air to be introduced into the combustion chamber 17 is increased when load on the engine 1 becomes high. When an amount of fresh air is increased, an amount of fuel can be increased. Therefore, the maximum output of the engine 1 is advantageously enhanced. An amount of EGR gas to be introduced into the combustion chamber 17 is sequential between the first intermediate load region and the high load region.

Also in the high load region, similarly to the first intermediate load region, a positive overlap period in which both the intake valve 21 and the exhaust valve 22 are opened is set around the exhaust top dead center. Burned gas in the combustion chamber 17 is scavenged by supercharging. Thus, abnormal combustion is inhibited. Furthermore, an amount of fresh air to be filled in the combustion chamber 17 can be increased.

In a region (that is, the first high load region (C1)) on the low rotation side of the high load region, the injector 6 injects fuel into the combustion chamber 17 in the retard period as described above. In a region (that is, the second high load region (C2)) on the high rotation side of the high load region, the injector 6 injects fuel into the combustion chamber 17 in the intake stroke. In either case, almost homogeneous air-fuel mixture having the excess air ratio λ of 1.0±0.2 and the G/F of 18 to 50 is formed in the combustion chamber 17. At the highest load, the excess air ratio λ may be, for example, 0.8. Furthermore, the G/F of air-fuel mixture may be, for example, 17 at the highest load. At predetermined timing before the compression top dead center, the spark plug 25 ignites air-fuel mixture, whereby the air-fuel mixture is combusted by flame propagation. In the high load region, SI combustion of the air-fuel mixture occurs by high-pressure retard injection or fuel injection in the intake stroke without causing autoignition.

(Adjustment of SI Rate)

Figure 11:
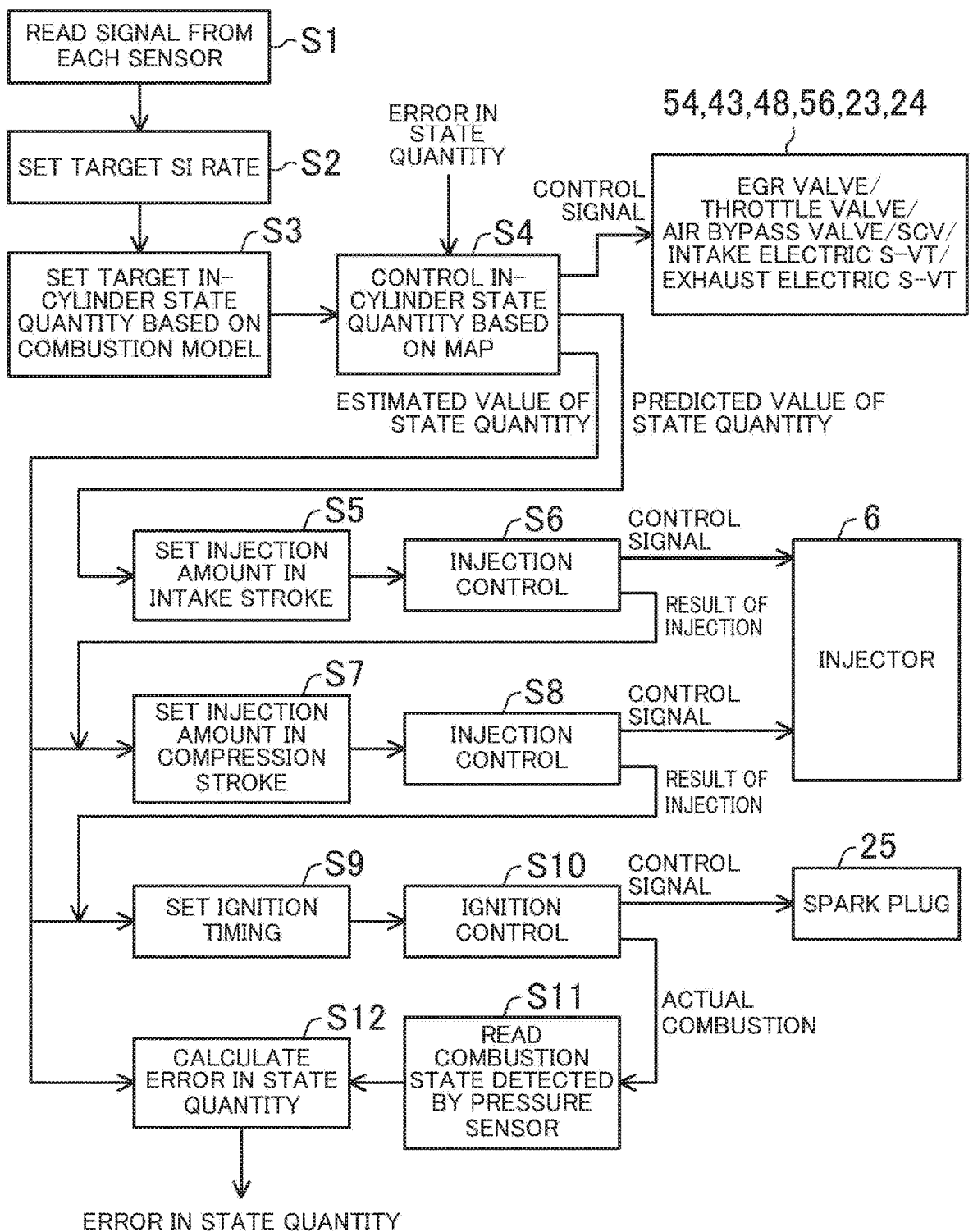
FIG. 11 is a flow chart showing a procedure of control, of the engine, performed by an ECU.

FIG. 11 shows a flow of operation control, of the engine, performed by the ECU 10. The ECU 10 determines an operation state of the engine 1 based on the detection signals from the sensors SW1 to SW16, and adjusts a state quantity in the combustion chamber 17, adjusts an injection amount, adjusts injection timing, and adjusts ignition timing such that combustion in the combustion chamber 17 becomes combustion at an SI rate corresponding to the operation state. The ECU 10 also adjusts the SI rate when determining that the SI rate needs to be adjusted, based on detection signals from the sensors.

The ECU firstly reads detection signals from the sensors SW1 to SW16 in step 51. Subsequently, the ECU 10 determines an operation state of the engine 1 based on the detection signals, and sets a target SI rate in step S2. The target SI rate is as shown in FIG. 9.

In subsequent step S3, the ECU 10 sets a target in-cylinder state quantity for obtaining the target SI rate having been set, based on a preset combustion model. Specifically, a target temperature, a target pressure, and a target state quantity in the combustion chamber 17 are set. In step S4, the ECU 10 sets an opening degree of the EGR valve 54, an opening degree of the throttle valve 43, an opening degree of the air bypass valve 48, an opening degree of the swirl control valve 56, and phase angles of the intake electric S-VT 23 and the exhaust electric S-VT 24, which are necessary for obtaining the target in-cylinder state quantity. The ECU 10 presets control amounts for these devices, and sets the control amounts based on a map stored in the ECU 10. The ECU 10 outputs control signals to the EGR valve 54, the throttle valve 43, the air bypass valve 48, the swirl control valve 56, and the intake electric S-VT 23 and the exhaust electric S-VT 24, based on the set control amounts. Each device operates based on the control signal from the ECU 10, whereby the state quantity in the combustion chamber 17 becomes the target state quantity.

The ECU 10 further calculates a predicted value and an estimated value of the state quantity in the combustion chamber 17, based on the set control amount for each device. The predicted value of the state quantity is a value obtained by predicting a state quantity, in the combustion chamber 17, before closing of the intake valve 21, and is used for setting an amount of fuel injected in the intake stroke as described below. The estimated value of the state quantity is a value obtained by estimating a state quantity, in the combustion chamber 17, after closing of the intake valve 21, and is used for setting an amount of fuel injected in the compression stroke and setting ignition timing as described below. The estimated value of the state quantity is also used for calculating an error in state quantity based on comparison with an actual combustion state as described below.

The ECU 10 sets, in step S5, an amount of fuel to be injected in the intake stroke based on the predicted value of the state quantity. When fuel is not injected in the intake stroke, the amount of injected fuel is zero. In step S6, the ECU 10 controls injection by the injector 6. That is, a control signal is outputted to the injector 6 such that fuel is injected into the combustion chamber 17 at predetermined injection timing.

In step S7, the ECU 10 sets an amount of fuel to be injected in the compression stroke based on the estimated value of the state quantity and a result of injection of fuel in the intake stroke. When fuel is not injected in the compression stroke, the amount of injected fuel is zero. When divided injection is performed in the compression stroke, each of an amount of injection in the preceding injection and an amount of injection in the succeeding injection is set. In step S8, the ECU 10 outputs a control signal to the injector 6 such that fuel is injected into the combustion chamber 17 at injection timing based on the preset map.

In step S9, the ECU 10 sets ignition timing based on the estimated value of the state quantity and a result of injection of fuel in the compression stroke. In step S10, the ECU 10 outputs a control signal to the spark plug 25 such that air-fuel mixture in the combustion chamber 17 is ignited at the set ignition timing.

The spark plug 25 ignites the air-fuel mixture, to cause SI combustion or SPCCI combustion in the combustion chamber 17. In step S11, the ECU 10 reads change of pressure, in the combustion chamber 17, detected by the pressure sensor SW6, and determines, based thereon, a combustion state of the air-fuel mixture in the combustion chamber 17. Furthermore, in step S12, the ECU 10 compares a result of detection of the combustion state with the estimated value of the state quantity, which is estimated in step S4, and calculates an error between the estimated value of the state quantity and an actual state quantity. The calculated error is used for estimation in step S4 in cycles subsequent to this cycle. The ECU 10 adjusts opening degrees of the throttle valve 43, the EGR valve 54, the swirl control valve 56, and/or the air bypass valve 48, and phase angles of the intake electric S-VT 23 and the exhaust electric S-VT 24 so as to remove the error in the state quantity. Thus, amounts of fresh air and EGR gas to be introduced into the combustion chamber 17 are adjusted. Feedback of the error in the state quantity corresponds to adjustment of an SI rate performed by the ECU 10 when adjustment of the SI rate is determined to be necessary based on the error between the target SI rate and the actual SI rate.

Furthermore, in step S8, injection timing in the compression stroke is advanced so as to be earlier than injection timing based on the map, by the ECU 10, such that ignition timing can be advanced, when the ECU 10 makes prediction that the temperature in the combustion chamber 17 is lower than the target temperature based on the estimated value of the state quantity. Meanwhile, in step S8, the ECU 10 retards injection timing in the compression stroke from injection timing based on the map such that ignition timing can be retarded when the ECU 10 makes prediction that the temperature in the combustion chamber 17 is higher than the target temperature based on the estimated value of the state quantity.

Figure 12:
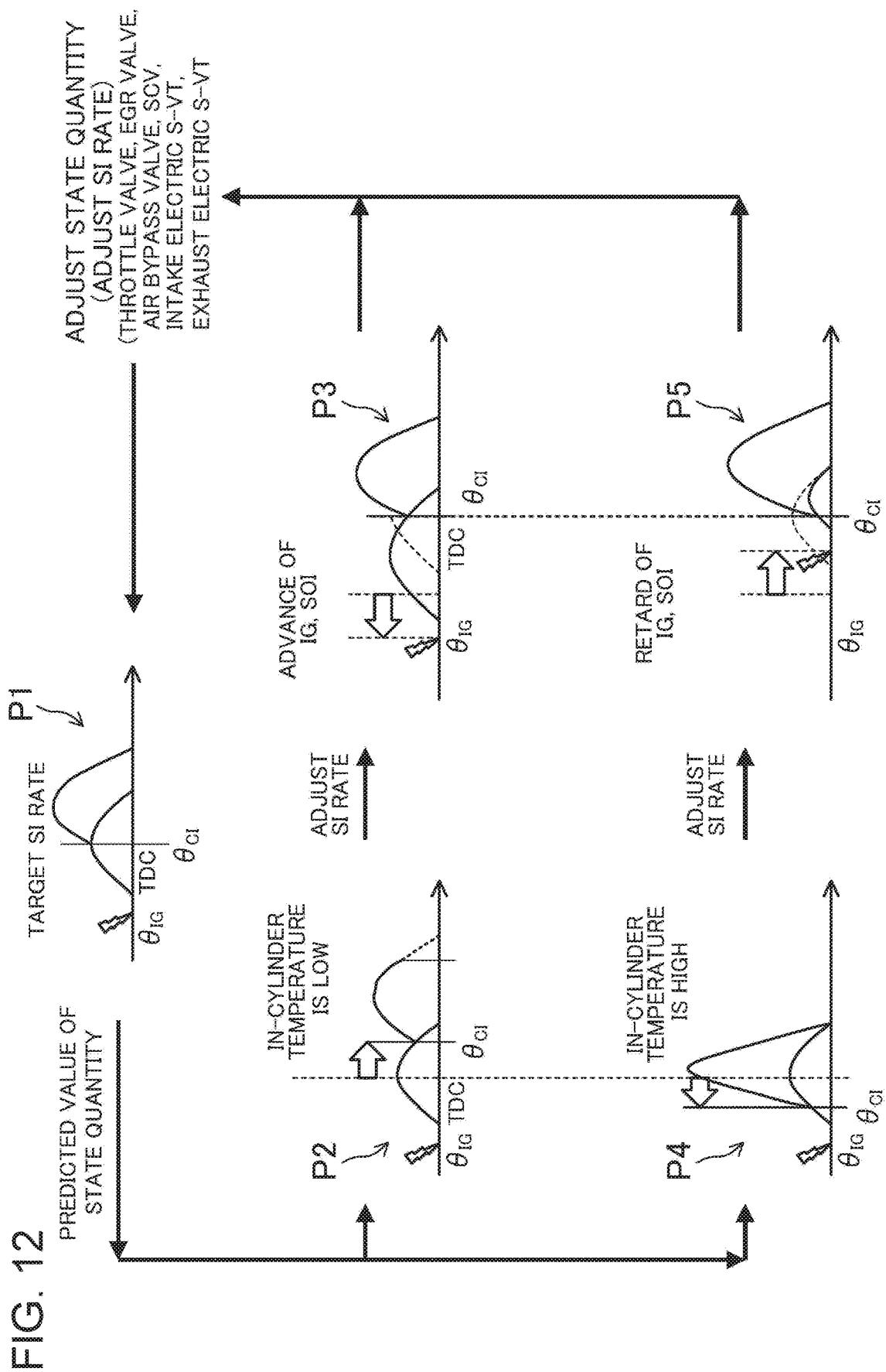
FIG. 12 conceptually illustrates control of adjustment of an SI rate.

That is, as indicated by P2 in FIG. 12, when the temperature in the combustion chamber 17 is low, after SI combustion by spark ignition starts, timing $\theta_{CI}$ at which autoignition of unburned air-fuel mixture occurs delays, and the SI rate is deviated from the target SI rate (see P1). In this case, unburned fuel is increased or exhaust gas performance is degraded.

Therefore, when the ECU 10 makes prediction that the temperature in the combustion chamber 17 is lower than the target temperature, the ECU 10 advances the injection timing and also advances the ignition timing $\theta_{IG}$ in step S10 shown in FIG. 11. As indicated by P3 in FIG. 12, the start of SI combustion becomes earlier, whereby sufficient heat generation by the SI combustion can be caused. Therefore, when the temperature in the combustion chamber 17 is low, the timing $\theta_{CI}$ of autoignition of unburned air-fuel mixture can be prevented from being delayed. As a result, the SI rate approaches the target SI rate. Increase of unburned fuel or degradation of exhaust gas performance are prevented.

Furthermore, as indicated by P4 in FIG. 12, when the temperature in the combustion chamber 17 is high, autoignition of unburned air-fuel mixture occurs immediately after the SI combustion by spark ignition starts, and the SI rate is deviated from the target SI rate (see P1). In this case, combustion noise is increased.

Therefore, when the ECU 10 makes prediction that the temperature in the combustion chamber 17 is higher than the target temperature, the ECU 10 retards the injection timing and also retards the ignition timing $\theta_{IG}$ in step S10 shown in FIG. 11. As indicated by P5 in FIG. 12, since start of the SI combustion is delayed, when the temperature in the combustion chamber 17 is high, the timing $\theta_{CI}$ of autoignition of unburned air-fuel mixture can be prevented from being earlier. As a result, the SI rate approaches the target SI rate. Increase of combustion noise is prevented.

These adjustments of the injection timing and the ignition timing correspond to adjustment of the SI rate performed by the ECU 10 when adjustment of the SI rate in the SPCCI combustion is determined to be necessary. By adjusting the injection timing, an appropriate air-fuel mixture can be formed in the combustion chamber 17 at the advanced or retarded ignition timing. The spark plug 25 can assuredly ignite the air-fuel mixture, and autoignition of unburned air-fuel mixture can be also performed at appropriate timing.

In FIG. 12, adjustment of the state quantity in the combustion chamber 17 by controlling the throttle valve 43, the EGR valve 54, the air bypass valve 48, the swirl control valve 56, the intake electric S-VT 23, and the exhaust electric S-VT 24 based on an actual combustion state is as described for step S12 and step S4 in FIG. 11.

The engine 1 adjusts the SI rate by means of the state quantity setting device that includes the throttle valve 43, the EGR valve 54, the air bypass valve 48, the swirl control valve 56, the intake electric S-VT 23, and the exhaust electric S-VT 24. By adjusting the state quantity in the combustion chamber 17, the SI rate can be roughly adjusted. In addition thereto, the engine 1 adjusts the fuel injection timing and the ignition timing, to adjust the SI rate. By adjusting the injection timing and the ignition timing, for example, correction of difference between the cylinders can be performed, and slight adjustment of the autoignition timing can be performed. By adjusting the SI rate at two stages, the engine 1 can accurately perform the target SPCCI combustion corresponding to the operation state.

The control of the engine 1 by the ECU 10 is not limited to control based on the combustion model described above.

(Another Exemplary Configuration of Operation Region Map for Engine)

FIG. 7 illustrates, in the lower diagram, another exemplary configuration of an operation region map for the engine 1. An operation region map 702 for the engine 1 is divided into five regions according to whether load is high or low and whether the number of revolutions is great or small. Specifically, the five regions are: a low load region (1)-1 which includes an idling operation region and extends in a low rotation region and an intermediate rotation region; an intermediate load region (1)-2 in which load is higher than that in the low load region, and which extends in the low rotation region and the intermediate rotation region; an intermediate rotation region (2), in the high load region, in which load is higher than that in the intermediate load region (1)-2, and which includes full load; a low rotation region (3), in the high load region, in which the number of revolutions is less than that in the intermediate rotation region (2); and a high rotation region (4) in which the number of revolutions is greater than those in the low load region (1)-1, the intermediate load region (1)-2, the high-load intermediate-rotation region (2), and the high-load low-rotation region (3). The low rotation region, the intermediate rotation region, and the high rotation region may be a low rotation region, an intermediate rotation region, and a high rotation region obtained by the total operation region of the engine 1 being divided in the number-of-revolution direction into almost three equal portions that are the low rotation region, the intermediate rotation region, and the high rotation region. In the example shown in FIG. 7, the low rotation represents a rotation in which the number of revolutions is less than N1, the high rotation represents a rotation in which the number of revolutions is N2 or greater, and the intermediate rotation represents a rotation in which the number of revolutions is N1 or greater and less than N2. The number of revolutions N1 may be, for example, about 1200 rpm, and the number of revolutions N2 may be, for example, about 4000 rpm.

The engine 1 performs combustion by compression autoignition in the low load region (1)-1, the intermediate load region (1)-2, and the high-load intermediate-rotation region (2) in the operation region map 702, mainly in order to improve fuel economy and improve exhaust gas performance. The operation region map 702 is different from the operation region map 701 in that, in the operation region map 702, when the engine 1 operates with a low load, and also when the engine 1 operates with a high load, the engine 1 performs the SPCCI combustion. Furthermore, the engine 1 performs combustion by spark ignition in other regions, specifically, in the high-load low-rotation region (3) and the high rotation region (4). The operation of the engine 1 in each region will be described below in detail according to a fuel injection time and an ignition time shown in FIG. 17.

(Low Load Region (1)-1)

When the engine 1 operates in the low load region (1)-1, the engine 1 performs the SPCCI combustion.

Figure 17:
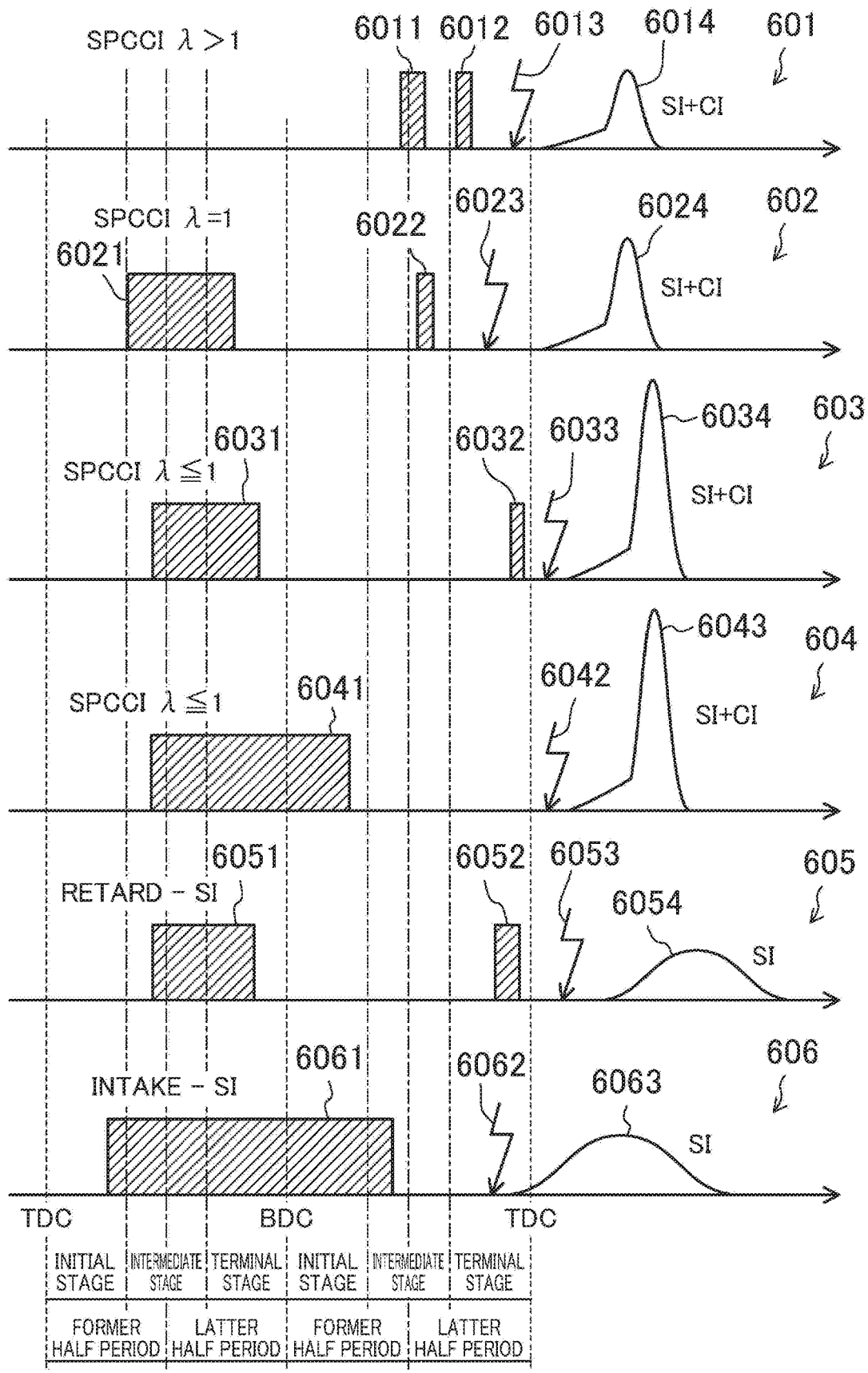
FIG. 17 illustrates a fuel injection time, an ignition time, and a combustion waveform in each operation state in the operation region map shown in the lower diagram of FIG. 7.

In FIG. 17, reference numeral 601 represents examples of a fuel injection time (reference numeral 6011, 6012) and an ignition time (reference numeral 6013), and a combustion waveform (that is, waveform representing change of a heat generation rate with respect to a crank angle, reference numeral 6014) in the case of the engine 1 operating in an operation state of reference numeral 601 in the low load region (1)-1.

When the engine 1 operates in the low load region (1)-1, strong swirl flow is formed in the combustion chamber 17. When the engine 1 operates in the low load region (1)-1, the swirl ratio is 4 or greater. The swirl flow is strong in the outer circumferential portion of the combustion chamber 17, and weak in the center portion. The swirl control valve (SCV) 56 is fully closed or opened to a predetermined opening degree on the closing side. As described above, the intake port 18 is a tumble port. Therefore, diagonal swirl flow including a tumble component and a swirl component is formed in the combustion chamber 17.

When the engine 1 operates in the low load region (1)-1, an air-fuel ratio (A/F) of air-fuel mixture is leaner than the theoretical air-fuel ratio in the entirety of the combustion chamber 17. That is, in the entirety of the combustion chamber 17, the excess air ratio $\lambda$ of the air-fuel mixture is greater than 1. More specifically, in the entirety of the combustion chamber 17, the A/F of the air-fuel mixture is 30 or greater. Thus, generation of RawNOx can be inhibited, and exhaust gas performance can be improved.

The EGR system 55 introduces EGR gas into the combustion chamber 17 as appropriate when the engine 1 operates in the low load region (1)-1.

When the engine 1 operates in the low load region (1)-1, air-fuel mixture stratifies between the center portion and the outer circumferential portion in the combustion chamber 17. The center portion of the combustion chamber 17 is a portion at which the spark plug 25 is disposed. The outer circumferential portion of the combustion chamber 17 is around the center portion, and is in contact with a liner of the cylinder 11. The center portion of the combustion chamber 17 may be defined as a portion in which swirl flow is weak, and the outer circumferential portion thereof may be defined as a portion in which swirl flow is strong.

The concentration of fuel in the air-fuel mixture in the center portion is higher than the concentration of fuel in the outer circumferential portion. Specifically, the A/F of the air-fuel mixture in the center portion is in a range from 20 to 30, and the A/F of the air-fuel mixture in the outer circumferential portion is 35 or greater.

When the engine 1 operates in the low load region (1)-1, the injector 6 basically injects fuel into the combustion chamber 17 in a plurality of parts in the compression stroke. Air-fuel mixture stratifies in the center portion and the outer circumferential portion of the combustion chamber 17 due to the divided injection of the fuel and strong swirl flow in the combustion chamber 17.

After the fuel injection has been ended, the spark plug 25 ignites the air-fuel mixture in the center portion of the combustion chamber 17 at predetermined timing before the compression top dead center (see reference numeral 6013). Since the air-fuel mixture in the center portion has a relatively high fuel concentration, ignitability is improved, and SI combustion by flame propagation is also stabilized. When the SI combustion is stabilized, CI combustion starts at appropriate timing. In the SPCCI combustion, controllability of the CI combustion is improved. As a result, when the engine 1 operates in the low load region (1)-1, both inhibition of generation of combustion noise and improvement of fuel economy performance due to a combustion period being shortened can be achieved.

(Intermediate Load Region (1)-2)

Also when the engine 1 operates in the intermediate load region (1)-2, similarly to the low load region (1)-1, the engine 1 performs the SPCCI combustion. The intermediate load region (1)-2 corresponds to the intermediate load region (B) in the operation region map 701.

In FIG. 17, reference numeral 602 represents examples of a fuel injection time (reference numeral 6021, 6022) and an ignition time (reference numeral 6023), and a combustion waveform (reference numeral 6024) in the case of the engine 1 operating in an operation state of reference numeral 602 in the intermediate load region (1)-2.

The EGR system 55 introduces EGR gas into the combustion chamber 17 when an operation state of the engine 1 is in the intermediate load region (1)-2.

Also when the engine 1 operates in the intermediate load region (1)-2, similarly to the low load region (1)-1, strong swirl flow is formed at a swirl ratio of 4 or greater in the combustion chamber 17. The swirl control valve (SCV) 56 is fully closed or opened to a predetermined opening degree on the closing side. When swirl flow is made strong, residual gas in the cavity 31 can be expelled from the cavity 31. As a result, the G/F of air-fuel mixture of the SI part near the spark plug 25 and the G/F of air-fuel mixture of the CI part around the SI part can be made different from each other. Thus, as described above, when the total G/F in the entirety of the combustion chamber 17 is in a range from 18 to 50, the SPCCI combustion can be stabilized.

Furthermore, when swirl flow is made strong, turbulent energy in the combustion chamber 17 is enhanced. Therefore, when the engine 1 operates in the intermediate load region (1)-2, flame propagates quickly in SI combustion, to stabilize the SI combustion. When the SI combustion is stabilized, controllability of CI combustion is enhanced. When timing of the CI combustion in the SPCCI combustion is made appropriate, generation of combustion noise can be inhibited, and fuel economy performance can be also improved. Furthermore, variation in torque between cycles can be reduced.

When the engine 1 operates in the intermediate load region (1)-2, the air-fuel ratio (A/F) of air-fuel mixture is the theoretical air-fuel ratio (A/F≈44.7) in the entirety of the combustion chamber 17. Exhaust gas discharged from the combustion chamber 17 is purified by a three-way catalyst, whereby exhaust gas performance of the engine 1 becomes good. The A/F of the air-fuel mixture may be set so as to fall within a purification window of the three-way catalyst. Therefore, the excess air ratio $\lambda$ of the air-fuel mixture may be 1.0±0.2.

When the engine 1 operates in the intermediate load region (1)-2, the injector 6 performs fuel injection (reference numeral 6021) in the intake stroke and fuel injection (reference numeral 6022) in the compression stroke. By a first injection 6021 in the intake stroke, fuel can be almost uniformly distributed in the combustion chamber 17. By a second injection 6022 in the compression stroke, a temperature in the combustion chamber 17 can be lowered due to latent heat of vaporization of fuel. Preignition of the air-fuel mixture that contains fuel injected in the first injection 6021 can be prevented.

When the injector 6 performs the first injection 6021 in the intake stroke and the second injection 6022 in the compression stroke, the air-fuel mixture having the excess air ratio λ of 1.0±0.2 is formed in the combustion chamber 17 over the entirety. Since the concentration of fuel in the air-fuel mixture is almost uniform, improvement of fuel economy by reducing of unburned fuel loss and improvement of exhaust gas performance by avoiding generation of smoke, can be achieved. The excess air ratio λ is preferably 1.0 to 1.2. Furthermore, the total G/F in the entirety of the combustion chamber 17 is in a range from 18 to 50, and the G/F of the SI part near the spark plug 25 is 14 to 22.

At predetermined timing before the compression top dead center, the spark plug 25 ignites air-fuel mixture (reference numeral 6023), whereby the air-fuel mixture is combusted by flame propagation. After start of the combustion by flame propagation, autoignition of unburned air-fuel mixture occurs at target timing, to cause CI combustion. Fuel injected in the succeeding injection is subjected mainly to SI combustion. Fuel injected in the preceding injection is subjected mainly to CI combustion. The total G/F of the entirety of the combustion chamber 17 is in a range from 18 to 50, and the G/F of the SI part near the spark plug 25 is 14 to 22, whereby the SPCCI combustion can be stabilized.

As shown in the lower diagram in FIG. 7, a region in which the supercharger 44 is off (see S/C OFF) is a part of the low load region (1)-1 and a part of the intermediate load region (1)-2. Specifically, in a region on the low rotation side in the low load region (1)-1, the supercharger 44 is off. In a region on the high rotation side in the low load region (1)-1, the supercharger 44 is on and boost pressure is enhanced in order to assure an amount of intake air, to be filled, which is necessary according to the number of revolutions of the engine 1 being increased. Furthermore, in a region on the low-load low-rotation side in the intermediate load region (1)-2, the supercharger 44 is off In a region on the high load side in the intermediate load region (1)-2, the supercharger 44 is on in order to assure an amount of intake air, to be filled, which is necessary according to an amount of injected fuel being increased. In the region on the high rotation side, the supercharger 44 is on in order to assure an amount of intake air, to be filled, which is necessary according to the number of revolutions of the engine 1 being increased.

In each of the high-load intermediate-rotation region (2), the high-load low-rotation region (3), and the high rotation region (4), the supercharger 44 is on over the entirety of the region (High-Load Intermediate-Rotation Region (2))

Also when the engine 1 operates in the high-load intermediate-rotation region (2), similarly to the low load region (1)-1 and the intermediate load region (1)-2, the engine 1 performs the SPCCI combustion.

In FIG. 17, reference numeral 603 represents examples of a fuel injection time (reference numeral 6031, 6032) and an ignition time (reference numeral 6033), and a combustion waveform (reference numeral 6034) in the case of the engine 1 operating in an operation state of reference numeral 603 in the high-load intermediate-rotation region (2). Furthermore, in FIG. 17, reference numeral 604 represents examples of a fuel injection time (reference numeral 6041) and an ignition time (reference numeral 6042), and a combustion waveform (reference numeral 6043) in the case of the number of revolutions being higher than that in the operation state of reference numeral 603.

The EGR system 55 introduces EGR gas into the combustion chamber 17 when the operation state of the engine 1 is in the high-load intermediate-rotation region (2). In the engine 1, an amount of EGR gas is reduced according to load being increased. At full load, the EGR gas may be zero.

Furthermore, also when the engine 1 operates in the high-load intermediate-rotation region (2), similarly to the low load region (1)-1, strong swirl flow is formed at a swirl ratio of 4 or greater in the combustion chamber 17. The swirl control valve (SCV) 56 is fully closed or opened to a predetermined opening degree on the closing side.

When the engine 1 operates in the high-load intermediate-rotation region (2), the air-fuel ratio (A/F) of air-fuel mixture is the theoretical air-fuel ratio or richer than the theoretical air-fuel ratio in the entirety of the combustion chamber 17 (that is, the excess air ratio λ of the air-fuel mixture satisfies $\lambda \le 1$).

When the engine 1 operates on the low rotation side in the high-load intermediate-rotation region (2), the injector 6 injects fuel in the intake stroke (reference numeral 6031) and also injects fuel at the terminal stage of the compression stroke (reference numeral 6032). The terminal stage of the compression stroke may be a terminal stage obtained when the compression stroke is divided into three equal stages that are an initial stage, an intermediate stage, and the terminal stage.

In the preceding injection 6031 that starts in the intake stroke, fuel injection may be started in the former half period of the intake stroke. The former half period of the intake stroke may be a former half period obtained when the intake stroke is divided into two equal periods that are the former half period and a latter half period. Specifically, in the preceding injection, fuel injection may be started at 280° CA before the top dead center.

When injection starts in the preceding injection 6031 in the former half period of the intake stroke, fuel spray is applied to an opening edge portion of the cavity 31, and a part of fuel enters the squish area 171 of the combustion chamber 17 and the remaining fuel enters the region inside the cavity 31, which is not shown. The swirl flow is strong in the outer circumferential portion of the combustion chamber 17, and is weak in the center portion. Therefore, the part of fuel that has entered the squish area 171 enters the swirl flow, and the remaining fuel that has entered the region inside the cavity 31 enters the inside of the swirl flow. The fuel that has entered the swirl flow remains in the swirl flow in a period from the intake stroke to the compression stroke, and forms air-fuel mixture for CI combustion in the outer circumferential portion of the combustion chamber 17. The fuel that has entered the inside of the swirl flow also remains inside the swirl flow in the period from the intake stroke to the compression stroke, and forms air-fuel mixture for SI combustion in the center portion of the combustion chamber 17.

When the engine 1 operates in the high-load intermediate-rotation region (2), the excess air ratio λ is preferably 1 or less in the air-fuel mixture in the center portion where the spark plug 25 is disposed, and the excess air ratio λ is 1 or less and preferably less than 1 in the air-fuel mixture in the outer circumferential portion. The air-fuel ratio (A/F) of the air-fuel mixture in the center portion may be, for example, in a range from 13 to the theoretical air-fuel ratio (14.7). The air-fuel ratio of the air-fuel mixture in the center portion may be leaner than the theoretical air-fuel ratio. Furthermore, the air-fuel ratio of the air-fuel mixture in the outer circumferential portion may be, for example, in a range from 11 to the theoretical air-fuel ratio, and may be preferably in a range from 11 to 12. When the excess air ratio λ in the outer circumferential portion of the combustion chamber 17 is less than 1, an amount of fuel in the air-fuel mixture is increased in the outer circumferential portion. Therefore, a temperature can be lowered by latent heat of vaporization of the fuel. The air-fuel ratio of the air-fuel mixture in the entirety of the combustion chamber 17 may be in a range from 12.5 to the theoretical air-fuel ratio, and may be preferably in a range from 12.5 to 13.

In the succeeding injection 6032 that is performed at the terminal stage of the compression stroke, for example, fuel injection may be started at 10° CA before the top dead center. By the succeeding injection being performed immediately before the top dead center, a temperature in the combustion chamber can be lowered by latent heat of vaporization of the fuel. Low-temperature oxidation reaction of fuel injected in the preceding injection 6031 proceeds in the compression stroke, and shifts to high-temperature oxidation reaction before the top dead center. However, the succeeding injection 6032 is performed immediately before the top dead center, and a temperature in the combustion chamber is thus lowered, whereby shift from the low-temperature oxidation reaction to the high-temperature oxidation reaction can be inhibited, and occurrence of preignition can be inhibited. The ratio of the injection amount in the preceding injection to the injection amount in the succeeding injection may represent, for example, 95:5.

The spark plug 25 ignites the air-fuel mixture in the center portion of the combustion chamber 17 at or near the compression top dead center (reference numeral 6033). The spark plug 25 performs ignition, for example, at or after the compression top dead center. Since the spark plug 25 is disposed in the center portion of the combustion chamber 17, SI combustion of the air-fuel mixture in the center portion by flame propagation starts by ignition by the spark plug 25.

In the high load region, an amount of injected fuel is increased, and a temperature in the combustion chamber 17 is also enhanced, so that the CI combustion is likely to start early. In other words, in the high load region, preignition of air-fuel mixture is likely to occur. However, as described above, since a temperature in the outer circumferential portion of the combustion chamber 17 is lowered by latent heat of vaporization of fuel, start of the CI combustion immediately after spark ignition of air-fuel mixture can be prevented.

As described above, when the spark plug 25 ignites air-fuel mixture in the center portion, a combustion speed is enhanced by high turbulent energy to stabilize the SI combustion, and flame in the SI combustion propagates in the circumferential direction by the strong swirl flow in the combustion chamber 17. Thus, compression ignition of unburned air-fuel mixture occurs at a predetermined position in the circumferential direction in the outer circumferential portion of the combustion chamber 17, to start the CI combustion.

According to the concept of the SPCCI combustion, air-fuel mixture stratifies in the combustion chamber 17, and strong swirl flow is generated in the combustion chamber 17, whereby the SI combustion can be sufficiently performed before start of the CI combustion. As a result, generation of combustion noise can be inhibited, and, further, a temperature of the combustion does not become excessively high, and generation of NOx is also inhibited. Furthermore, variation in torque between cycles can be reduced.

Furthermore, since the temperature in the outer circumferential portion is low, the CI combustion is gentle, and generation of combustion noise can be inhibited. Moreover, the CI combustion shortens the combustion period. Thus, torque is improved in the high load region and thermal efficiency is improved. Therefore, the engine 1 performs SPCCI combustion in a region in which load is high, whereby fuel economy performance can be improved while combustion noise is avoided.

When the engine 1 operates on the high rotation side in the high-load intermediate-rotation region (2), the injector 6 starts fuel injection in the intake stroke (reference numeral 6041).

In the preceding injection 6041 that starts in the intake stroke, similarly as described above, fuel injection may be started in the former half period of the intake stroke. Specifically, in the preceding injection 6041, fuel injection may be started at 280° CA before the top dead center. The preceding injection may end in the compression stroke after the intake stroke. When injection in the preceding injection 6041 starts in the former half period of the intake stroke, air-fuel mixture for CI combustion can be formed in the outer circumferential portion of the combustion chamber 17, and air-fuel mixture for SI combustion can be also formed in the center portion of the combustion chamber 17. Similarly as described above, the excess air ratio λ of the air-fuel mixture is preferably 1 or less in the center portion where the spark plug 25 is disposed, and the excess air ratio λ of the air-fuel mixture is 1 or less and preferably less than 1 in the outer circumferential portion. The air-fuel ratio (A/F) of the air-fuel mixture in the center portion may be, for example, in a range from 13 to the theoretical air-fuel ratio (14.7). The air-fuel ratio of air-fuel mixture in the center portion may be leaner than the theoretical air-fuel ratio. Furthermore, the air-fuel ratio of the air-fuel mixture in the outer circumferential portion may be, for example, in a range from 11 to the theoretical air-fuel ratio, and may be preferably in a range from 11 to 12. The air-fuel ratio of air-fuel mixture in the entirety of the combustion chamber 17 may be in a range from 12.5 to the theoretical air-fuel ratio, and may be preferably in a range from 12.5 to 13.

When the number of revolutions of the engine 1 is increased, a time for reaction of fuel injected in the preceding injection 6041 is shortened. Therefore, the succeeding injection for inhibiting oxidation reaction of the air-fuel mixture can be omitted.

The spark plug 25 ignites the air-fuel mixture in the center portion of the combustion chamber 17 at or near the compression top dead center (reference numeral 6042). The spark plug 25 performs ignition, for example, at or after the compression top dead center.

As described above, the air-fuel mixture stratifies, whereby combustion noise is inhibited, and the SPCCI combustion can be also stabilized in the high-load intermediate-rotation region (2).

(High-Load Low-Rotation Region (3))

When the engine 1 operates in the high-load low-rotation region (3), the engine 1 does not perform the SPCCI combustion but performs SI combustion. The high-load low-rotation region (3) corresponds to the first high load region (C1) in the operation region map 701.

In FIG. 17, reference numeral 605 represents examples of a fuel injection time (reference numeral 6051, 6052) and an ignition time (reference numeral 6053), and a combustion waveform (reference numeral 6054) in the case of the engine 1 operating in an operation state of reference numeral 605 in the high-load low-rotation region (3).

The EGR system 55 introduces EGR gas into the combustion chamber 17 when an operation state of the engine 1 is in the high-load low-rotation region (3). The engine 1 reduces an amount of EGR gas according to load being increased. At full load, the EGR gas may be zero.

When the engine 1 operates in the high-load low-rotation region (3), the air-fuel ratio (A/F) of air-fuel mixture is the theoretical air-fuel ratio (A/F≈44.7) in the entirety of the combustion chamber 17. The A/F of the air-fuel mixture may be set so as to fall within a purification window of the three-way catalyst. Therefore, the excess air ratio λ of the air-fuel mixture may be 1.0±0.2. When the air-fuel ratio of the air-fuel mixture is set to the theoretical air-fuel ratio, fuel economy performance is improved in the high-load low-rotation region (3). When the engine 1 operates in the high-load low-rotation region (3), the concentration of fuel in the air-fuel mixture in the entirety of the combustion chamber 17 may be set in a range from the excess air ratio λ in the high-load intermediate-rotation region (2) to the excess air ratio λ of 1, and preferably greater than the excess air ratio λ in the high-load intermediate-rotation region (2).

When the engine 1 operates in the high-load low-rotation region (3), the injector 6 injects fuel into the combustion chamber 17 at timing in the intake stroke, and at timing in the retard period from the terminal stage of the compression stroke to the initial stage of the expansion stroke, in the operation region map 702 (reference numeral 6051, 6052). When fuel is injected in two parts, an amount of fuel to be injected in the retard period can be reduced. By fuel being injected in the intake stroke (reference numeral 6051), a sufficient time in which air-fuel mixture is formed can be assured. Furthermore, by fuel being injected in the retard period (reference numeral 6052), flow in the combustion chamber 17 can be enhanced immediately before ignition, and SI combustion is advantageously stabilized.

The spark plug 25 ignites the air-fuel mixture at timing of or at timing near the compression top dead center (reference numeral 6053) after fuel is injected. The spark plug 25 may ignite the air-fuel mixture, for example, after the compression top dead center. SI combustion of the air-fuel mixture is performed in the expansion stroke. Since the SI combustion starts in the expansion stroke, CI combustion does not start.

When the engine 1 operates in the high-load low-rotation region (3), swirl flow is weakened as compared to an operation in the high-load intermediate-rotation region (2). In the operation in the high-load low-rotation region (3), the opening degree of the swirl control valve (SCV) 56 is greater than that in the operation in the high-load intermediate-rotation region (2). The opening degree of the swirl control valve 56 may be, for example, about 50% (that is, half-open).

In the upper view of FIG. 2, the axis of the hole of the injector 6 is positioned so as to be shifted relative to the spark plug 25 in the circumferential direction as indicated by an arrow drawn by an alternate long and short dash line. Fuel injected from the hole flows in the circumferential direction due to swirl flow in the combustion chamber 17. The swirl flow allows the fuel to be immediately transported to a portion near the spark plug 25. The fuel can be vaporized while the fuel is transported to the portion near the spark plug 25.

Meanwhile, when swirl flow is excessively strong, fuel is caused to flow in the circumferential direction, and is moved away from the portion near the spark plug 25, and the fuel cannot be immediately transported to the portion near the spark plug 25. Therefore, when the engine 1 operates in the high-load low-rotation region (3), swirl flow is weakened as compared to an operation in the high-load intermediate-rotation region (2). Thus, since fuel can be immediately transported to the portion near the spark plug 25, ignitability of air-fuel mixture can be improved and SI combustion can be stabilized.

(High Rotation Region (4))

When the number of revolutions of the engine 1 is great, a time for changing the crank angle by 1° is shortened. Therefore, for example, in the high rotation region in the high load region, as described above, stratifying of air-fuel mixture in the combustion chamber 17 becomes difficult. When the number of revolutions of the engine 1 is great, the above-described SPCCI combustion becomes difficult.

Therefore, when the engine 1 operates in the high rotation region (4), the engine 1 does not perform the SPCCI combustion but performs SI combustion. The high rotation region (4) extends over the entire region from the low load region to the high load region in the load direction.

In FIG. 17, reference numeral 606 represents examples of a fuel injection time (reference numeral 6061) and an ignition time (reference numeral 6062), and a combustion waveform (reference numeral 6063) in the case of the engine 1 operating in the operation state of the reference numeral 606 in the high rotation region (4).

The EGR system 55 introduces EGR gas into the combustion chamber 17 when an operation state of the engine 1 is in the high rotation region (4). The engine 1 reduces an amount of EGR gas according to load being increased. At full load, the EGR gas may be zero.

When the engine 1 operates in the high rotation region (4), the swirl control valve (SCV) 56 is fully opened. No swirl flow is generated in the combustion chamber 17, and only tumble flow is generated. By the swirl control valve 56 being fully opened, filling efficiency can be enhanced in the high rotation region (4), and pump loss can be reduced.

When the engine 1 operates in the high rotation region (4), the air-fuel ratio (A/F) of air-fuel mixture is basically the theoretical air-fuel ratio (A/F=14.7) in the entirety of the combustion chamber 17. The excess air ratio λ of the air-fuel mixture may be 1.0±0.2. In the high load region, including the full load, in the high rotation region (4), the excess air ratio λ of the air-fuel mixture may be less than 1.

When the engine 1 operates in the high rotation region (4), the injector 6 starts fuel injection in the intake stroke (see reference numeral 6061). The injector 6 injects fuel at one time. By starting the fuel injection in the intake stroke, air-fuel mixture can be homogeneously or almost homogeneously formed in the combustion chamber 17. Furthermore, when the number of revolutions of the engine 1 is great, fuel vaporization time can be assured so as to be as long as possible, so that unburned fuel loss can be reduced, and generation of soot can be inhibited.

After injection of fuel has been ended, the spark plug 25 ignites the air-fuel mixture at appropriate timing before the compression top dead center (see reference numeral 6062).

OTHER EMBODIMENTS

The technique disclosed here is not limited to application to the engine 1 having the above-described configuration. Various configurations can be adopted as the configuration of the engine 1.

For example, the cavity 31 may have a shallow bottom portion having the bottom shallower than the depressed portion 312, in a portion opposing the spark plug 25. A part of fuel injected by the injector 6 is guided by the shallow bottom portion to reach a portion near the spark plug 25. The fuel spray guided by the shallow bottom portion can reach the spark plug 25 through a relatively short transport passage. In the first high load region (C1) of the operation region map 701 and the high-load low-rotation region (3) of the operation region map 702 as described above, fuel injected at the terminal stage of the compression stroke can be immediately transported to a portion near the spark plug 25.

DESCRIPTION OF REFERENCE CHARACTERS

1 Engine
10 ECU (Controller)
17 Combustion Chamber
23 Intake Electric S-VT (State Quantity Setting Device, Variable Valve Mechanism)
24 Exhaust Electric S-VT (State Quantity Setting Device, Variable Valve Mechanism)
25 Spark Plug
49 Supercharging System (State Quantity Setting Device)
44 Supercharger
43 Throttle Valve (State Quantity Setting Device)
48 Air Bypass Valve (State Quantity Setting Device)
54 EGR Valve (State Quantity Setting Device)
55 EGR System (State Quantity Setting Device)
56 Swirl Control Valve (State Quantity Setting Device)
6 Injector

The invention claimed is:

1. A control apparatus for an engine, the control apparatus comprising:
   the engine having a combustion chamber;
   a throttle valve disposed in an intake passage and configured to adjust an amount of fresh air introduced into the combustion chamber;
   an Exhaust Gas Recirculation (EGR) system comprising an EGR passage connecting an exhaust passage and the intake passage of the engine, and an EGR valve configured to adjust an amount of EGR gas introduced into the combustion chamber;
   a supercharging system comprising a bypass passage, an air bypass valve disposed in the bypass passage, and a supercharger provided in the intake passage downstream of the throttle valve and downstream of a connecting portion of the intake passage connecting the EGR passage with the intake passage;
   a spark plug disposed so as to face an inside of the combustion chamber, the spark plug configured to ignite air-fuel mixture in the combustion chamber; and
   a controller connected to the spark plug, the air bypass valve, the EGR valve, and the throttle valve, the controller configured to output a control signal to the spark plug, wherein
   after the spark plug ignites the air-fuel mixture to start combustion, unburned air-fuel mixture is combusted by autoignition,
   the controller changes, according to an operation state of the engine, a heat amount ratio that represents an index associated with a ratio of an amount of heat generated by air-fuel mixture being combusted by flame propagation, to a total amount of heat generated by air-fuel mixture in the combustion chamber being combusted, and
   the controller adjusts a temperature within the combustion chamber by changing an opening degree of the air bypass valve of the supercharging system, an opening degree of the EGR valve, and an opening degree of the throttle valve in accordance with the operation state of the engine.

2. The control apparatus for the engine of claim 1, wherein, when load on the engine is high, the controller sets the heat amount ratio to be higher as compared to when load on the engine is low.

3. A control apparatus for an engine of claim 1, the control apparatus comprising:
   the engine having a combustion chamber;
   a spark plug disposed so as to face an inside of the combustion chamber, the spark plug configured to ignite air-fuel mixture in the combustion chamber;
   a controller connected to the spark plug, the controller configured to output a control signal to the spark plug; and
   a supercharging system, mounted to the engine, configured to supercharge the combustion chamber with gas to be introduced thereinto, wherein
   after the spark plug ignites the air-fuel mixture to start combustion, unburned air-fuel mixture is combusted by autoignition,
   the controller changes, according to an operation state of the engine, a heat amount ratio that represents an index associated with a ratio of an amount of heat generated by air-fuel mixture being combusted by flame propagation, to a total amount of heat generated by air-fuel mixture in the combustion chamber being combusted,
   the supercharging system does not perform supercharging when the engine operates at a predetermined load or lower load, and performs supercharging when the engine operates at a load higher than the predetermined load, in response to a control signal from the controller, and
   the controller makes the heat amount ratio constant regardless of whether or not load on the engine changes when the engine operates at a load higher than the predetermined load.

4. The control apparatus for the engine of claim 1, comprising the EGR system, mounted to the engine, configured to introduce burned gas into the combustion chamber in response to a control signal from the controller, wherein
   the controller adjusts an EGR ratio that represents an index associated with a ratio of the burned gas to total gas in the combustion chamber, according to an operation state of the engine, by the controller outputting a control signal to the EGR system so as to change the heat amount ratio according to the operation state of the engine.

5. The control apparatus for the engine of claim 1, comprising a variable valve mechanism, mounted to the engine, configured to change valve timing of at least one of an intake valve and an exhaust valve in response to a control signal from the controller, wherein the controller changes an overlap period of the intake valve and the exhaust valve according to the operation state of the engine by outputting a control signal to the variable valve mechanism.

6. The control apparatus for the engine of claim 1, comprising:
a state quantity setting device, mounted to the engine, configured to adjust introduction of fresh air and burned gas into the combustion chamber; and
an injector, mounted to the engine, configured to inject fuel to be supplied into the combustion chamber, wherein
the controller sets a G/F ratio that is a weight ratio between total gas, including burned gas, in the combustion chamber, and fuel such that the G/F ratio is in a range from 18 to 50, by the controller outputting control signals to the state quantity setting device and the injector.

7. The control apparatus for the engine of claim 6, wherein the controller sets an excess air ratio λ of the air-fuel mixture to 1.0±0.2 by outputting control signals to the state quantity setting device and the injector.

8. The control apparatus for the engine of claim 6, wherein
a state inside the combustion chamber at timing of the autoignition satisfies at least one of
a condition that a temperature is in a range from 570 K to 800 K, and
a condition that a pressure is in a range from 400 kPa to 920 kPa.

9. The control apparatus for the engine of claim 5, wherein a state inside the combustion chamber at the timing of the autoignition satisfies a condition that a swirl ratio is 4 or greater, the swirl ratio being a value obtained by dividing, by an engine angular velocity, a value that is obtained by an intake-air-flow lateral angular velocity measured for each valve lift being integrated.

10. The control apparatus for the engine of claim 5, wherein a geometrical compression ratio of the engine is 13 or greater.

11. The control apparatus for the engine of claim 3, wherein the controller increases the heat amount ratio according to load on the engine being increased when the engine operates at the predetermined load or lower load.

12. A control apparatus for an engine, the control apparatus comprising:
the engine having a combustion chamber;
a spark plug disposed so as to face an inside of the combustion chamber, the spark plug configured to ignite air-fuel mixture in the combustion chamber;
a controller connected to the spark plug, the controller configured to output a control signal to the spark plug; and
a supercharging system, mounted to the engine, configured to supercharge the combustion chamber with gas to be introduced thereinto, wherein
after the spark plug ignites the air-fuel mixture to start combustion, unburned air-fuel mixture is combusted by autoignition,
the controller changes, according to an operation state of the engine, a heat amount ratio that represents an index associated with a ratio of an amount of heat generated by air-fuel mixture being combusted by flame propagation, to a total amount of heat generated by air-fuel mixture in the combustion chamber being combusted,
the supercharging system switches between supercharging and non-supercharging, in response to a control signal from the controller,
the controller changes the heat amount ratio according to load on the engine during non-supercharging in which the supercharging system does not perform supercharging, and
the controller further changes the heat amount ratio according to load on the engine being changed, at a change rate less than a change rate for the non-supercharging, when the supercharging system performs supercharging.

* * * * *